United States Patent
Hwang et al.

(10) Patent No.: US 11,910,409 B2
(45) Date of Patent: Feb. 20, 2024

(54) METHOD AND APPARATUS FOR TRANSMITTING AND RECEIVING INFORMATION RELATED TO RESOURCE COLLISION IN NR V2X

(71) Applicant: LG ELECTRONICS INC., Seoul (KR)

(72) Inventors: Daesung Hwang, Seoul (KR); Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/169,501

(22) Filed: Feb. 15, 2023

(65) Prior Publication Data

US 2023/0209576 A1 Jun. 29, 2023

Related U.S. Application Data

(63) Continuation of application No. PCT/KR2021/015434, filed on Oct. 29, 2021.

(30) Foreign Application Priority Data

Oct. 30, 2020 (KR) .................. 10-2020-0143683
Mar. 16, 2021 (KR) .................. 10-2021-0034177

(51) Int. Cl.
*H04W 72/40* (2023.01)
*H04W 8/26* (2009.01)
(Continued)

(52) U.S. Cl.
CPC ............. *H04W 72/40* (2023.01); *H04W 8/26* (2013.01); *H04W 92/18* (2013.01); *H04W 4/40* (2018.02)

(58) Field of Classification Search
CPC ......... H04W 72/40; H04W 4/40; H04W 8/26; H04W 92/18
See application file for complete search history.

(56) References Cited

U.S. PATENT DOCUMENTS 11,032,864 B2 * 6/2021 Kung .................... H04W 80/02
11,582,729 B2 * 2/2023 Lu ......................... H04W 72/20
(Continued)

FOREIGN PATENT DOCUMENTS

KR 10-2020-0078354 7/2020

OTHER PUBLICATIONS

PCT International Application No. PCT/KR2021/015434, International Search Report dated Jan. 25, 2022, 4 pages.
(Continued)

*Primary Examiner* — Raj Jain
(74) *Attorney, Agent, or Firm* — LEE, HONG, DEGERMAN, KANG & WAIMEY

(57) ABSTRACT

Provided are a method by which a first apparatus performs wireless communication, and an apparatus supporting same. The method may comprise the steps of: receiving, via a first physical sidelink control channel (PSCCH), first sidelink control information (SCI) including information related to a plurality of sidelink (SL) resources which have been reserved by a second apparatus; receiving, via a second PSCCH, second SCI including information related to a plurality of SL resources which have been reserved by a third apparatus, wherein a first SL resource from among the plurality of SL resources which have been reserved by the second apparatus overlaps a second SL resource from among the plurality of SL resources which have been reserved by the third apparatus; determining a physical sidelink feedback channel (PSFCH) resource related to the first SL resource and the second SL resource; and transmitting, to the second (Continued)

apparatus or the third apparatus, information related to the overlap, on the basis of the PSFCH resource.

20 Claims, 22 Drawing Sheets

(51) Int. Cl.
*H04W 92/18* (2009.01)
*H04W 4/40* (2018.01)

(56) References Cited

U.S. PATENT DOCUMENTS

| | | | | |
|---|---|---|---|---|
| 2021/0136699 A1* | 5/2021 | Scholand | ............... | H04W 4/40 |
| 2021/0144582 A1* | 5/2021 | Yi | ..................... | H04W 72/23 |
| 2021/0227465 A1* | 7/2021 | Kung | ................. | H04W 72/569 |
| 2021/0329606 A1* | 10/2021 | Zhao | ................... | H04L 1/1887 |
| 2022/0210768 A1* | 6/2022 | Zhou | ..................... | H04W 4/40 |
| 2022/0256579 A1* | 8/2022 | Ji | ........................ | H04L 1/1887 |
| 2022/0353870 A1* | 11/2022 | Dutta | .................. | H04W 72/54 |
| 2023/0026229 A1* | 1/2023 | Hui | ..................... | H04L 1/1864 |

OTHER PUBLICATIONS

QUALCOMM Incorporated, "Reliability and Latency Enhancements for Mode 2," R1-2006829, 3GPP TSG RAN WG1 Meeting #102-e, Aug. 2020, 11 pages.
Lenovo et al., "Remaining issues on physical layer procedures for NR sidelink," R1-2003827, 3GPP TSG RAN WG1 #101-e, E-meeting, Jun. 2020, 8 pages.
Sony, "Discussion on physical layer procedures for NR sidelink," R1-1908772, 3GPP TSG RAN WG1 #98, Aug. 2019, 7 pages.
LG Electronics, "Discussion on feasibility and benefits for mode 2 enhancement," R1-2005749, 3GPP TSG RAN WG1 Meeting #102-e, Aug. 2020, 11 pages.

* cited by examiner

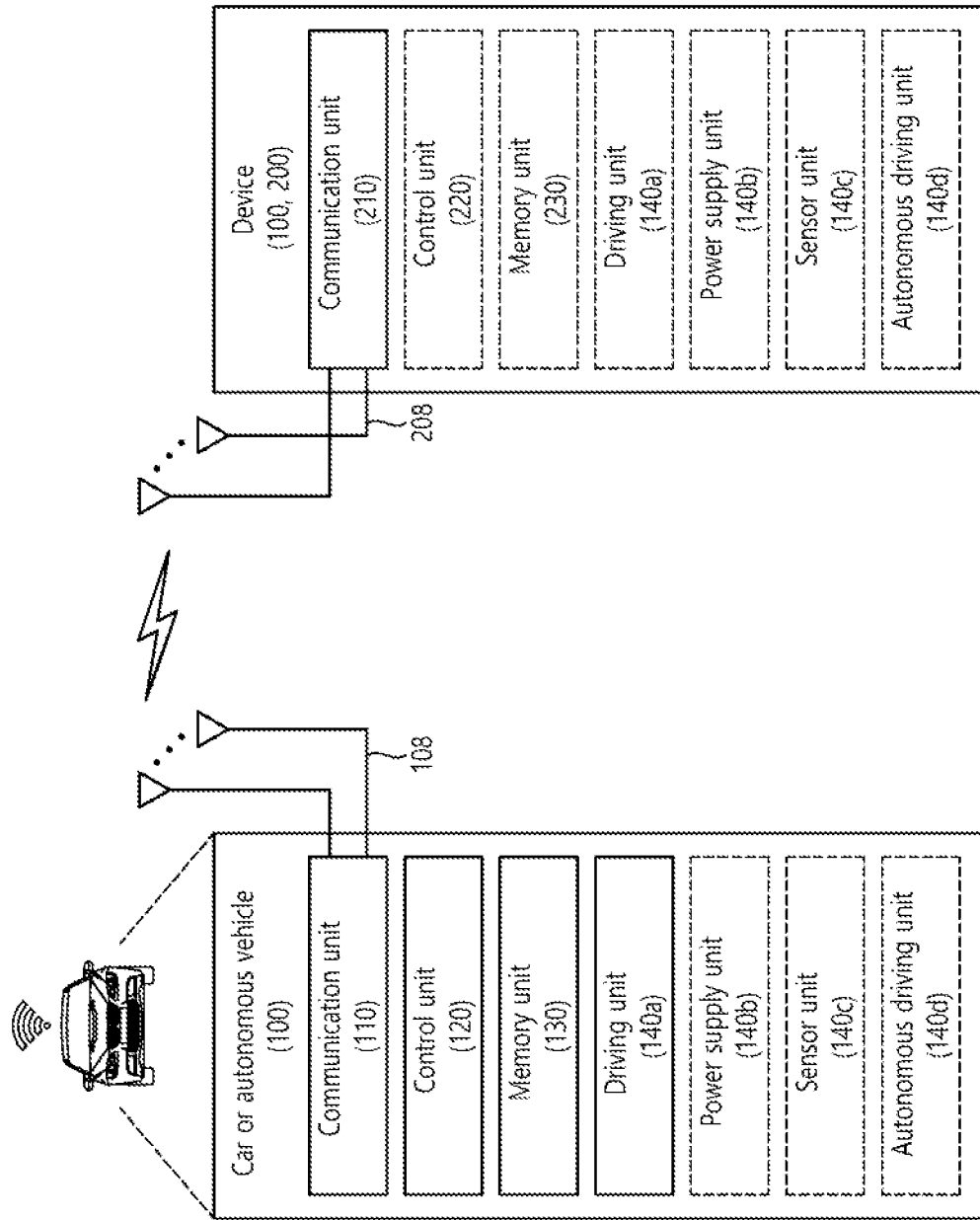

METHOD AND APPARATUS FOR TRANSMITTING AND RECEIVING INFORMATION RELATED TO RESOURCE COLLISION IN NR V2X

CROSS-REFERENCE TO RELATED APPLICATIONS

This application is a continuation of International Application No. PCT/KR2021/015434, filed on Oct. 29, 2021, which claims the benefit of earlier filing date and right of priority to Korean Patent Application Nos. 10-2020-0143683, filed on Oct. 30, 2020, and 10-2021-0034177, filed on Mar. 16, 2021, the contents of which are all hereby incorporated by reference herein in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V21), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

Meanwhile, a first device may receive an assistance information request from a second device, and the first device may transmit assistance information to the second device in response to the assistance information request. In addition, the second device may select SL resource(s) based on the assistance information. In this case, the form of the assistance information, conditions for using the assistance information, conditions for transmitting the assistance information, etc. need to be specifically defined. Furthermore, information included in the assistance information request needs to be specifically defined.

In addition, if a device detects a conflict between transmissions by other devices or a conflict between transmission and reception by other devices, the device needs to inform other devices of the conflict. In particular, in a situation where other devices cannot recognize the conflict with each other, the device needs to inform other devices of the conflict.

In one embodiment, provided is a method for performing wireless communication by a first device. The method may comprise: receiving, through a first physical sidelink control channel (PSCCH), first sidelink control information (SCI) including information related to a plurality of sidelink (SL) resources reserved by a second device; receiving, through a second PSCCH, second SCI including information related to a plurality of SL resources reserved by a third device, wherein a first SL resource among the plurality of SL resources reserved by the second device overlaps with a second SL resource among the plurality of SL resources reserved by the third device; determining a physical sidelink feedback channel (PSFCH) resource related to the first SL resource and the second SL resource; and transmitting, to the second device or the third device, information related to overlap based on the PSFCH resource.

In one embodiment, provided is a first device adapted to perform wireless communication. The first device may comprise: one or more memories storing instructions; one or more transceivers; and one or more processors connected to the one or more memories and the one or more transceivers. For example, the one or more processors may execute the instructions to: receive, through a first physical sidelink control channel (PSCCH), first sidelink control information (SCI) including information related to a plurality of sidelink (SL) resources reserved by a second device; receive, through a second PSCCH, second SCI including information related to a plurality of SL resources reserved by a third device, wherein a first SL resource among the plurality of SL resources reserved by the second device overlaps with a second SL resource among the plurality of SL resources reserved by the third device; determine a physical sidelink feedback channel (PSFCH) resource related to the first SL resource and the second SL resource; and transmit, to the second device or the third device, information related to overlap based on the PSFCH resource.

A resource conflict between UEs can be minimized.

BRIEF DESCRIPTION OF THE DRAWINGS

FIG. 22 shows a vehicle or an autonomous vehicle, based on an embodiment of the present disclosure.

DETAILED DESCRIPTION

Figure 1:
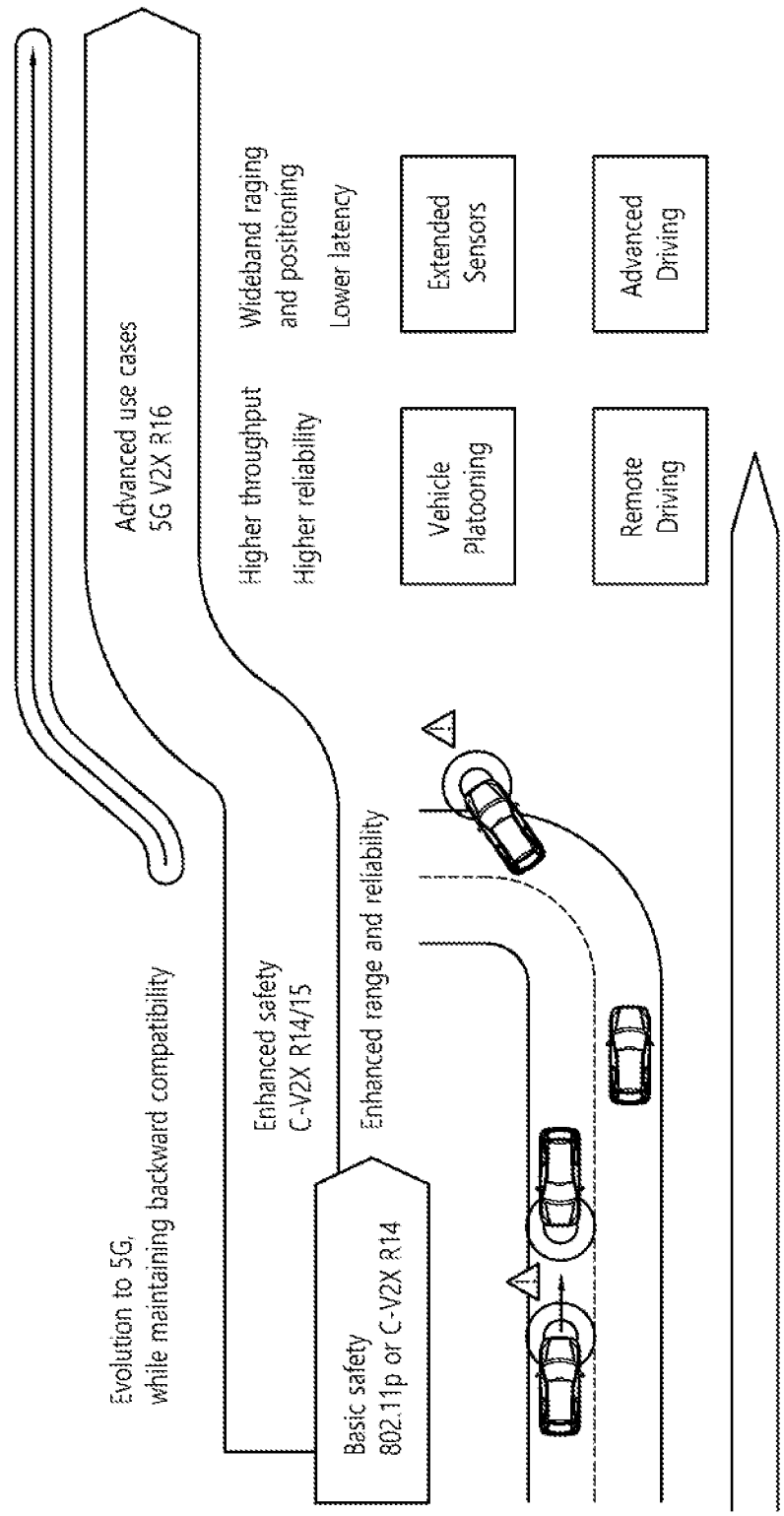
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
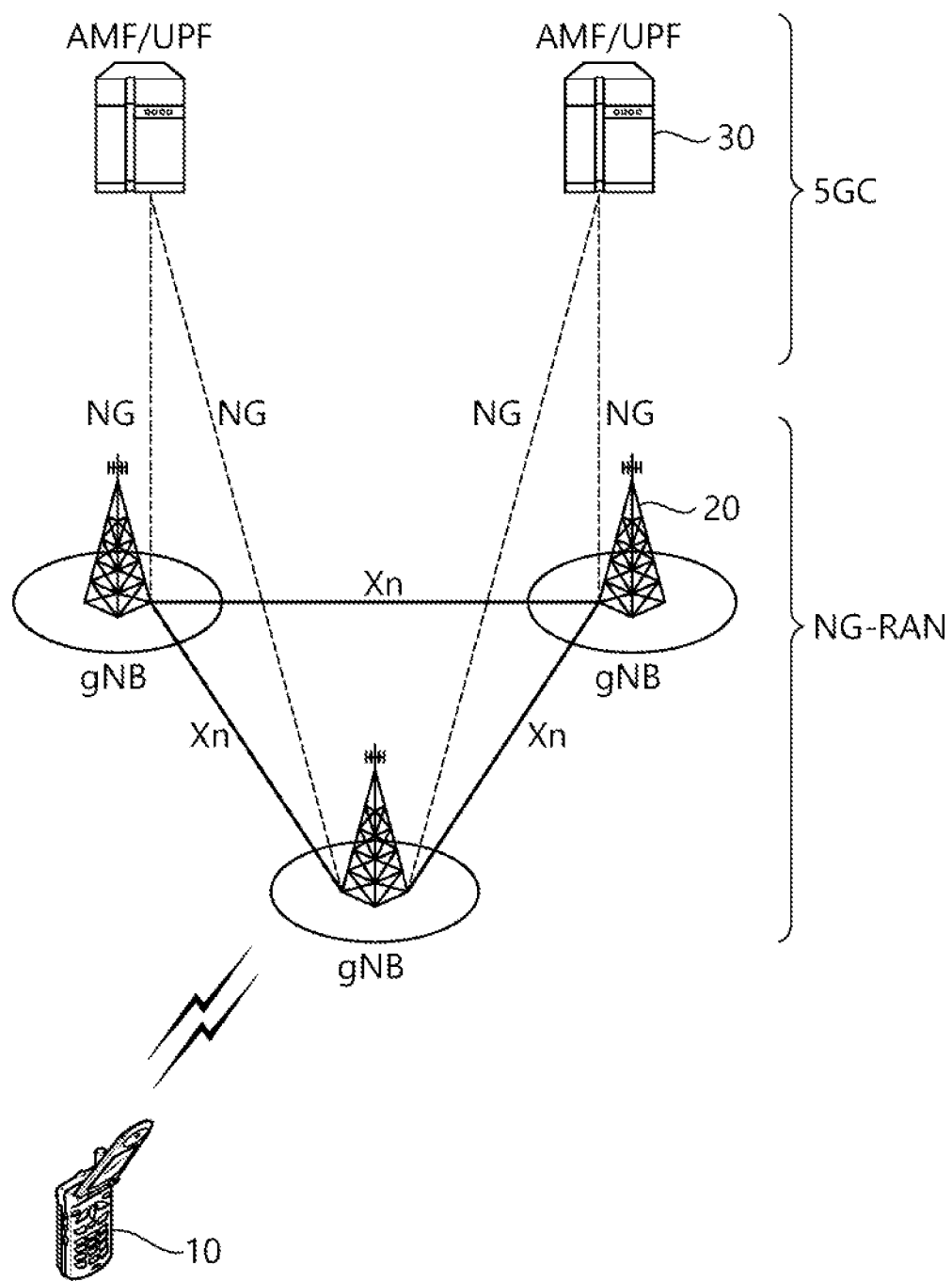
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
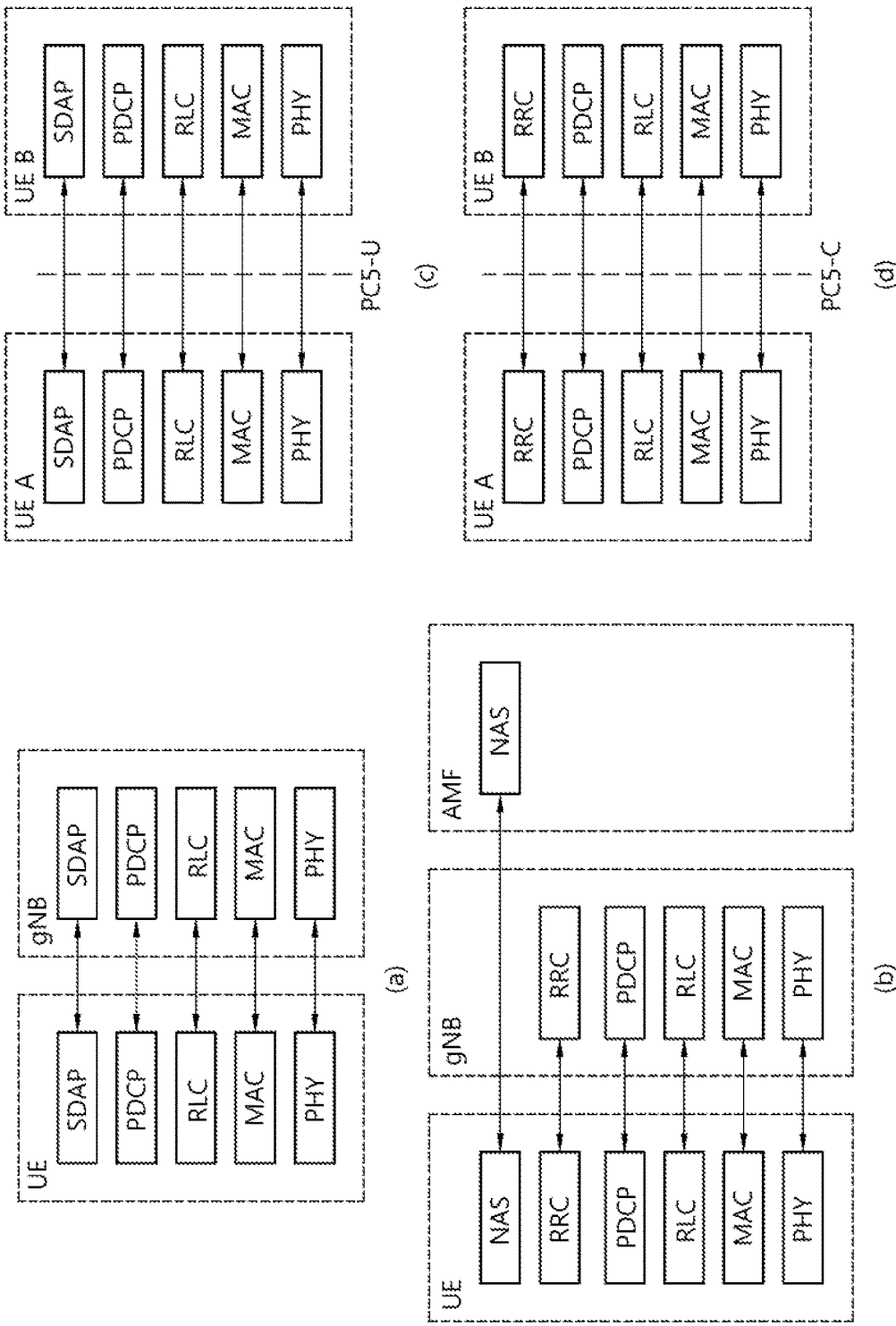
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
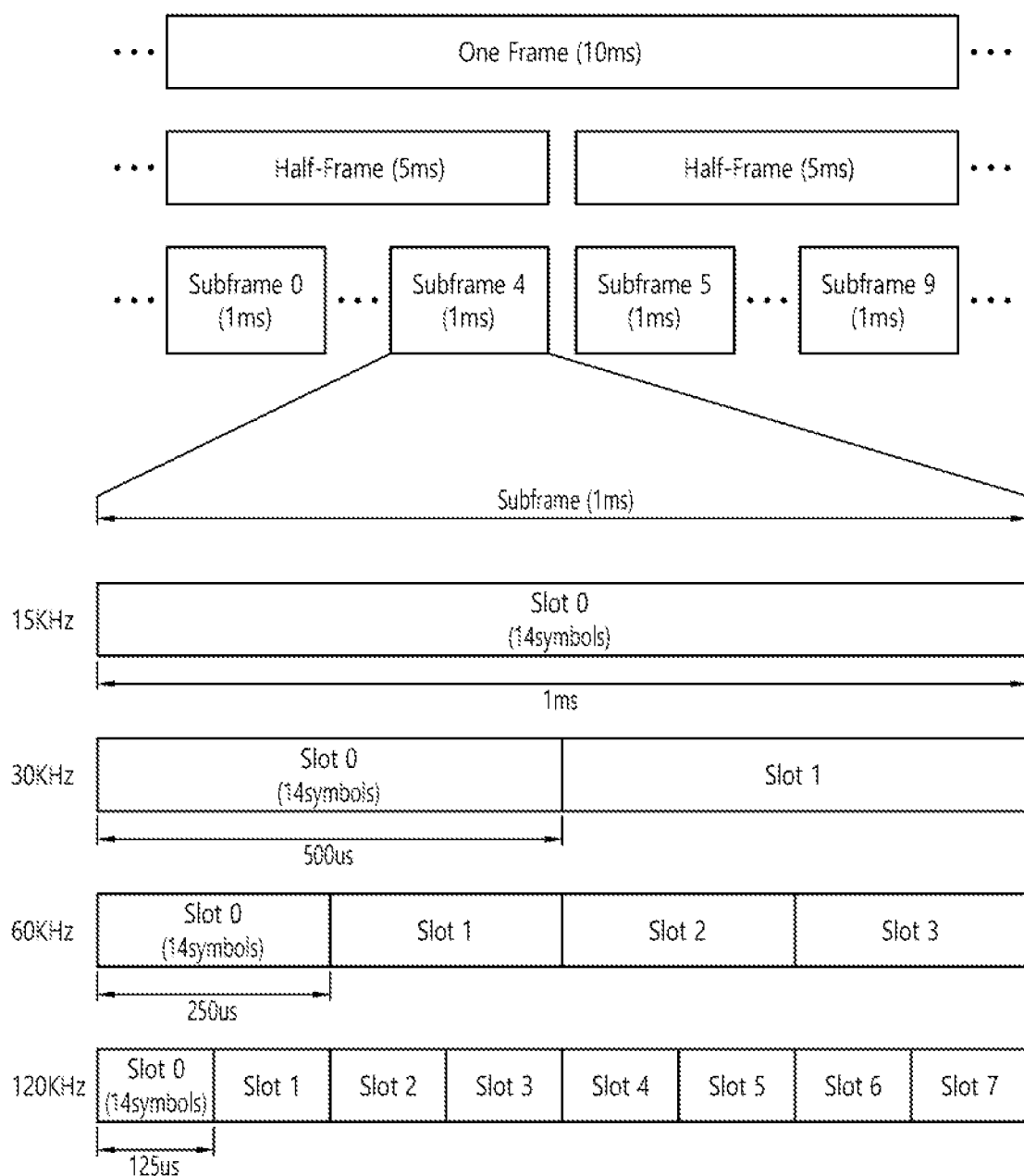
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$) a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15*2$^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*2$^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
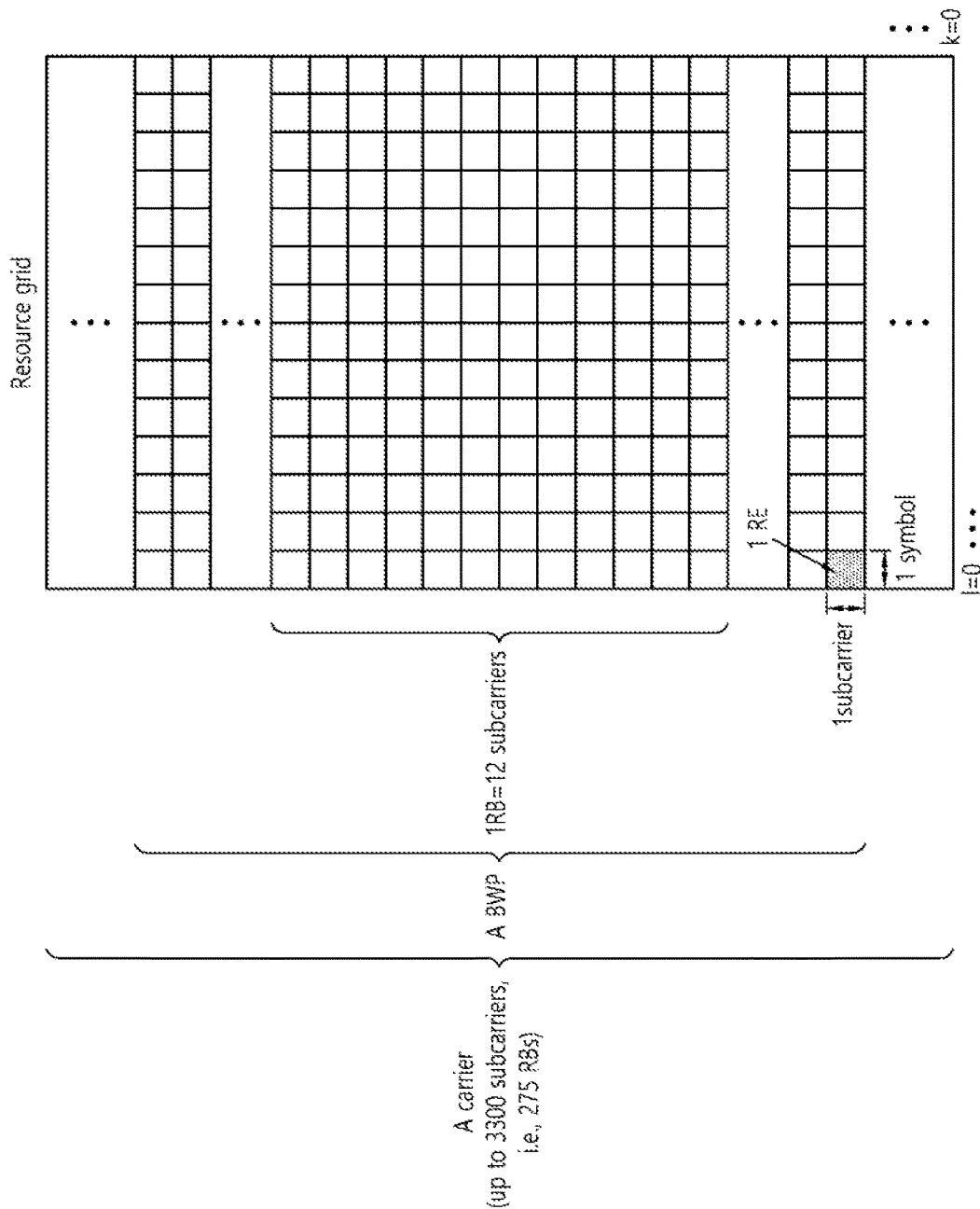
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
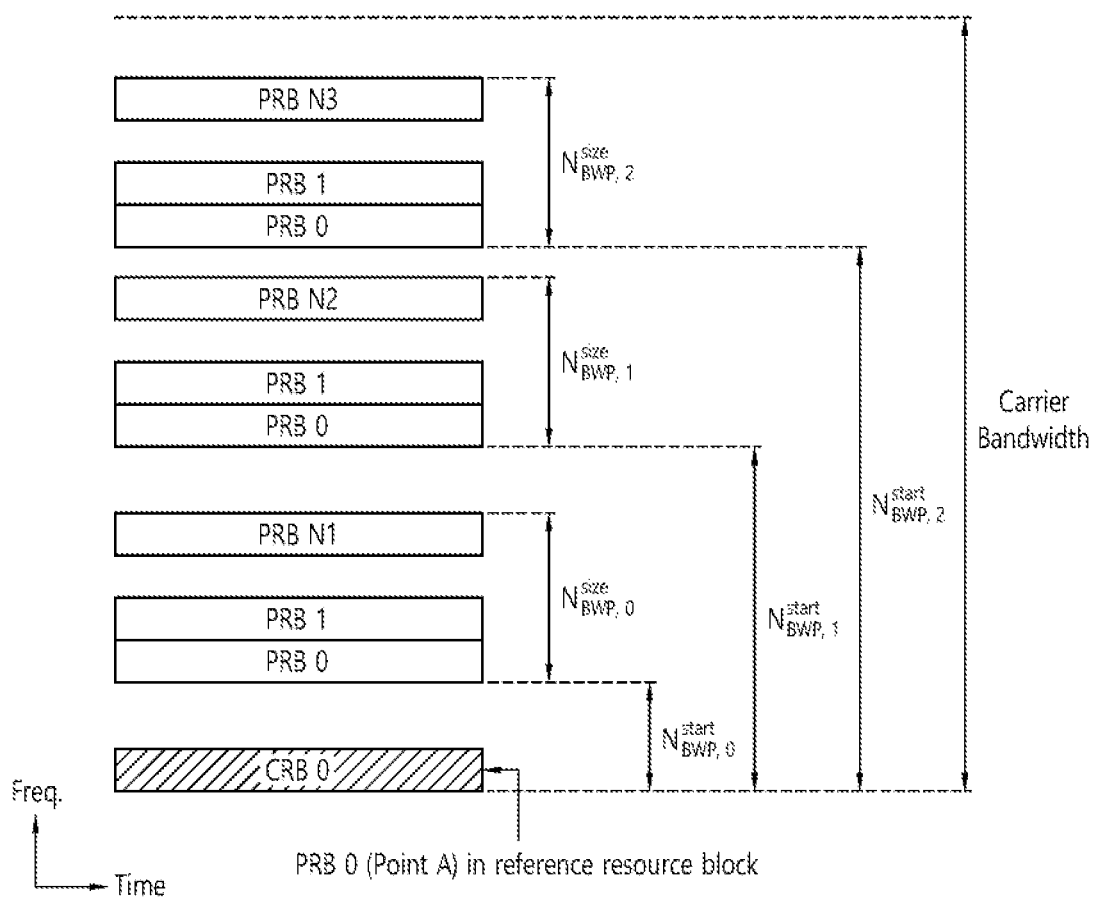
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
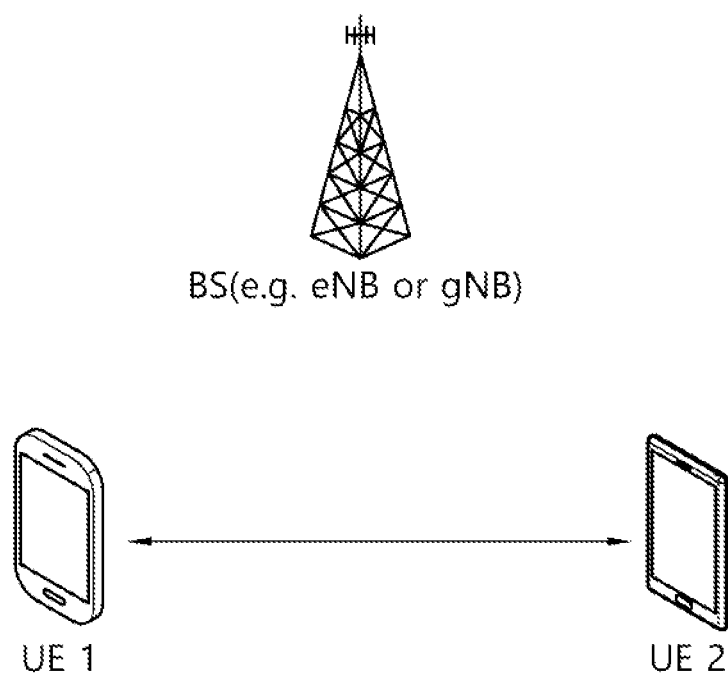
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
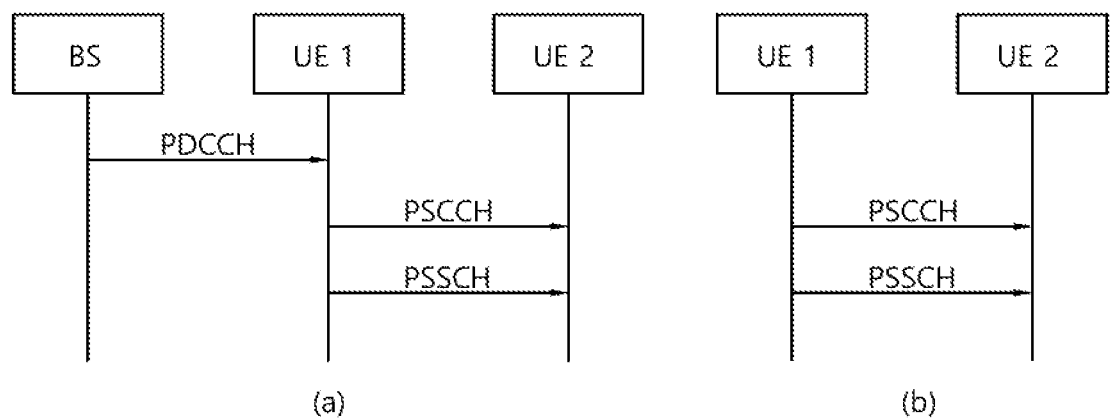
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
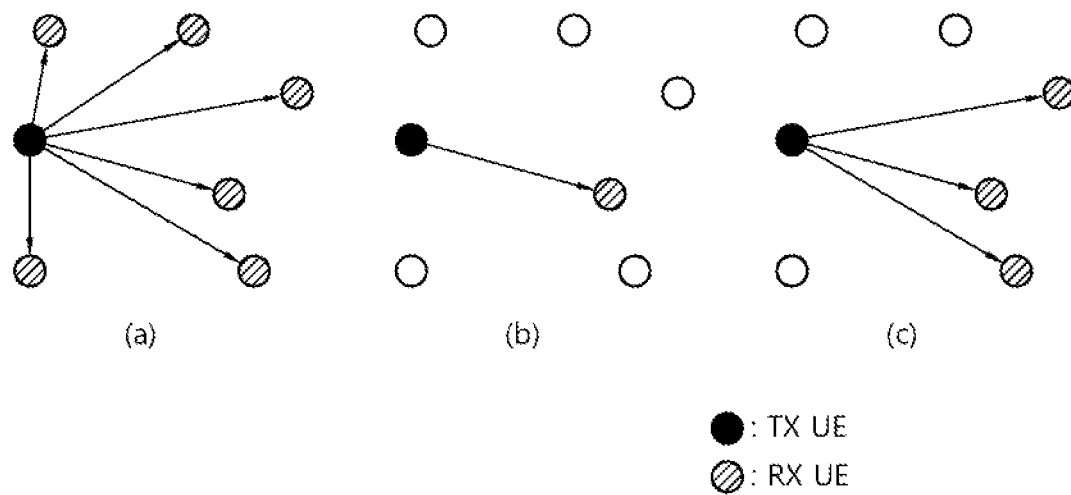
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 10:
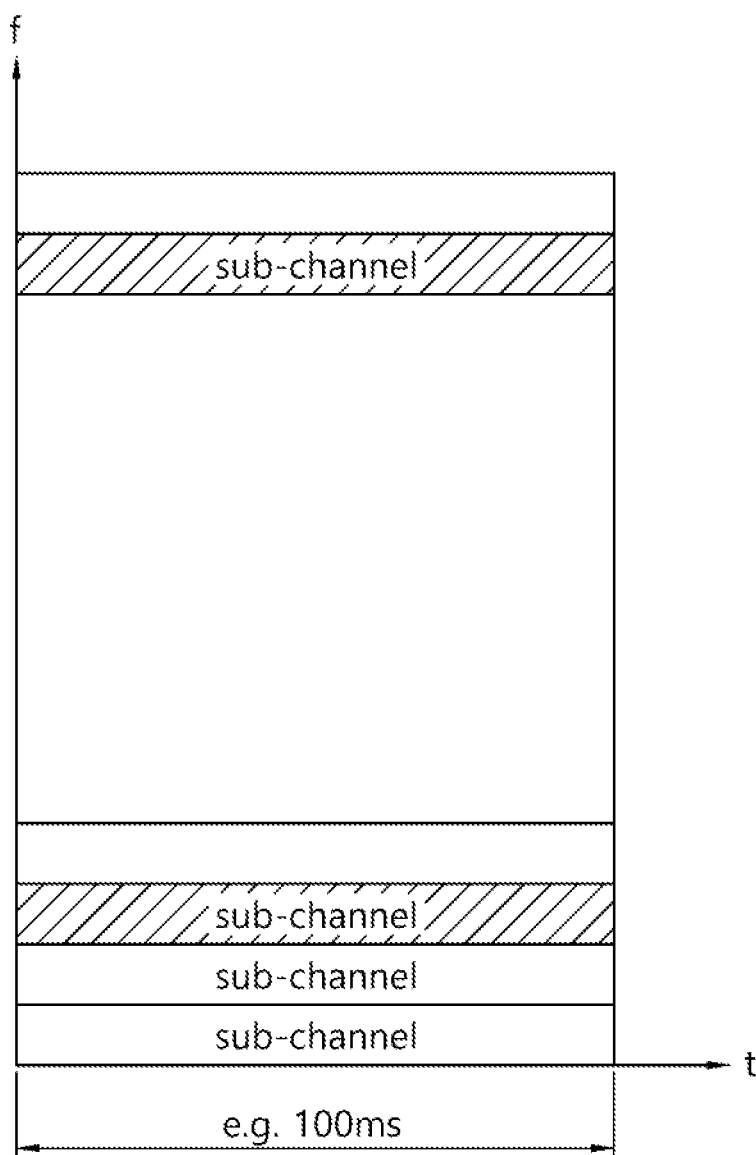
FIG. 10 shows a resource unit for CBR measurement, based on an embodiment of the present disclosure.

FIG. 10 shows a resource unit for CBR measurement, based on an embodiment of the present disclosure. The embodiment of FIG. 10 may be combined with various embodiments of the present disclosure.

Referring to FIG. 10, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 10, if it is assumed that a hatched sub-channel is a sub-channel having a value greater than or equal to a pre-configured threshold, the CBR may denote a ratio of the hatched sub-channels for a period of 100 ms. Additionally, the UE may report the CBR to the BS.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (Modulation and Coding Scheme (MCS) coordination), or the like.

Hereinafter, a hybrid automatic repeat request (HARQ) procedure will be described.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or reference signal received power (RSRP).

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a sub-channel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Hereinafter, sidelink control information (SCI) will be described.

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, SCI including first SCI configuration field group may be referred to as first SCI or $1^{st}$ SCI, and SCI including second SCI configuration field group may be referred to as second SCI or $2^{nd}$ SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

For example, the transmitting UE may transmit the entirety or part of information described below to the receiving UE through the SCI. Herein, for example, the transmitting UE may transmit the entirety or part of the information described below to the receiving UE through the first SCI and/or the second SCI.

PSSCH and/or PSCCH related resource allocation information, e.g., the number/positions of time/frequency resources, resource reservation information (e.g., period), and/or SL CSI report request indicator or SL (L1) RSRP (and/or SL (L1) RSRQ and/or SL (L1) RSSI) report request indicator, and/or SL CSI transmission indicator (or SL (L1) RSRP (and/or SL (L1) RSRQ and/or SL (L1) RSSI) information transmission indicator)) (on PSSCH), and/or MCS information, and/or Transmit power information, and/or L1 destination ID information and/or L1 source ID information, and/or SL HARQ process ID information, and/or New data indicator (NDI) information, and/or Redundancy version (RV) information, and/or (Transmission traffic/packet related) QoS information, e.g., priority information, and/or SL CSI-RS transmission indicator or information on the number of (to-be-transmitted) SL CSI-RS antenna ports, and/or Location information of a transmitting UE or location (or distance region) information of a target receiving UE (for which SL HARQ feedback is requested), and/or Reference signal (e.g., DMRS, etc.) related to channel estimation and/or decoding of data to be transmitted through a PSSCH, e.g., information related to a pattern of a (time-frequency) mapping resource of DMRS, rank information, antenna port index information For example, the first SCI may include information related to channel sensing. For example, the receiving UE may decode the second SCI by using a PSSCH DMRS. A polar code used in a PDCCH may be applied to the second SCI. For example, in a resource pool, a payload size of the first SCI may be identical for unicast, groupcast, and broadcast. After decoding the first SCI, the receiving UE does not have to perform blind decoding of the second SCI. For example, the first SCI may include scheduling information of the second SCI.

Meanwhile, in various embodiments of the present disclosure, since a transmitting UE may transmit at least one of SCI, first SCI, and/or second SCI to a receiving UE through a PSCCH, the PSCCH may be replaced/substituted with at least one of the SCI, the first SCI and/or the second SCI. Additionally/alternatively, for example, the SCI may be replaced/substituted with at least one of the PSCCH, the first SCI, and/or the second SCI. Additionally/alternatively, for example, since a transmitting UE may transmit second SCI to a receiving UE through a PSSCH, the PSSCH may be replaced/substituted with the second SCI.

In the present disclosure, the term "configuration/configured or definition/defined" may be interpreted as being (pre-)configured from the base station or the network (through predefined signaling (e.g., SIB, MAC signaling, RRC signaling)). For example, "A may be configured" may include "that the base station or the network (pre-)configures/defines or informs A to the UE". Alternatively, the term "configuration/configured or definition/defined" may be interpreted as being pre-configured or pre-defined in the system. For example, "A may be configured" may include "that A is pre-configured/defined in the system".

In the present disclosure, for example, a resource block (RB) may be replaced/substituted with a subcarrier. Also, for example, in the present disclosure, a packet or traffic may be replaced/substituted with a transport block (TB) or a medium access control protocol data unit (PDU) according to a transmitted layer.

In the present disclosure, for example, a source ID may be replaced/substituted with a destination ID.

In the present disclosure, for example, an L1 ID may be replaced/substituted with an L2 ID. For example, the L1 ID may be an L1 source ID or an L1 destination ID. For example, the L2 ID may be an L2 source ID or an L2 destination ID.

Meanwhile, the base station may allocate resource(s) used for transmission and reception of SL channel(s)/signal(s) (hereinafter, SL resource(s)) to the UE. For example, the base station may transmit information related to the resource(s) to the UE. In the present disclosure, a method in which the base station allocates SL resource(s) to the UE may be referred to as mode 1 method, mode 1 operation, or resource allocation mode 1.

On the other hand, the UE may select SL resource(s) within a resource pool based on sensing. In the present disclosure, a method for selecting SL resource(s) by the UE may be referred to as a mode 2 method, a mode 2 operation, or a resource allocation mode 2. For example, in the resource allocation mode 2, the UE may detect SCI transmitted by other UE(s), and the UE may identify resource(s) reserved by the other UE(s) based on the SCI, and the UE may obtain an RSRP measurement value. In addition, based on the above-described sensing result, the UE may select resource(s) to be used for SL transmission excluding specific resource(s) within a resource selection window. In the case of the sensing operation, the UE may refer to resource allocation information received through first SCI. However, due to an overhead of the first SCI, the amount of information that can be obtained by the UE in the first SCI may be limited.

Based on various embodiments of the present disclosure, in order to assist a sensing operation and/or a resource selection operation of a first UE, a second UE may transmit additional assistance information. The first UE may use assistance information received from the second UE in order to improve PSSCH detection performance and/or reduce half-duplex limitation and/or select spare resource(s) for transmission and reception of specific signal(s). In an embodiment of the present disclosure, for convenience of description, it is assumed that a UE-A transmits assistance information to a UE-B. It is assumed that the UE-B selects resource(s) for PSCCH/PSSCH to be transmitted to the UE-A and/or resource(s) for PSCCH/PSSCH to be transmitted to a UE-C (i.e., a third UE) based on the assistance information received from the UE-A.

Figure 11:
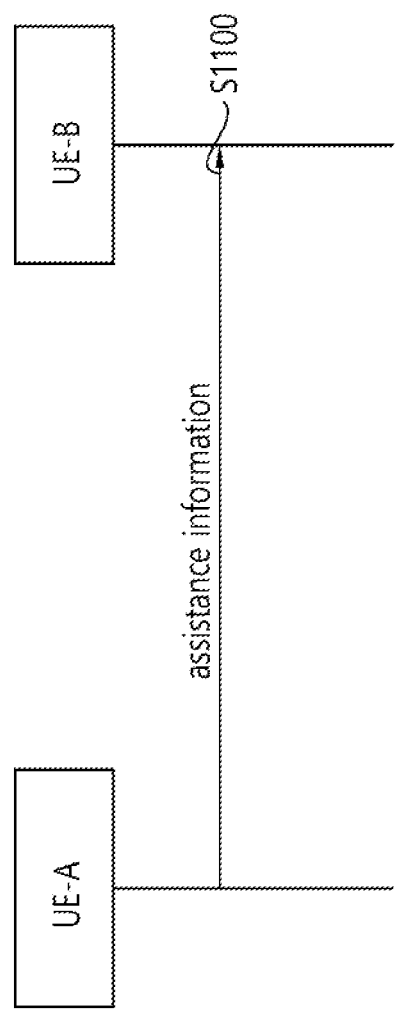
FIG. 11 shows a procedure for a UE-A to transmit assistance information to a UE-B, based on an embodiment of the present disclosure.

FIG. 11 shows a procedure for a UE-A to transmit assistance information to a UE-B, based on an embodiment of the present disclosure. The embodiment of FIG. 11 may be combined with various embodiments of the present disclosure.

Referring to FIG. 11, in step S1100, the UE-A may transmit assistance information to the UE-B. For example, the UE-B may select resource(s) for PSCCH/PSSCH to be transmitted to the UE-A, based on assistance information received from the UE-A, and the UE-B may perform SL transmission by using the resource(s). For example, the UE-B may select resource(s) for PSCCH/PSSCH to be transmitted to the UE-C based on assistance information received from the UE-A, and the UE-B may perform SL transmission by using the resource(s). In the present disclosure, assistance information may be referred to as additional information.

Based on an embodiment of the present disclosure, information related to reserved resource(s) to be notified by the UE-A to the UE-B may be extended. For example, the assistance information may include information related to additional resource(s) in addition to information related to resource(s) included in SCI. For example, information related to resource(s) included in the assistance information may be information related to extended reserved resource(s). Specifically, for example, the UE-A may transmit information related to other reserved resource(s) (e.g., information related to frequency domain resource(s) and/or information related to time domain resource(s)) to the UE-B through assistance information, in addition to information related to reserved resource(s) (e.g., up to three resources) transmitted through the SCI. In this case, for the additionally indicated reserved resource(s), the UE-B may determine whether to exclude resource(s) corresponding to the reserved resource(s) within a resource selection window.

For example, the UE-A may select the extended reserved resource(s), through a resource (re)selection procedure, based on at least one of the number of retransmissions, whether or not it is retransmission, the size of a packet, the number of subchannels (or transmission unit) for PSSCH transmission, a resource reservation period, priority information, and/or information related to a TB from a higher layer (e.g., MAC layer). Herein, the UE-A may perform a sensing operation, and when the UE-A performs a resource (re)selection procedure for each resource group or (re) selects resource(s), the size of the corresponding window and/or the number of resources may be extended. For example, the size of the window may be configured or pre-configured for the UE. For example, whether or not the size of the window is extended may be configured or pre-configured for the UE. For example, the (maximum) number of resources may be configured or pre-configured for the UE. For example, whether or not the (maximum) number of resources is extended may be configured or pre-configured for the UE.

For example, the UE-A may transmit additional information (for selected resources of the UE-A) when a PSCCH/PSSCH is transmitted in every selected resource. Although the signaling overhead may be excessive in the above case, it may be advantageous in that the UE-B can receive and utilize additional information in other time even if the UE-B does not detect additional information.

For example, the UE-A may transmit additional information (for selected resources of the UE-A) after the UE-A determines the selected resources through a resource (re) selection procedure. For example, the UE-A may trigger transmission of additional information at a time of triggering the resource (re)selection procedure or after a specific time from the time. For example, the specific time may be a pre-defined value or a value (pre-)configured for the UE. In this case, for example, the UE-A may transmit additional information in the initial resource of the selected resources. In the above case, signaling overhead can be minimized, but if the UE-B does not detect initial transmission, the UE-B may not be able to obtain additional information. Or, for example, the UE-A may transmit additional information in some of the selected resources. For example, the UE-A may transmit additional information in N resources prior in time among the selected resources. The value of N may be a value configured through PC5-RRC signaling or a value (pre-) configured for the UE. For example, the UE-A may transmit additional information in every M-th resource from the initial resource among the selected resources. The value of M may be a value configured through PC5-RRC signaling or a value (pre-)configured for the UE.

For example, when additional information is transmitted, the UE-A may transmit other MAC PDU or TB in addition to the additional information. For example, the additional information may be jointly encoded with other MAC PDU or TB. For example, the additional information may be encoded separately from other MAC PDU or TB.

For example, when additional information is transmitted, the UE-A may not transmit other MAC PDU or TB in addition to the additional information. In this case, for example, if additional information is transmitted through second SCI, the PSSCH may include only the second SCI. In this case, for example, the number of subchannels may be different between a PSSCH for transmitting additional information and a PSSCH for transmitting a general TB, and a resource selection window for transmitting the additional information may exist separately (from a resource selection window for transmitting the general TB). Or, for example, a resource selection window may be shared between a PSSCH for transmitting additional information and a PSSCH for transmitting a general TB, and the resource selection window may be partitioned for the additional information and the general TB. In this case, a priority value of the PSSCH for the additional information may be a priority value of a MAC PDU corresponding to a selected resource indicated by the additional information. For example, a priority value of the PSSCH for the additional information may be the minimum value among priority values for the corresponding resource pool or the corresponding resource. For example, a priority value of the PSSCH for the additional information may be the maximum value among priority values for the corresponding resource pool or the corresponding resource. For example, a priority value of the PSSCH for the additional information may be a value (pre-)configured for the corresponding resource pool or the corresponding resource.

For example, the UE-A may transmit first SCI and/or additional information, and the UE-B may transmit a response to the UE-A. For example, multiple UE may receive first SCI and/or additional information transmitted by the UE-A, and multiple UEs may respond to the first SCI and/or the additional information based on a common resource. For example, the response method may adopt the method of groupcast HARQ-ACK feedback option 1. For example, a UE that receives a PSSCH for first SCI and/or additional information from the UE-A may select a PSFCH resource associated with the PSSCH, and the UE may determine whether to perform PSFCH transmission based on the PSFCH resource. In this case, for example, if the UE-B successfully receives the PSSCH for the first SCI and/or the additional information, the UE-B may omit PSFCH transmission. For example, if the UE-B receives only SCI (e.g., first SCI and/or second SCI), the UE-B may transmit a PSFCH. For example, if additional information is transmitted through second SCI, even if the UE-B only successfully detects the SCI, the UE-B may transmit a PSFCH. Or, for example, if the UE-B is allowed to use a resource indicated by the additional information by the UE-A, the UE-B may omit PSFCH transmission. For example, if the UE-B does not want a resource indicated by the additional information to be used by the UE-A (e.g., if the resource overlaps with UE-B's selected resource and/or if the resource overlaps with SCI received by the UE-B and/or if the interference level is determined to be a certain level or higher), the UE-B may transmit a PSFCH. Meanwhile, if the UE-B fails to detect SCI scheduling a PSSCH for additional information, the UE-B may omit PSFCH transmission, and the UE-A may still determine that the interference level in the resource is low, and the UE-A may use the resource.

For example, the UE-A may include all or part of information related to selected resources in a resource selection window in additional information. In this case, for example, if the UE-A transmits additional information for all or part of selected resources of the UE-A, the additional information may always include information related to all selected resources. According to this method, resources from the past may be indicated based on the timing at which the additional information is transmitted, and in the case of periodic traffic, the UE-B can consider resources of the next reservation period of the past resources in the resource selection. More specifically, selected resources indicated by the initial first SCI may be excluded from selected resources of the UE-A included in additional information. For example, the UE-A may transmit additional information in selected resources for other TBs within a resource selection window. This is because the UE-A transmits the corresponding resource information in other PSCCH/PSSCHs that are transmitted even if a problem occurs for all selected resources for a specific TB (e.g., reception quality is below a certain level).

For example, the UE-A may include information related to some of selected resources in a resource selection window in additional information. For example, the UE-A may not include information related to selected resources before a time when the additional information is transmitted. For example, selected resources indicated by first SCI may be excluded from the additional information. For example, information related to selected resources after a certain time from the time when the additional information is transmitted may not be included in the additional information. For example, the certain time may be a (pre-)configured value. In this case, the UE-A may update additional information each time the UE-A sends the additional information and, as a result, the UE-A may also perform encoding again. For example, the additional information may be encoded separately from a TB. For example, the additional information may be indicated by second SCI. For example, the additional information may be jointly encoded with a TB, and in this case, whether or not to transmit additional information may be different in units of TB. In this case, for example, a value of additional information may not change for a specific TB, and the value of additional information may change for the next TB or transmission of additional information may be omitted.

For example, a payload size for additional information may be predefined or (pre-)configured, and the amount of information to be transmitted by the UE-A may not fit the payload size. In this case, for example, if the amount of information to be transmitted by the UE-A is greater than the payload size, the UE-A may omit transmission of some information among information related to selected resources. For example, information related to selected resources for which transmission is omitted may be information related to resources late in time. For example, the unit of transmission omission may be a unit of an indicated resource (group), or some bits of the resource indicator may be omitted. For example, if the amount of information to be transmitted by the UE-A is less than the payload size, the UE-A may add padding bits (e.g., ALL-ZERO or ALL-ONE).

Meanwhile, the UE-A may transmit additional information including information regarding selected resources of the UE-A. In this case, there may occur a case in which the UE-A cannot use the corresponding selected resources before indication the selected resources through first SCI. For example, if selected resources indicated by the UE-A through additional information is occupied by another received SCI, and/or if an RSRP measurement value corresponding to the received SCI is greater than or equal to an RSRP threshold, and/or if a reception priority value indicated by the received SCI is less than a transmission priority value of the UE-A, and/or if a reception priority value indicated by the received SCI is less than a (pre-)configured priority threshold value, the UE-A may reselect all or part of the selected resources.

For example, before the UE-A indicates selected resources through first SCI or additional information, if the selected resources overlap with a reserved resource indicated by received SCI, and if an RSRP measurement value corresponding to the received SCI is greater than or equal to an RSRP threshold, the UE-A may report resource re-evaluation for the selected resources. For example, after the UE-A indicates selected resources through first SCI or additional information, if the selected resources overlap with a reserved resource indicated by received SCI, and if an RSRP measurement value corresponding to the received SCI is greater than or equal to an RSRP threshold, and if a reception priority value indicated by the received SCI is less than a transmission priority value of the UE-A, and if a reception priority value indicated by the received SCI is less than a (pre-)configured priority threshold value, the UE-A may report pre-emption for the selected resources.

For example, before the UE-A indicates selected resources through first SCI or additional information, if the selected resources overlap with a reserved resource indicated by received SCI, and if an RSRP measurement value corresponding to the received SCI is greater than or equal to an RSRP threshold, the UE-A may report resource re-evaluation for the selected resources. For example, after the UE-A indicates selected resources through first SCI, if the selected resources overlap with a reserved resource indicated by received SCI, and if an RSRP measurement value corresponding to the received SCI is greater than or equal to an RSRP threshold, and if a reception priority value indicated by the received SCI is less than a transmission priority value of the UE-A, and if a reception priority value indicated by the received SCI is less than a (pre-)configured priority threshold value, the UE-A may report pre-emption for the selected resources. For example, before the UE-A indicates selected resources through first SCI, if the selected resources indicated through additional information overlap with a reserved resource indicated by received SCI, and if an RSRP measurement value corresponding to the received SCI is greater than or equal to an RSRP threshold, and if a reception priority value indicated by the received SCI is less than a transmission priority value of the UE-A, and if a reception priority value indicated by the received SCI is less than a (pre-)configured priority threshold value, the UE-A may report a third state (e.g., quasi-pre-emption) for the selected resources. For example, before the UE-A indicates selected resources through first SCI, if the selected resources indicated through additional information overlap with a reserved resource indicated by received SCI, and if an RSRP measurement value corresponding to the received SCI is greater than or equal to an RSRP threshold, the UE-A may report a third state (e.g., quasi-pre-emption) for the selected resources. For example, before the UE-A indicates selected resources through first SCI, if the selected resources indicated through additional information overlap with a reserved resource indicated by received SCI, and if an RSRP measurement value corresponding to the received SCI is greater than or equal to an RSRP threshold, and if a reception priority value indicated by the received SCI is less than a transmission priority value of the UE-A, the UE-A may report a third state (e.g., quasi-pre-emption) for the selected resources. For example, if the UE-A reports re-evaluation and/or pre-emption and/or quasi-pre-emption for a specific resource, the UE-A may replace the corresponding resource with another resource among available resources. For example, if the UE-A reports re-evaluation and/or pre-emption and/or quasi-pre-emption for a specific resource, the UE-A may replace all or part of selected resources of the UE-A with other resource(s) among available resources.

Meanwhile, in case that the UE-A indicates a selected resource through additional information, the UE-A may reselect the selected resource before actual transmission occurs or before indicating the selected resource through first SCI. In the above situation, the UE-A needs to determine whether to change additional information according to the changed information on the selected resource. For example, even if the selected resource is changed in the middle, the UE-A may maintain additional information as it is. In particular, this is because when additional information is included in a TB, HARQ combining gain may not be obtained if the additional information is changed. In addition, depending on the factor by which the UE-A changes the selected resource (e.g., another PSCCH/PSSCH occupies the corresponding resource), it may be useful for the UE-B to avoid the resource indicated by the additional information. For example, upon receiving additional information, the UE-B may prioritize a reserved resource indicated by first SCI. That is, if the UE-B recognizes that a resource indicated by additional information is reselected based on received first SCI, the UE-B may not consider the resource indicated by the additional information in resource selection of the UE-B. For example, regardless of whether the UE-A actually updates selected resources, the UE-B which has received additional information may use selected resources indicated by additional information to determine available resources of the UE-B. For example, regardless of whether the UE-A actually updates selected resources, the UE-B which has received additional information may determine available resources of the UE-B based on information related to selected resources included in the additional information.

For example, if selected resources of the UE-A is changed in the middle, the UE-A may change additional information according to the corresponding update information. For example, when selected resources of the UE-A is changed, the UE-A may transmit additional information again. For example, the UE-A may not include a resource excluded from the selected resources in the additional information, and the UE-A may include a resource added as the selected resources in the additional information.

For example, the UE-B may perform resource (re)selection based on additional information whenever the UE-B receives additional information. Whether or not additional information can be received and/or whether or not a resource (re)selection procedure is performed by using additional information may be (pre-)configured for the UE-B.

For example, even if the UE-B receives assistance information, the UE-B may not perform resource (re)selection based on the received assistance information in a specific situation. For example, the specific situation may include a case in which the UE-B has already received additional information. For example, the specific situation may include a case in which the UE-B has already received additional information and resources indicated by the additional information and the currently received additional information are the same. For example, the specific situation may include a case in which the UE-B has already received additional information and resources indicated by the additional information are a subset of resources indicated by the currently received additional information. For example, the specific situation may include a case in which the UE-B has already received additional information and resources indicated by the additional information are a superset of resources indicated by the currently received additional information. For example, the specific situation may include a case in which the UE-B has already received additional information and a certain time has not elapsed since the UE-B performed resource (re)selection using the additional information. For example, the certain time may be a value (pre-)configured for each resource pool. For example, the certain time may be a value (pre-)configured for each TX priority pool. For example, the certain time may be a value (pre-)configured for each RX priority pool. In this case, for example, the UE-B may check the time from the time when determining selected resources through resource (re)selection. For example, the UE-B may check the time from the end of a slot in which the additional information is received.

Meanwhile, the UE-B which has received additional information may be instructed again through first SCI at a different time, for selected resources/reserved resources indicated by the additional information. In this case, UE-B may measure RSRP based on a PSSCH DMRS corresponding to the first SCI for the reserved resources again, and considering the time-varying channel environment and interference environment, the UE-B may use the updated RSRP measurement value that reflects the interference environment more accurately than the additional information indication time. For example, even if a resource was included in available resources based on additional information when the UE-B performs resource (re)selection, if an RSRP measurement value for the resource is greater than or equal to an RSRP threshold at the time of receiving the first SCI, the UE-B may exclude the resource from available resources. This is because the UE-B determines that the interference level is higher at the time of receiving the first SCI. Conversely, for example, even if a resource is not included in available resources based on additional information when the UE-B performs resource (re)selection, an RSRP measurement value for the resource may be less than or equal to an RSRP threshold at the time of receiving the first SCI. In this case, for example, the UE-B may determine that the interference level for the resource has decreased at the time of receiving the first SCI, and the UE-B may include the resource in available resources of the UE-B again. Or, for example, the UE-B may still maintain a state in which the resource is excluded from available resources of the UE-B.

For example, the UE-B may determine whether to include or exclude the corresponding resource from available resources of the UE-B, by using an RSRP measurement value for the corresponding resource used when performing resource (re)selection based on additional information and an RSRP measurement value for the corresponding resource at the time of receiving first SCI. For example, if the average (or weighted average) of the RSRP measurement values is greater than or equal to an RSRP threshold, the UE-B may exclude the resource from available resources. For example, if the average (or weighted average) of the RSRP measurement values is less than an RSRP threshold, the UE-B may include the resource in available resources. The RSRP threshold may be different from an RSRP threshold used for resource (re)selection based on first SCI. For example, the RSRP threshold may be an average (or weighted average) of an RSRP threshold used for resource (re)selection based on first SCI and an RSRP threshold used for resource (re) selection based on additional information.

For example, the UE-B may determine whether to include or exclude the corresponding resource from available resources of the UE-B according to a priority value for reserved resources indicated by additional information or first SCI and a transmission priority value of the UE-B. For example, if the priority value for reserved resources indicated by the additional information or the first SCI is less than the transmission priority value of the UE-B and/or if the priority value for reserved resources indicated by the first SCI is less than a (pre-)configured threshold (and if an RSRP measurement value for the corresponding resource used when performing resource (re)selection based on the additional information and/or an RSRP measurement value for the corresponding resource at the time of receiving the first SCI is greater than (each) RSRP threshold), the UE-B may exclude the corresponding resource from available resources of the UE-B.

Meanwhile, the UE-B which has received additional information from the UE-A may fail to detect first SCI in a selected resource/reserved resource indicated by the additional information. This may be a case in which the UE-A reselects the corresponding resource, or a case in which the first SCI reception performance is poor. Or, this may be a case in which the UE-B fails to perform the first SCI detection attempt due to half-duplex restriction.

For example, (Operation-A) if the UE-B does not detect first SCI on the selected resource/reserved resource indicated by additional information, the UE-B may include the corresponding resource in available resources. That is, the corresponding resource may not be considered when selecting resources excluded from a resource selection window.

For example, (Operation-B) even if the UE-B does not detect first SCI on the selected resource/reserved resource indicated by additional information, the UE-B may still not include the corresponding resource in available resources. That is, the corresponding resource may be considered when selecting resources excluded from a resource selection window. For example, if the UE-B does not detect first SCI in a specific slot (e.g., due to transmission of the UE-B), the UE-B may not select/configure/determine, as excluded resources within a resource selection window, all (frequency domain) resources belonging to all or part of slots (e.g., slots after resource reservation periods from the specific slot) derived based on all or part of resource reservation period candidate values (e.g., resource reservation period candidate values greater than or equal to 100 msec or 20 msec among resource reservation period candidate values) configured for a resource pool of the UE-B and the specific slot. That is, for example, the UE-B may select/configure/determine, as excluded resources, only resources determined based on the additional information among all (frequency domain) resources belonging to all or part of slots (e.g., slots after resource reservation periods from the specific slot). In other words, for example, the UE-B may determine a reception pattern related to the specific slot, based on resource information indicated in additional information received by the UE-B in another slot and/or an RSRP measurement value corresponding to the resource information. In this case, for example, if the reception pattern overlaps with a transmission pattern determined based on transmission resource reservation period(s) and a transmission resource reselection counter of the UE-B, the UE-B may exclude the transmission pattern or a combination of a starting subchannel and/or a slot of the transmission pattern from a set of available resources.

For example, (Operation-C) if the UE-B does not detect first SCI in a specific slot (e.g., due to transmission of the UE-B), the UE-B may select/configure/determine, as excluded resources within a resource selection window, all (frequency domain) resources belonging to all or part of slots (e.g., slots after resource reservation periods from the specific slot) derived based on all or part of resource reservation period candidate values (e.g., resource reservation period candidate values greater than or equal to 100 msec or 20 msec among resource reservation period candidate values) configured for a resource pool of the UE-B and the specific slot. In other words, for example, if (i) feasible reception pattern(s) determined based on resource reservation period candidate values from the specific slot and (ii) a transmission pattern determined based on transmission resource reservation period(s) and a transmission resource reselection counter of the UE-B overlap, the UE-B may exclude the transmission pattern or a combination of a starting subchannel and/or a slot of the transmission pattern from a set of available resources.

For example, (Operation-D) if the UE-B does not detect first SCI in a specific slot (e.g., due to transmission of the UE-B), the UE-B may select/configure/determine, as excluded resources within a resource selection window, all frequency domain resources belonging to all or part of slots (e.g., slots after resource reservation periods from the specific slot) derived based on a specific resource reservation period (e.g., (pre-)configured resource reservation period(s) and transmission resource reservation period(s) of the UE-B) and the specific slot. In other words, for example, if (i) feasible reception pattern(s) determined based on the specific resource reservation period from the specific slot and (ii) a transmission pattern determined based on transmission resource reservation period(s) and a transmission resource reselection counter of the UE-B overlap, the UE-B may exclude the transmission pattern or a combination of a starting subchannel and/or a slot of the transmission pattern from a set of available resources.

For example, (Operation-E) the UE-B may exclude (i) a reception pattern derived based on additional information and/or (ii) a transmission pattern of the UE-B overlapping with a reception pattern derived based on a specific resource reservation period according to (Operation-B) and (Operation-D) from a set of available resources of the UE-B.

For example, (Operation-F) the UE-B may exclude (i) a reception pattern derived based on additional information and/or (ii) a transmission pattern of the UE-B overlapping with a reception pattern derived based on a specific resource reservation period according to (Operation-B) and (Operation-C) from a set of available resources of the UE-B. For example, UE-B may derive a set of slots corresponding to the specific slot (e.g., a slot in which SCI is not detected) from all or part of resource reservation period candidate values. In this case, for example, the UE-B may perform (Operation-B) on slots to which resources indicated in additional information belong among the set of slots, and the UE-B may perform (Operation-C) on slots to which resources indicated in additional information does not belong among the set of slots.

For example, which of the above operations is to be performed by the UE-B may be (pre-)configured for each resource pool for the UE-B. For example, the base station/network may transmit information related to an operation to be performed by the UE-B to the UE-B.

For example, UE-B may select (Operation-A), (Operation-B), (Operation-C), (Operation-D) or a combination of the operations, based on a priority value corresponding to resources indicated by additional information, a congestion control level, periodicity or aperiodicity, reception quality of additional information, and/or whether the UE-B receives first SCI at the next resource location of the corresponding resource. For example, if a priority value for the corresponding resource is less than or equal to a specific threshold, the UE-B may select (Operation-B). Otherwise, the UE-B may select (Operation-A). For example, if a priority value for the corresponding resource is greater than or equal to a specific threshold, the UE-B may select (Operation-B), (Operation-D) or (Operation-E). For example, if a priority value for the corresponding resource is less than or equal to a specific threshold, the UE-B may select (Operation-C). In this case, for example, the threshold may be (pre-)configured to the UE for each resource pool and/or for each congestion control level and/or for each QoS parameter. For example, if a received RSRP value for additional information is greater than or equal to a (pre-)configured threshold, the UE-B may select (Operation-B), (Operation-D) or (Operation-E). For example, if a CBR value is less than or equal to a (pre-)configured threshold, the UE-B may select (Operation-B), (Operation-D) or (Operation-E). For example, if a received RSRP value for additional information is less than or equal to a (pre-)configured threshold, the UE-B may select (Operation-C). For example, if a CBR value is greater than or equal to a (pre-)configured threshold, the UE-B may select (Operation-C). For example, the operation method selected/performed by the UE-B may be different based on a ratio of available resources to resources within a resource selection window. For example, when the UE-B determines available resources based on (Operation-C), if the ratio of available resources cannot exceed a (pre-)configured threshold, the UE-B may perform (Operation-B), (Operation-D) or (Operation-E).

Meanwhile, in a resource indicated in additional information, the UE-A may indicate the groupcast HARQ feedback option 1, and the UE-B may fail to detect the corresponding SCI (e.g., first SCI and/or second SCI). In the above case, the UE-B cannot transmit SL HARQ-ACK feedback for the corresponding resource or PSSCH. In addition, the UE-A may determine that the UE-B succeeded in decoding at the corresponding time and did not transmit a PSFCH or SL HARQ-ACK feedback. In this case, because NACK is determined to be ACK, the latency time for a service received by the UE-B may increase or the reliability may decrease. For example, when the UE-A indicates the UE-B to select resources/reservation resources through additional information, the UE-A may also indicate a response method (e.g., a cast type and/or a HARQ-ACK feedback option/method to be used in the corresponding resource) to the UE-B. Or, if the UE-B receives additional information from the UE-A, the UE-B may determine a cast type and a HARQ-ACK feedback option based on information indicated in the corresponding SCI. For example, the UE-B may recognize that the resource indicated by additional information is used for the groupcast HARQ-ACK feedback option 1, and even if the UE-B does not receive first SCI in the indicated resource, the UE-B may transmit NACK. In this case, a PSFCH resource to be used by the UE-B may be determined based on slot information or subchannel information of the resource indicated by the additional information, and/or an L1-source ID indicated by SCI corresponding to a channel used to transmit the additional information.

Based on an embodiment of the present disclosure, the UE-A may transmit all or part of information on a sensing operation performed by the UE-A to the UE-B. For example, the assistance information may include information obtained by the UE-B based on the sensing operation. For example, information on the sensing operation may include at least one of information related to reserved resources indicated by first SCI and/or second SCI and/or a PSSCH detected by the UE-A, information related to a priority, an L1-source-ID, an L1-destination-ID, a HARQ process number and/or information related to an RSRP measurement value. For example, information on the sensing operation may include information on a resource selection window of the UE-A and/or information on (all or part of) resources excluded from target resources to be selected based on sensing within the resource selection window. Herein, the UE-B may consider a resource indicated through SCI detected by the UE-A but not detected by the UE-B when selecting a resource. For example, when the UE-B performs resource (re)selection, the UE-B may not (re)select a resource indicated through SCI detected by the UE-A but not detected by the UE-B based on the above information. That is, based on the above method, interference from a UE that the UE-B is not aware of due to a hidden-node problem can be minimized.

For example, the UE-A may transmit corresponding additional information to the UE-B at a time when a PSSCH resource selection procedure is triggered or after a certain slot offset from the corresponding time. For example, the certain slot offset may be a predefined value. For example, the certain slot offset may be a value determined by the UE-A. For example, the certain slot offset may be a (pre-)configured value. For example, the UE-A may transmit corresponding additional information to the UE-B at a time when selection/reservation resources or the UE-A are determined or after a certain slot offset from the corresponding time. For example, the certain slot offset may be a predefined value. For example, the certain slot offset may be a value determined by the UE-A. For example, the certain slot offset may be a (pre-)configured value. In this case, the UE-A may distinguish available resources, excluded resources, and/or selected resources within a resource selection window of the UE-A based on a sensing operation.

For example, the UE-A may trigger transmission of additional information every (pre-)configured period. In this case, for example, the period may be applied to physical slots. For example, the period may be applied to slots (i.e., logical slots capable of SL communication) in which a symbol period corresponding to the number of SL symbols from an SL start symbol is cell-specific uplink. For example, the period may be applied to logical slots other than S-SSB slots in the logical slots capable of the SL communication. For example, the period may be applied to slots within a transmission resource pool and/or a reception resource pool. For example, the time when transmission of additional information within a period is triggered may be determined from a slot offset (pre-)configured for each resource pool. In this case, for example, the slot offset may be expressed as the number of physical slots with respect to SFN0 or DFN0 as a reference point. For example, the slot offset may be expressed as the number of corresponding logical slots with respect to the first slot of the logical slots capable of SL communication within an SFN cycle or a DFN cycle as a reference point. For example, the slot offset may be expressed as the number of logical slots excluding S-SSB slots with respect to the first slot of the logical slots capable of the SL communication excluding S-SSB slots in an SFN cycle or an DFN cycle as a reference point. For example, the slot offset may be expressed as the number of corresponding logical slots with respect to the first slot of the logical slots belonging to a resource pool within a resource pool period as a reference point. For example, the period and/or the time when transmission of additional information is triggered may be associated with an SL DRX operation cycle of the UE. For example, in the SL DRX operation, a minimum period in which the UE attempts SCI detection and a period in which transmission of additional information is triggered may be the same. For example, in the SL DRX operation, a period in which transmission of additional information is triggered may be configured as a multiple of a minimum period in which the UE attempts SCI detection.

For example, under a specific condition, the UE-A may skip triggering of transmission of additional information in a specific period. For example, under a specific condition, the UE-A may skip transmission of additional information in a specific period. For example, the specific condition may be a case in which reception quality of transmission by the UE-B from the perspective of the UE-A is equal to or higher than a certain level. For example, the UE-A may determine the reception quality by comparing an RSRP measurement value measured based on RS transmitted by the UE-B with a (pre-)configured threshold. For example, the UE-A may determine the reception quality by comparing an RSSI measurement value for a resource occupied by an SL channel transmitted by the UE-B with a (pre-)configured threshold. For example, based on whether the UE-A successfully decodes a PSSCH received from the UE-B, the UE-A may determine the reception quality. For example, based on whether the UE-A fails to decode a PSSCH received from the UE-B, the UE-A may determine the reception quality. For example, based on a ratio of successful decoding of a PSSCH received by the UE-A from the UE-B, the UE-A may determine the reception quality. For example, based on a ratio of failed decoding of a PSSCH received by the UE-A from the UE-B, the UE-A may determine the reception quality. For example, the specific condition may be a case in which the UE-A does not observe a case in which an RSRP measurement value for an SL channel having a specific priority is equal to or greater than a (pre-)configured threshold. For example, the specific condition may be a case in which the UE-A does not change all or part of indicated resources included in additional information. For example, the specific condition may be a case in which resources after transmitting additional information do not change. For example, trigger conditions of additional information of the UE-A may be configured as a combination of trigger conditions of additional information in another embodiment of the present disclosure.

For example, the UE-A may receive a request for additional information (hereinafter, additional information request, additional information request information or request) from the UE-B. In this case, the UE-A may transmit additional information after a certain slot offset from a time of receiving the request for additional information from the UE-B. For example, the UE-A may transmit additional information at a specific time after the UE-B requests additional information. Or, for example, the UE-A may transmit additional information within a specific window after the UE-B requests additional information. For example, the additional information request transmitted by the UE-B may include at least one of reference transmission priority information, a resource domain of interest (e.g., a reference resource selection window), a reference resource reservation period, a reference resource reselection counter, the number of retransmissions, the maximum number of retransmissions, the reference number of subchannels for PSSCH transmission, a cast type, a service type, packet delay budget (PDB) information for additional information, reference PDB information, presence or absence of SL HARQ feedback, a QoS parameter, and/or a type of additional information (e.g., preferred resource, non-preferred resource, operation of receiving additional information, method of using additional information, etc.). In this case, for example, the UE-A may generate/configure additional information based on request information of the UE-B. For example, the (start) location of a resource window corresponding to additional information may be determined based on a time when the UE-A detects the request or a time when the UE-B transmits the request. For example, additional information request information may include a (slot) offset value between a time when the additional information request is transmitted and the (start) location of the resource window to be used for the additional information. For example, the UE-A may recognize when transmission of additional information should be completed based on PDB for the additional information of the UE-B. For example, upon receiving a request for additional information from the UE-B, the UE-A may ignore the request from the UE-B and skip transmission of additional information in a specific situation. For example, the specific situation may include a case in which the UE-A does not have a sensing result for a reference transmission priority and/or a reference resource reservation period included in the request of the UE-B. For example, the specific situation may include a case in which a first time when the UE-A detects the request of the UE-B has passed a second time determined based on reference PDB information, the remaining PDB of the UE-B, or PDB information for the additional information. For example, the specific situation may include a case in which the difference between the first time and the second time is less than or equal to a (pre-)configured/defined threshold. For example, the specific situation may include a case in which the UE-A does not have information on available resources, excluded resources, and/or selected resources within the reference resource selection window included in the request of the UE-B. For example, the specific situation may include a case in which a target UE for the request of the UE-B is not the UE-A. For example, the specific situation may include a case in which an RSRP measurement value measured by the UE-A based on a signal or a channel for the request of the UE-B is less than or equal to a (pre-)configured threshold. For example, the specific situation may include a case in which the UE-A fails to generate additional information related to a cast type requested by the UE-B. For example, the specific situation may include a case in which the UE-A does not support a cast type requested by the UE-B. For example, the specific situation may include a case in which there is no unicast session between the UE-A and the UE-B (even though the request indicates it is for unicast). For example, the UE-A may receive requests for additional information from a plurality of UEs, and the UE-A may generate additional information for the plurality of UEs and transmit the additional information based on one physical channel (e.g., PSCCH/PSSCH). For example, even in the method without the additional information request, the UE-A may generate additional information for a plurality of UE and transmit the additional information by using one physical channel.

For example, the additional information request may be transmitted through a PSCCH and/or a PSSCH. In this case, for example, a priority of the additional information request may be the same as a transmission priority of data/packet of the UE-B. Or, for example, a priority of the additional information request may be a (pre-)configured value. For example, a source ID for the additional information request may be a source ID of the UE-B for a service corresponding to the UE transmitting the request. For example, a source ID for the additional information request may be (pre-)configured. For example, a source ID for the additional information request may be configured through PC5-RRC signaling. For example, a destination ID for the additional information request may be configured through PC5-RRC signaling. For example, a source ID for the additional information request may be (pre-)configured.

For example, the additional information request may be transmitted in the form of a PSFCH. For example, a PSFCH resource to be used for the additional information request may be configured differently from a PSFCH resource for SL HARQ feedback. For example, PRB sets for each PSFCH resource may be configured independently of each other. For example, a PSFCH resource for the additional information request may be (pre-)configured for each UE (group). For example, a PSFCH resource for the additional information request may be configured through PC5-RRC signaling for each UE (group). For example, a PSFCH resource for the additional information request may be selected based on a source ID of the additional information request. For example, a PSFCH resource for the additional information request may be commonly (pre-)configured for UEs. For example, which PSFCH state (e.g., ACK resource or NACK resource) will be used may be configured together with the PSFCH resource.

For example, a PSFCH resource for the additional information request may be selected differently for each source ID (e.g., L1 source ID) for a transmission packet of the UE transmitting the request and/or priority value for the transmission packet and/or buffer status for the transmission packet and/or buffer status for the UE and/or amount of remaining packets for the transmission packet and/or amount of resources requested by the UE. For example, a PSFCH resource to be used for the additional information request may be selected by a combination of the above parameters. For example, the UE transmitting the additional information request may select/determine a PSFCH resource for the additional information request based on a source ID (e.g., L1 source ID) related to a transmission packet. For example, the UE transmitting the additional information request may select/determine a PSFCH resource for the additional information request based on a priority value related to a transmission packet. For example, the UE transmitting the additional information request may select/determine a PSFCH resource for the additional information request based on a buffer status related to a transmission packet. For example, the UE transmitting the additional information request may select/determine a PSFCH resource for the additional information request based on a buffer status of the UE. For example, the UE transmitting the additional information request may select/determine a PSFCH resource for the additional information request based on the amount of remaining packets related to a transmission packet. For example, the UE transmitting the additional information request may select/determine a PSFCH resource for the additional information request based on the amount of resources to be requested by the UE.

For example, a specific RB set may be determined among PSFCH resources including a plurality of RB sets, based on the amount of remaining packets corresponding to a transmission packet of the UE transmitting the request and/or the number of subchannels to be requested and/or a priority value corresponding to the transmission packet. For example, the PSFCH resources may include a plurality of RB sets, and one RB set may include one or more RBs. For example, the UE transmitting the additional information request may select/determine a specific RB set from among PSFCH resources including a plurality of RB sets based on the amount of remaining packets corresponding to a transmission packet. For example, the UE transmitting the additional information request may select/determine a specific RB set from PSFCH resources including a plurality of RB sets based on the number of subchannels to be requested. For example, the UE transmitting the additional information request may select/determine a specific RB set from PSFCH resources including a plurality of RB sets based on a priority value corresponding to a transmission packet.

For example, a PSFCH RB and/or a cyclic shift value and/or a cyclic shift pair index value within the specific RB set value may be determined based on a source ID (e.g., L1 source ID) corresponding to a transmission packet of the UE transmitting the request. For example, the UE transmitting the additional information request may select/determine at least one of a PSFCH RB, a cyclic shift value, and/or a cyclic shift pair index value within the specific RB set.

For example, even for the same UE, according to the amount of resources requested for transmission packet information of the UE, the UE may select different PSFCH resources to transmit the additional information request, and the UE may transmit the additional information request based on the selected PSFCH resource. For example, even for the same UE, for a case in which the amount of remaining packets is less or greater (than a threshold configured for the UE), the UE may select different PSFCH resources to transmit the additional information request, and the UE may transmit the additional information request based on the selected PSFCH resource. For example, the UE receiving the additional information request may distinguish/determine a UE transmitting the request (by using an L1 source ID) based on the detected PSFCH resource, and/or may determine the amount of resources to be allocated.

For example, a PSFCH resource for transmitting the additional information request may be allocated for each UE group, and UEs in the same group may share a PSFCH resource related to the additional information request. Specifically, for example, the UE group may be configured for the UE through higher layer signaling (e.g., PC5-RRC, PC5S-RRC, MAC CE, AS layer signaling, and/or V2X layer signaling, etc.). For example, the UE may receive information related to the UE group through higher layer signaling (e.g., PC5-RRC, PC5S-RRC, MAC CE, AS layer signaling, and/or V2X layer signaling, etc.).

For example, the UE group may be determined based on a geographic distance or direction between UEs receiving the additional information request and/or location information of UEs. For example, the UE group may be determined based on RSRP values measured from UEs receiving the additional information request. For example, the UE group may be determined based on a range of RSRP values measured from UEs receiving the additional information request.

For example, if a UE within a UE group determines that a preferred resource derived based on additional information for the UE group is more needed, the UE may transmit request signaling corresponding to the UE group to a UE transmitting additional information (e.g., a UE capable of transmitting additional information or a UE transmitting additional information) or a UE receiving the additional information request. For example, if a UE within a UE group determines that a preferred resource derived based on additional information for the UE group can be reduced, the UE may transmit request signaling corresponding to the UE group to a UE transmitting additional information (e.g., a UE capable of transmitting additional information or a UE transmitting additional information) or a UE receiving the additional information request. For example, the type or value of the request signaling may be configured/determined differently depending on whether the UE increases or decreases preferred resources that can be derived based on additional information for the UE group.

For example, whether or not the preferred resource is insufficient may be determined depending on whether the ratio or number of available resources derived based on additional information and/or sensing information of the UE within a resource (re)selection window in a resource (re)selection procedure by the UE is less than or equal to a (pre-)configured threshold. For example, if the ratio or number of available resources derived by the UE based on additional information and/or sensing information of the UE within the resource (re)selection window is less than or equal to a (pre-)configured threshold, the UE may determine that the preferred resource is insufficient. For example, if the ratio or number of available resources derived by the UE based on additional information and/or sensing information of the UE within the resource (re)selection window is greater than or equal to a (pre-)configured threshold, the UE may determine that the preferred resource is not insufficient (i.e., the preferred resource can be reduced).

For example, whether or not the preferred resource is insufficient may be determined depending on whether the UE boosts an RSRP threshold for a resource selection procedure in the resource (re)selection procedure. For example, if the UE boosts the RSRP threshold for resource selection in the process of performing resource (re)selection, the UE may determine that the preferred resource is insufficient. For example, if the UE does not boost the RSRP threshold for resource selection in the process of performing resource (re)selection, the UE may determine that the preferred resource is not insufficient (i.e., the preferred resource can be reduced).

For example, the UE transmitting additional information may receive a PSFCH related to an additional information request (i.e., a PSFCH for the additional information request) from a single UE group or a plurality of UE groups. In this case, for example, the UE transmitting the additional information may determine additional information for the UE group transmitting the additional information request according to a PSFCH type or a PSFCH value. For example, the UE transmitting the additional information may determine to increase the amount of preferred resources for the UE group transmitting the additional information request according to the PSFCH type or the PSFCH value. For example, the UE transmitting the additional information may determine to reduce the amount of preferred resources for the UE group transmitting the additional information request according to the PSFCH type or the PSFCH value. For example, the UE transmitting the additional information may determine to maintain the amount of preferred resources for the UE group transmitting the additional information request according to the PSFCH type or the PSFCH value.

For example, if the UE transmitting the additional information increases the amount of resources based on the additional information request, the UE may boost an RSRP threshold and then determine non-preferred resources based on sensing by using the boosted RSRP threshold. For example, if the UE transmitting the additional information reduces the amount of resources based on the additional information request, the UE may de-boost an RSRP threshold and then determine non-preferred resources based on sensing by using the de-boosted RSRP threshold.

For example, a value which is a unit of boosting and/or de-boosting for the RSRP threshold may be configured or pre-configured for the UE for each resource pool. For example, a value which is a unit of boosting and/or de-boosting for the RSRP threshold may be configured or pre-configured for the UE for each reference transmission priority. For example, a value which is a unit of boosting and/or de-boosting for the RSRP threshold may be configured or pre-configured for the UE for each reception priority included/indicated in SCI received by the UE. For example, a value which is a unit of boosting and/or de-boosting for the RSRP threshold may be configured or pre-configured for the UE for each congestion control level. For example, a value which is a unit of boosting and/or de-boosting for the RSRP threshold may be configured or pre-configured for the UE for each UE group.

For example, the UE may determine whether boosting and/or de-boosting is applied to the RSRP threshold and the number of boosting and/or de-boosting applied to the RSRP threshold only based on a request immediately before transmission of previous additional information. For example, the UE may determine whether boosting and/or de-boosting is applied to the RSRP threshold and the number of boosting and/or de-boosting applied to the RSRP threshold by accumulating requests immediately before transmission of previous additional information. For example, if the UE transmitting additional information does not receive an additional information request during a specific time period, the UE may cancel/reset boosting and/or de-boosting applied to the RSRP threshold. For example, the specific time period may be configured or pre-configured for the UE for each resource pool. For example, the specific time period may be configured or pre-configured for the UE for each reference transmission priority. For example, the specific time period may be configured or pre-configured for the UE for each reception priority included/indicated in SCI received by the UE. For example, the specific time period may be configured or pre-configured for the UE for each congestion control level. For example, the specific time period may be configured or pre-configured for the UE for each UE group.

Figure 12:
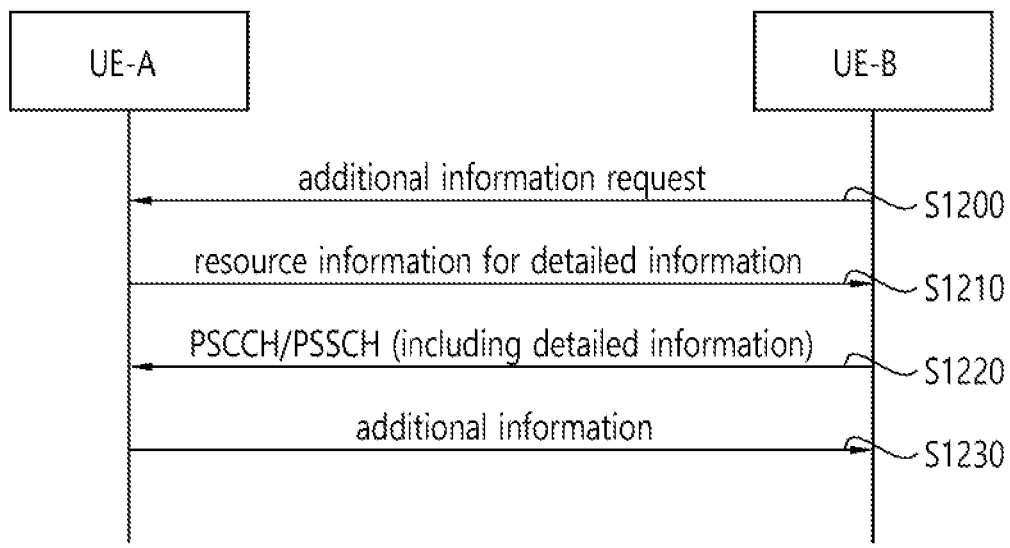
FIG. 12 shows a procedure for the UE-A to transmit assistance information to the UE-B, based on an embodiment of the present disclosure.

FIG. 12 shows a procedure for the UE-A to transmit assistance information to the UE-B, based on an embodiment of the present disclosure. The embodiment of FIG. 12 may be combined with various embodiments of the present disclosure.

Referring to FIG. 12, in step S1200, for example, a UE transmitting an additional information request may request resource allocation information and/or available resource information in the form of a PSFCH resource from a UE transmitting additional information.

In step S1210, for example, in order to obtain detailed information (e.g., additional request information or detailed information) related to the request from the UE transmitting the additional information request, the UE receiving the additional information request may transmit available or recommended resource information for PSCCH/PSSCH transmission to the UE transmitting the request. For example, in order to obtain detailed information (e.g., additional request information or detailed information) related to the request from the UE transmitting the additional information request, the UE receiving the additional information request may transmit unavailable or unrecommended resource information for PSCCH/PSSCH transmission to the UE transmitting the request.

In step S1220, for example, the UE which has received resource information regarding PSCCH/PSSCH for additional request information from another UE may transmit a PSCCH/PSSCH based on the resource information. Herein, for example, at least one of reference transmission priority information, resource domain of interest (e.g., reference resource selection window), a reference resource reservation period, a reference resource reselection counter, the number of retransmissions, the maximum number of retransmissions, the reference number of subchannels for PSSCH transmission, a cast type, a service type, PDB information for additional information, reference PDB information, presence or absence of SL HARQ feedback, a QoS parameter, and/or a type of additional information (e.g., preferred resource, non-preferred resource, operation of receiving additional information, method of using additional information, etc.) may be transmitted through the PSCCH/PSSCH. For example, the reference parameters may be inherited from parameters of a transmission packet of the UE which has transmitted the detailed information related to the additional information request.

In step S1230, for example, the UE which has received the detailed information related to the additional information request may provide/transmit, to the UE transmitting the additional information request, resource information (e.g., preferred resource information or non-preferred resource information) that can be used for resource reselection for data transmission by the UE transmitting the additional information request, based on the reference parameter(s). For example, the UE receiving additional information may use the additional information to (re)select a resource to be used for future data transmission. That is, for example, the UE receiving additional information may (re)select a resource to be used for future data transmission based on the additional information.

For example, the process of transmitting the requested detailed information after transmitting the additional information request may be skipped in a specific situation. For example, the specific situation may be a case in which the UE which has transmitted the additional information request can transmit remaining packets only with the resource information received in response to the additional information request (i.e., the resource information received in S1210). For example, the specific situation may be a case in which the remaining PDB for a transmission packet of the UE which has transmitted the additional information request is less than or equal to a predefined or (pre-)configured threshold. For example, the specific situation may be a case in which the request procedure for the detailed information and/or the transmission procedure for the detailed information is not (pre-)configured for the UE. In other words, the request for the detailed information and/or the transmission of the detailed information may be performed by the UE only if the corresponding operation is (pre-)configured for the UE.

Meanwhile, PSFCH transmission and/or reception for SL HARQ feedback of the UE and PSFCH transmission and/or reception for an additional information request of the UE may overlap in the same slot. In this case, for example, in simultaneous transmission, the UE needs to skip some PSFCH transmissions. For example, when PSFCH transmission and reception overlap, the UE needs to perform only one operation. In this case, for example, the UE may determine a PSFCH to be transmitted or received according to a priority related to a PSFCH for the additional information request. For example, a priority of PSFCH transmission and reception for SL HARQ feedback may be higher than a priority of PSFCH transmission and reception for an additional information request. For example, a priority of PSFCH transmission and reception for SL HARQ feedback may be lower than a priority of PSFCH transmission and reception an additional information request. For example, a priority of PSFCH transmission and/or reception for SL HARQ-ACK feedback and a priority of PSFCH transmission and/or reception related to additional information may be determined based on a priority value corresponding to each PSFCH. For example, a priority of a PSFCH for the additional information request may be a priority value for a TX packet of the UE transmitting the request. For example, in this case, a UE receiving the PSFCH may not know the priority value of the TX packet of the other UE. In this case, a priority value for PSFCH reception of the UE may be (pre-)configured. For example, a priority of a PSFCH for the additional information (e.g., resource conflict indication) may be a priority value of a PSSCH transmitted in a resource where the resource conflict occurs, which is the purpose of transmitting the additional information. For example, the priority value of the PSSCH corresponding to the resource conflict may be obtained based on SCI received by the UE transmitting the additional information. For example, if there are a plurality of PSSCHs corresponding to the resource conflict, the UE transmitting the additional information may inherit a priority value corresponding to a PSSCH transmitted by a UE targeted for the additional information, and/or may inherit the maximum priority value or the minimum priority value for the plurality of PSSCHs. For example, from the point of view of a UE expecting to receive the additional information, a priority of a PSFCH for the additional information may inherit a priority value of a PSSCH transmitted by the UE. For example, a priority value of a PSFCH related to the additional information may be (pre-)configured for each resource pool and/or for each congestion control level. For example, a priority value of a PSFCH related to the additional information may be (pre-)configured separately for a case of PSFCH transmission and a case of PSFCH reception. For example, specifically, when the UE determines a priority for PSFCH transmission and/or reception for SL HARQ-ACK feedback and a priority for PSFCH transmission and/or reception related to additional information based on priority values, the UE may preferentially select one operation from PSFCH transmission or PSFCH reception. For example, the UE may select one operation of PSFCH transmission or PSFCH reception based on priority values of PSFCH transmission and reception for SL HARQ-ACK feedback. For example, based on priority values of PSFCH transmission and/or reception for SL HARQ-ACK feedback and priority values for PSFCH transmission and/or reception related to additional information, the UE may select an operation (e.g., PSFCH transmission or PSFCH reception) corresponding to a smaller value between the minimum priority value for transmission and the minimum priority value for reception. For example, if the minimum priority value of the PSFCH transmission group and the minimum priority value of the PSFCH reception group are the same, the UE may compare the next highest priority value in each group. In addition, the UE may perform an operation (e.g., PSFCH transmission or PSFCH reception) corresponding to the smaller value between the corresponding priority value of transmission (i.e., the second smallest transmission priority value) and the corresponding priority value of reception (i.e., the second smallest reception priority value). For example, the operation of comparing the next priority value may be extended to a form of comparing the next priority value when the second priority value is the same. For example, if there is no next priority value for each group, for the group, the current priority value may be used for priority comparison again. For example, if it is determined that priorities of the PSFCH transmission operation and the PSFCH reception operation are the same, the UE may select the PSFCH transmission operation if there is PSFCH transmission related to the additional information, and the UE may select the PSFCH reception operation if there is PSFCH reception related to the additional information. For example, a set of PSFCH resources related to additional information may be configured separately from a set of PSFCH resources for SL HARQ-ACK feedback. In this case, an index value for the set of PSFCH resources may be used when prioritizing PSFCH transmission and reception. For example, after the UE selects a PSFCH or a PSFCH group based on a priority value of the PSFCH, for the same priority, the UE may determine that the priority is higher as the index value for the set of PSFCH resources is higher. For example, after the UE selects a PSFCH or a PSFCH group based on a priority value of the PSFCH, for the same priority, the UE may determine that the priority is higher as the index value for the set of PSFCH resources is lower. For example, the UE may determine that the priority is higher as the index value for the set of PSFCH resources is higher or lower, and then the UE may determine a priority for PSFCH transmission and/or reception based on the priority value for the PSFCH or the PSFCH group.

For example, if the UE determines PSFCH transmission, the UE may select a PSFCH to transmit by determining that a group having the lowest priority value has a high priority among the PSFCH transmission group for SL HARQ-ACK feedback and the PSFCH transmission group corresponding to additional information. For example, if the UE determines PSFCH transmission, the UE may select a PSFCH to transmit, among PSFCH transmissions within the PSFCH transmission group for SL HARQ-ACK feedback and the PSFCH transmission group corresponding to additional information, by determining that the priority is higher as the priority value is smaller.

In the embodiment, a PSFCH for an additional information request may be replaced with or extended to PSFCH transmission and reception other than SL HARQ-ACK feedback, such as a PSFCH for transmitting additional information and/or a PSFCH for determining a UE for transmitting and receiving additional information, etc.

For example, the UE-B may transmit an additional information request to the UE-A in a specific situation. For example, the specific situation may be a case in which the UE-B intends to perform transmission to the UE-A or a third UE which is UE-C, or a case in which the UE-B triggers resource (re)selection. For example, the specific situation may be after the UE-B determines a selected resource for PSCCH/PSSCH transmission. For example, the specific situation may be a case in which a ratio of received NACKs and/or DTXs (or received ACKs) to all SL HARQ-ACK feedback that the UE-B, which has transmitted TB(s) based on HARQ-ACK feedback, expects to receive from the UE-A or the UE-C is greater than or equal to a (pre-)configured threshold. For example, in the NACK or the DTX, a portion corresponding to priority-based PSFCH skipping may be excluded.

For example, the UE-B may determine a set of available resources of the UE-B based on additional information received from the UE-A.

For example, (Operation-1) if the UE-B does not detect first SCI in a specific slot (e.g., due to transmission of the UE-B), the UE-B may select/configure/determine, as excluded resources within a resource selection window, all frequency domain resources belonging to all or part of slots (e.g., slots after resource reservation periods from the specific slot) derived based on all or part of resource reservation period candidate values (e.g., resource reservation period candidate values greater than or equal to 100 msec or 20 msec among resource reservation period candidate values) configured for a resource pool of the UE-B and the specific slot. In other words, for example, if (i) feasible reception pattern(s) determined based on resource reservation period candidate values from the specific slot and (ii) a transmission pattern determined based on transmission resource reservation period(s), a transmission resource reselection counter, a transmission priority, and the number of transmission subchannels of the UE-B overlap, the UE-B may exclude the transmission pattern or a combination of a starting subchannel and/or a slot of the transmission pattern from a set of available resources.

For example, (Operation-2) if the UE-B does not detect first SCI in a specific slot (e.g., due to transmission of the UE-B), the UE-B may select/configure/determine, as excluded resources within a resource selection window, all frequency domain resources belonging to all or part of slots (e.g., slots after resource reservation periods from the specific slot) derived based on a specific resource reservation period (e.g., (pre-)configured resource reservation period(s) and transmission resource reservation period(s) of the UE-B) and the specific slot. In other words, for example, if (i) feasible reception pattern(s) determined based on the specific resource reservation period from the specific slot and (ii) a transmission pattern determined based on transmission resource reservation period(s), a transmission resource reselection counter, a transmission priority, and the number of transmission subchannels of the UE-B overlap, the UE-B may exclude the transmission pattern or a combination of a starting subchannel and/or a slot of the transmission pattern from a set of available resources.

For example, (Operation-3) if the UE-B does not detect first SCI in a specific slot (e.g., due to transmission of the UE-B), the UE-B may not select, as excluded resources within a resource selection window, all (frequency domain) resources belonging to all or part of slots (e.g., slots after resource reservation periods from the specific slot) derived based on all or part of resource reservation period candidate values (e.g., resource reservation period candidate values greater than or equal to 100 msec or 20 msec among resource reservation period candidate values) configured for a resource pool of the UE-B and the specific slot. That is, for example, the UE-B may select/configure/determine, as excluded resources, only resources determined based on the additional information among all (frequency domain) resources belonging to all or part of slots (e.g., slots after resource reservation periods from the specific slot). In other words, for example, the UE-B may determine a reception pattern related to the specific slot based on resource information indicated in additional information received by the UE-B in another slot. In this case, for example, if the reception pattern overlaps with a transmission pattern determined based on transmission resource reservation period(s), a transmission resource reselection counter, a transmission priority, and the number of transmission subchannels of the UE-B, and/or if an RSRP value corresponding to the reception pattern is greater than or equal to an RSRP threshold, the UE-B may exclude the transmission pattern or a combination of a starting subchannel and/or a slot of the transmission pattern from a set of available resources. For example, the RSRP value corresponding to the reception pattern may be indicated by additional information. For example, the additional information may include the RSRP value corresponding to the reception pattern. For example, the RSRP value corresponding to the reception pattern may be measured by the UE-B based on signaling related to additional information. For example, the RSRP threshold may be determined based on the transmission priority and a priority of the reception pattern.

For example, (Operation-4) if the UE-B does not detect first SCI in a specific slot (e.g., due to transmission of the UE-B), the UE-B may select/configure/determine, as excluded resources, resources determined based on the additional information and all (frequency domain) resources belonging to all or part of slots (e.g., slots after resource reservation periods from the specific slot) derived based on a specific resource reservation period candidate values (e.g., (pre-)configured resource reservation period(s) and transmission resource reservation period(s) of the UE-B) and the specific slot. In other words, for example, the UE-B may determine a reception pattern for the specific slot based on (i) all (frequency domain) resources in slot(s) derived based on the specific resource reservation period and (ii) resource information indicated in additional information received by the UE-B in another slot. In this case, for example, if the reception pattern overlaps with a transmission pattern determined based on transmission resource reservation period(s), a transmission resource reselection counter, a transmission priority, and the number of transmission subchannels of the UE-B, and/or if an RSRP value corresponding to the reception pattern is greater than or equal to an RSRP threshold, the UE-B may exclude the transmission pattern or a combination of a starting subchannel and/or a slot of the transmission pattern from a set of available resources. For example, the RSRP value corresponding to the reception pattern may be indicated by additional information. For example, the additional information may include the RSRP value corresponding to the reception pattern. For example, the RSRP value corresponding to the reception pattern may be measured by the UE-B based on signaling related to additional information. For example, the RSRP threshold may be determined based on the transmission priority and a priority of the reception pattern. For example, in the above case, there may be no RSRP corresponding to a specific reception pattern. In this case, the UE-B may exclude a transmission pattern overlapping the specific reception pattern from a set of available resources regardless of the RSRP value.

For example, (Operation-5) if the UE-B does not detect first SCI in a specific slot (e.g., due to transmission of the UE-B), the UE-B may select/configure/determine, as excluded resources, resources determined based on the additional information and all (frequency domain) resources belonging to all or part of slots (e.g., slots after resource reservation periods from the specific slot) derived based on resource reservation period candidate values configured for a resource pool of the UE-B (e.g., resource reservation period candidate value(s) which is only 20 msec or more or 100 msec or more) and the specific slot. In this case, for example, among slots derived based on the resource reservation period candidate values, a slot to which a resource indicated in additional information belongs may be excluded. That is, for example, the UE-B may determine available resources for a slot indicated by additional information based on a frequency domain resource indicated in the additional information, and the UE-B may determine available resources for the remaining slots corresponding to the specific slot based on all frequency domain resources. In other words, for example, in order to determine available resources, the UE-B may determine a reception pattern corresponding to the specific slot, based on all or part of slots (e.g., slots after resource reservation periods from the specific slot) derived based on resource reservation period candidate values configured for a resource pool of the UE-B (e.g., only candidate values greater than or equal to 20 msec or greater than or equal to 100 msec), and the UE-B may determine a frequency domain reception pattern in the slot based on additional information, for slots corresponding to resources indicated by additional information among the slots, and the UE-B may determine a reception pattern such that all frequency domain resources are included for the remaining slots. In this case, for example, if the reception pattern overlaps with a transmission pattern determined based on transmission resource reservation period(s), a transmission resource reselection counter, a transmission priority, and the number of transmission subchannels of the UE-B, and/or if an RSRP value corresponding to the reception pattern is greater than or equal to an RSRP threshold, the UE-B may exclude the transmission pattern or a combination of a starting subchannel and/or a slot of the transmission pattern from a set of available resources. For example, the RSRP value corresponding to the reception pattern may be indicated by additional information. For example, the additional information may include the RSRP value corresponding to the reception pattern. For example, the RSRP value corresponding to the reception pattern may be measured by the UE-B based on signaling related to additional information. For example, the RSRP threshold may be determined based on the transmission priority and a priority of the reception pattern. For example, in the above case, there may be no RSRP corresponding to a specific reception pattern. In this case, the UE-B may exclude a transmission pattern overlapping the specific reception pattern from a set of available resources regardless of the RSRP value.

For example, which of the above operations is to be performed by the UE-B may be (pre-)configured for each resource pool for the UE-B. For example, the base station/network may transmit information related to an operation to be performed by the UE-B to the UE-B.

For example, UE-B may select (Operation-1), (Operation-2), (Operation-3), (Operation-4), (Operation-5) or a combination of the operations, based on a priority value corresponding to resources indicated by additional information, a congestion control level, periodicity or aperiodicity, reception quality of additional information, and/or whether the UE-B receives first SCI at the next resource location of the corresponding resource. For example, if a priority value for the corresponding resource is less than or equal to a specific threshold, the UE-B may select (Operation-1). For example, if a priority value for the corresponding resource is greater than or equal to a specific threshold, the UE-B may select (Operation-2), (Operation-3) or (Operation-4). In this case, for example, the threshold may be (pre-)configured to the UE for each resource pool. For example, the threshold may be (pre-)configured to the UE for each congestion control level. For example, the threshold may be (pre-)configured to the UE for each QoS parameter. For example, if a received RSRP value for additional information is greater than or equal to a (pre-)configured threshold, the UE-B may select (Operation-2), (Operation-3) or (Operation-4). For example, if a CBR value is less than or equal to a (pre-)configured threshold, the UE-B may select (Operation-2), (Operation-3) or (Operation-4). For example, if a received RSRP value for additional information is less than or equal to a (pre-)configured threshold, the UE-B may select (Operation-1). For example, if a CBR value is greater than or equal to a (pre-)configured threshold, the UE-B may select (Operation-1). For example, the operation method selected/performed by the UE-B may be different based on a ratio of available resources to resources within a resource selection window. For example, when the UE-B determines available resources based on (Operation-1), if the ratio of available resources cannot exceed a (pre-)configured threshold, the UE-B may perform (Operation-2), (Operation-3) or (Operation-4).

For example, the UE-B may re-evaluate selected resources reserved for PSCCH/PSSCH transmission of the UE-B based on additional information received from the UE-A. For example, the additional information may be a set of preferred resources for PSCCH/PSSCH transmission of the UE-B. In this case, if all or part of reserved resources which the UE-B has already selected in a resource (re)selection procedure do not belong to the set of preferred resources indicated by the additional information, the UE-B may report re-evaluation, pre-emption, or a third state for the resources to a higher layer (e.g., MAC layer). For example, the additional information may be a set of non-preferred resources for PSCCH/PSSCH transmission of the UE-B. In this case, if all or part of reserved resources which the UE-B has already selected in a resource (re)selection procedure overlap with the non-preferred resources indicated by the additional information, the UE-B may report re-evaluation, pre-emption, or a third state for the resources to a higher layer (e.g., MAC layer).

For example, before the UE-B transmits the resource reservation information through SCI or the like, the UE-B may report, to a higher layer, re-evaluation, pre-emption, or a third state for reserved resources that do not match additional information. For example, if the UE-B has already transmitted the resource reservation information through SCI or the like and/or if a pre-emption priority value is (pre-)configured for the UE and/or if a transmission priority value for reserved resources of the UE-B is greater than or equal to the pre-emption priority value and/or if a priority value for additional information or a set of preferred resources indicated by additional information is less than the pre-emption priority value and/or if a priority value for additional information or a set of preferred resources indicated by additional information is less than the transmission priority value for reserved resources of the UE-B, the UE-B may report, to a higher layer, pre-emption, or a third state for reserved resources that do not match additional information.

For example, if the UE-B has already transmitted the resource reservation information through SCI and/or if a pre-emption priority value is (pre-)configured for the UE and/or if a transmission priority value for reserved resources of the UE-B is greater than or equal to the pre-emption priority value and/or if a priority value for additional information or a set of non-preferred resources indicated by additional information is less than the pre-emption priority value and/or if a priority value for additional information or a set of non-preferred resources indicated by additional information is less than the transmission priority value for reserved resources of the UE-B, the UE-B may report, to a higher layer, pre-emption, or a third state for reserved resources that do not match additional information.

Based on an embodiment of the present disclosure, the UE-A may transmit, to the UE-B, information related to time domain resource(s) through which the UE-A cannot perform SL reception and/or information related to time domain resource(s) through which the UE-A can perform SL reception. For example, the UE-A may transmit, to the UE-B, information related to frequency domain resource(s) through which the UE-A cannot perform SL reception and/or information related to frequency domain resource(s) through which the UE-A can perform SL reception. For example, the assistance information may include information related to time domain resource(s) through which the UE-A cannot perform SL reception and/or information related to time domain resource(s) through which the UE-A can perform SL reception. For example, the assistance information may include information related to frequency domain resource(s) through which the UE-A cannot perform SL reception and/or information related to frequency domain resource(s) through which the UE-A can perform SL reception. For example, the UE-A may transmit, to the UE-B, information related to time domain resource(s) and/or information related to frequency domain resource(s) in which the UE-A may have low reception performance. For example, the UE-A may transmit, to the UE-B, information related to time domain resource(s) and/or information related to frequency domain resource(s) in which the UE-A may have high reception performance. For example, the low reception performance may refer to that a target error probability is greater than or equal to a specific threshold. For example, the high reception performance may refer to that a target error probability is less than or equal to a specific threshold. For example, the low reception performance may refer to that a target SINR and/or a target SNR is less than or equal to a specific threshold. For example, the high reception performance may refer to that a target SINR and/or a target SNR is greater than or equal to a specific threshold. For example, the low reception performance may refer to that a target interference level is greater than or equal to a specific threshold. For example, the high reception performance may refer to that a target interference level is less than or equal to a specific threshold. That is, if the UE-A intends to receive PSCCH/PSSCH from the UE-B, the UE-A may transmit information related to preferred resource(s) and/or information related to non-preferred resource(s) to the UE-B. In this case, the UE-B may transmit PSCCH/PSSCH to a UE group including at least UE-A by using resource(s) other than the non-preferred resource(s). For example, the UE-B may transmit PSCCH/PSSCH to a UE group including at least UE-A by preferentially using the preferred resource(s). For example, the UE-A may determine/configure a domain in which reception is not possible and/or a domain in which reception is possible, based on time when SL transmission is scheduled and/or time when UL transmission is scheduled and/or time when DL reception is scheduled. For example, the UL transmission and/or the DL reception may be limited to transmission/reception satisfying a specific condition (e.g., URLLC (e.g., corresponding to priority index 1)). For example, the UL transmission and/or the DL reception may be limited to transmission/reception corresponding to system information and/or paging and/or random access (e.g., PRACH and/or MsgA and/or Msg3 and/or random access response and/or MsgB). For example, the UL transmission or the DL reception may be periodic transmission or reception. For example, the DL reception may be information regarding a slot and/or a symbol through which the UE-A receives an SPS PDSCH. For example, the UL transmission may be information regarding a slot and/or a symbol through which the UE-A reports periodic CSI or SPS CSI. For example, the UL transmission may be information regarding a PUSCH resource corresponding to a configured grant (CG) of the UE-A. For example, when the UE-A actually uses the PUSCH resource corresponding to the CG, corresponding resource information may be included in assistance information. For example, information related to a time domain resource in which the UE-A cannot receive SL may be information regarding a time period in which the UE-A performs LTE SL communication. For example, the information regarding the time period for performing the LTE SL communication may be information regarding NR slots and/or symbols overlapping the time period for transmitting or receiving an LTE SL synchronization signal and/or a PSBCH and/or a semi-periodic PSCCH/PSSCH. For example, in the case of the periodic PSCCH/PSSCH transmission/reception, the UE-A may know a resource reservation period. This is because in the case of LTE V2X, the PSCCH/PSSCH may also be transmitted periodically in consideration of periodic traffic. For example, regarding the time when periodic transmission and reception of the PSCCH/PSSCH ends or thereafter, the UE-A may still consider the corresponding resources as reserved resources and determine that NR SL reception is impossible during the time period. Or, for example, regarding the time when periodic transmission and reception of the PSCCH/PSSCH ends or thereafter, the UE-A may determine to exclude corresponding resources from the time period in which NR SL reception is impossible. For example, from the point of view of the UE-A, the time when NR SL transmission is scheduled may be resource information regarding selected resources of the UE-A. Meanwhile, NR SL transmission of the UE-A may be transmitted in a different resource (due to resource reselection of the UE-A) due to LTE SL transmission and reception and/or UL transmission of the UE-A. Meanwhile, based on congestion control, the UE-A may change all or part of selected resources for SL transmission. For example, information regarding the time when NR SL transmission is scheduled may include resources newly added by resource re-evaluation and/or pre-emption of the UE-A. For example, information regarding a resource which has been canceled due to resource re-evaluation and/or pre-emption of the UE-A may be excluded from information regarding the time when NR SL transmission is scheduled. For example, information regarding the time when NR SL transmission is scheduled may still include information regarding a resource which has been canceled due to resource re-evaluation and/or pre-emption of the UE-A.

In this case, for example, the location of the periodic resources may be indicated by the form of a period and/or a physical slot offset value for a physical slot. For example, the location of the periodic resources may be limitedly indicated for cell-specific UL slots or slots including UL resources. In this case, for example, the slot including the UL resource may be a slot in which a symbol period corresponding to the number of SL symbols from an SL start symbol is the UL resource. For example, the location of the periodic resources may be limitedly indicated for slots in which SL communication is possible. In this case, for example, S-SSB slots may be excluded from the slots in which SL communication is possible. For example, the location of the periodic resources may be limitedly indicated for slots in a resource pool.

For example, the UE-A may determine/configure a corresponding resource, based on whether an RSRP measurement value for each resource (e.g., slot, subchannel, group of slots and/or group of subchannels) is higher than or lower than a specific threshold through a sensing operation. For example, the specific threshold may be (pre-)configured, pre-defined, or selected by UE implementation. For example, the UE-A may determine/configure a corresponding resource, based on an SINR estimation value and/or an RSSI measurement value for each resource (e.g., slot, subchannel, group of slots, and/or group of subchannels).

For example, when the UE-A transmits additional information to the UE-B, the UE-A may indicate preferred resources and/or non-preferred resources for transmission of the UE-B, based on a sensing result of the UE-A and/or other additional information received by the UE-A and/or information regarding a time when the UE-A cannot receive SL reception. Meanwhile, the UE-A may not be able to express all preferred resources and/or all non-preferred resources due to the limitation of the payload size of additional information. In addition, meanwhile, when transmitting in the form of non-contiguous resources for preferred resources, the required payload size may become too large. For example, the UE-A may simultaneously transmit a preferred resource and a non-preferred resource. For example, the preferred resource may indicate continuous time resources and/or frequency resources. For example, the non-preferred resource may indicate discontinuous time resources and/or frequency resources within the preferred resource. For example, upon receiving the additional information from the UE-A, the UE-B may select an available resource by prioritizing a resource in the preferred resource, while the UE-B may exclude the non-preferred resource. For example, upon receiving the additional information from the UE-A, the UE-B may select an available resource by prioritizing a resource in the preferred resource, and the UE-B may lower the priority such that the non-preferred resource is excluded.

Meanwhile, PSFCH transmission and PSFCH reception of the UE-A may overlap in the same slot. In this case, the UE-A may skip one of PSFCH transmission or PSFCH reception. Due to the skipping operation, the UE which needs to receive the corresponding PSFCH may process the corresponding SL HARQ-ACK feedback information as NACK (in unicast or the groupcast HARQ-ACK feedback option 2). In this case, ACK may be treated as NACK, which may increase retransmission resources. Or, due to the skipping operation, the UE which needs to receive the corresponding PSFCH may process the corresponding SL HARQ-ACK feedback information as ACK (in the groupcast HARQ-ACK feedback option 1). In this case, NACK may be treated as ACK, which may increase the latency time. For example, the UE-A may include information regarding all or part of slots in which the UE-A performs PSFCH transmission in additional information. For example, the slot may be a slot belonging to a reference time period (e.g., the reference time period is (pre-)configured or indicated through additional information). For example, the UE-A may include information on how many PSFCH transmissions are scheduled or expected for PSFCH transmission slots in additional information. In this case, for example, the UE-B which has received the additional information may transmit a PSCCH/PSSCH to the UE-A by avoiding PSSCH resources associated with PSFCH slots indicated by the additional information. For example, if the UE-B determines that the UE-A can further transmit a PSFCH in a PSFCH slot indicated by the additional information, the UE-B may transmit a PSCCH/PSSCH to the UE-A in a slot associated with the corresponding PSFCH slot. For example, the UE-A may include information regarding all or part of slots in which the UE-A performs PSFCH reception in additional information. For example, the slot may be a slot belonging to a reference time period (e.g., the reference time period is (pre-)configured or indicated through additional information). In this case, for example, the UE-B which has received the additional information may transmit a PSCCH/PSSCH to the UE-A by avoiding PSSCH resources associated with PSFCH slots indicated by the additional information.

For example, the UE-A may determine preferred resource information or non-preferred resource information for the UE-B transmitted through additional information, based on whether there is a power limited case in a PSFCH TX slot and/or the number of PSFCH transmissions in a PSFCH TX slot and/or the location of a PSFCH RX slot and/or the location of a PSFCH TX slot of the UE-A. For example, the UE-A may configure a PSSCH slot associated with a PSFCH TX slot or a PSFCH RX slot of the UE-A as a non-preferred resource. For example, in the case of a PSSCH slot associated with a PSFCH TX slot, if additional PSFCH TX of the UE-A is available and/or if it is not a power limited case (before or after applying additional PSFCH transmission), the PSSCH slot associated with the PSFCH TX slot may be excluded from the non-preferred resource. For example, the UE-A may configure all or part of PSSCH slots not associated with a PSFCH TX slot or a PSFCH RX slot of the UE-A as a preferred resource. For example, in the case of a PSSCH slot associated with a PSFCH TX slot, if additional PSFCH TX of the UE-A is available and/or if it is not a power limited case (before or after applying additional PSFCH transmission), the PSSCH slot associated with the PSFCH TX slot may be included in the preferred resource. Meanwhile, the UE-B may differently set SL HARQ-ACK feedback enable/disable for each period for periodic reservation resources, and the UE-B may perform PSCCH/PSSCH transmission based on the periodic reservation resources. In the above case, even if the UE-A observes a PSFCH TX/TX and/or TX/RX conflict based on received SCI of the previous period, if the UE-B disables SL HARQ-ACK feedback in the next period, the PSFCH conflict may no longer occur. For example, the UE-A may refer to/use a PSFCH TX/TX and/or TX/RX conflict predicted in a specific reservation period of the UE-B only when generating assistance information for reserved resources of the UE-B for the same TB. For example, the UE-A may refer to/use a PSFCH TX/TX and/or TX/RX conflict predicted in a specific reservation period of the UE-B when generating assistance information for another TB or another reservation period, and the UE-A may transmit the assistance information to the UE-B by including the consideration of the PSFCH conflict factor. In this case, for example, if the UE-B enables SL HARQ-ACK feedback in the next reservation period, the UE-B may use the assistance information for resource (re)selection. For example, if the UE-B disables SL HARQ-ACK feedback in the next reservation period, the UE-B may not use the assistance information for resource (re)selection. That is, for example, if the UE-B disables SL HARQ-ACK feedback in the next reservation period, the UE-B may ignore the assistance information when performing resource (re)selection.

For example, when the UE-A configures transmission preferred resources for the UE-B through additional information, the additional information may include information regarding all or part of slots satisfying a specific condition. For example, the information on the slot may be information within a reference time period. For example, the reference time period may be (pre-)configured or indicated by additional information. For example, the specific condition may be all or part of slots excluding slots associated with PSFCH TX slots of the UE-A and/or slots associated with slots in which the UE-A performs PSFCH RX and/or selection/reservation resources of the UE-A and/or SL slots overlapping with LTE SL resources (LTE SL synchronization signal, LTE PSBCH, LTE SPS PSCCH/PSSCH) and/or periodic DL resources and/or periodic UL transmission resources of the UE-A (periodic/semi-periodic CSI report, CG PUSCH).

For example, the UE-A may transmit additional information to the UE-B under a specific condition. This case may include, for example, a case in which the UE-A determines to perform an NR SL reception operation.

For example, from the point of view of the UE-A, the specific condition may include a case in which the number of PSFCH slots in which PSFCH transmission and PSFCH reception collide is greater than or equal to a (pre-)configured threshold. For example, the UE-A may increase a specific timer when PSFCH transmission and PSFCH reception collide. In addition, if the timer reaches a (pre-)configured value, the UE-A may transmit additional information. For example, the timer may be (re)started when a conflict between PSFCH transmission and PSFCH reception does not occur in a PSFCH slot. For example, the timer may be (re)started when the UE-A transmits additional information.

For example, from the point of view of the UE-A, the specific condition may include a case in which the number of PSFCH slots in which the number of simultaneous transmissions of PSFCH transmission is greater than or equal to a first threshold is greater than or equal to a (pre-)configured second threshold. For example, the first threshold may be a (pre-)configured value. For example, the first threshold may be the maximum number of PSFCHs that can be simultaneously transmitted by the UE-A. For example, the UE-A may increase a specific timer when the number of simultaneous PSFCH transmissions is greater than or equal to the first threshold. For example, the UE-A may increase a specific timer when power scaling is performed for a PSFCH due to simultaneous PSFCH transmission. For example, if the timer reaches a (pre-)configured value, the UE-A may transmit additional information. For example, if the number of simultaneous PSFCH transmissions is less than or equal to the first threshold and/or if power scaling is not performed for a PSFCH, the timer may be (re)started. For example, the timer may be (re)started when the UE-A transmits additional information.

For example, from the point of view of the UE-A, the specific condition may include a case in which the number of times that NR SL reception is limited due to LTE SL transmission and reception is greater than or equal to a (pre-)configured threshold. For example, the LTE SL transmission and reception may be limited to an LTE SL synchronization signal, an LTE PSBCH, and/or an SPS PSCCH/PSSCH. Even in the case of this condition, it may be expressed in the form of a timer.

For example, from the point of view of the UE-A, the specific condition may include a case in which the number of times NR SL reception is limited due to NR UL transmission and/or NR DL reception is greater than or equal to a (pre-)configured threshold. For example, the NR UL/DL transmission/reception may be limited to periodic resources (e.g., periodic/SPS CSI report, CG PUSCH, SPS PDSCH). Even in the case of this condition, it may be expressed in the form of a timer.

For example, if an RSRP measurement value measured by the UE-A based on an RS received from the UE-B is greater than or equal to and/or exceeds a (pre-)configured threshold, the UE-A may trigger transmission of additional information. In this case, for example, only if the number of times the RSRP measurement value is greater than or equal to and/or exceeds a specific threshold is greater than or equal to a (pre-)configured threshold, transmission of additional information may be triggered. For example, if an RSRP measurement value measured by the UE-A based on an RS received from the UE-B is greater than or equal to and/or exceeds a (pre-)configured threshold, the UE-A may increase or decrease a specific timer. In this case, if the corresponding timer expires or if it is reached to the (pre-)configured maximum value, the UE-A may trigger transmission of additional information. For example, the RS used for the RSRP measurement may be a PSSCH DMRS transmitted by the UE-B. For example, the RS used for the RSRP measurement may be a PSCCH DMRS transmitted by the UE-B. For example, the RS used for the RSRP measurement may be (pre-)configured. For example, if the UE-A fails to decode the PSCCH/PSSCH transmitted by the UE-B, the UE-A may trigger transmission of additional information. In this case, for example, only if the number of cases in which the number of failed decoding of the PSCCH/PSSCH is greater than or equal to and/or exceeds a specific threshold is greater than or equal to a (pre-)configured threshold, transmission of additional information may be triggered. For example, only if the number of cases in which a ratio of PSCCH/PSSCH decoding failures to all PSCCHs/PSSCHs transmitted by the UE-B is greater than or equal to and/or exceeds a specific threshold is greater than or equal to a (pre-)configured threshold, transmission of additional information may be triggered. For example, if the UE-A fails to decode a PSCCH/PSSCH transmitted by the UE-B, the UE-A may increase or decrease a specific timer. In this case, if the corresponding timer expires or if it is reached to the (pre-)configured maximum value, the UE-A may trigger transmission of additional information.

For example, if the condition is checked based on a timer, each conflict related timer may be managed/exist differently for each condition. For example, if at least one timer related to a specific condition expires, the UE-A may transmit additional information. For example, if the condition is checked based on a timer, each conflict related timer may be managed/existed in common regardless of conditions. For example, the UE-A may increase the common conflict timer if at least one specific condition occurs.

Based on an embodiment of the present disclosure, the UE-A may trigger and/or suggest resource reselection to the UE-B for all or part of selected resources of the UE-B. For example, the UE-A may observe that a resource conflict occurs between all or part of resources of the UE-B and resources of a third UE (e.g., UE-C). However, in this case, the UE-B may not be aware of the resource conflict situation. In this case, for example, the UE-A may instruct the UE-B and/or the UE-C to reselect all or part of resources.

For example, if the UE-A observes that reserved resources/selection resources indicated by received different SCI and/or additional information overlap each other, or if the above situation occurs above a certain level, the UE-A may transmit additional information to the UE-B. For example, if the number of slots in which the UE-A observes that a specific resource is indicated by different SCI and/or additional information is greater than or equal to a (pre-)configured threshold, the UE-A may transmit additional information. For example, the additional information may indicate time and/or frequency domain resources in which the UE-A observed a conflict. In this case, for example, if all or part of selected resources of the UE-B overlap, the UE-B which has received the additional information may perform resource reselection for all or part of selected resources of the UE-B or selected resources overlapping the indicated resources. For example, if the number of selected resources of the UE-B overlapping with resources indicated by additional information is greater than or equal to a (pre-)configured threshold, the UE-B may perform resource reselection based on the additional information. For example, if a ratio of the number of selected resources of the UE-B overlapping with resources indicated by additional information to the total number of selected resources of the UE-B is greater than or equal to a (pre-)configured threshold, the UE-B may perform resource reselection based on the additional information.

For example, the UE-A may relay all or part of SCI received by the UE-A to the UE-B. For example, if the UE-A receives first SCI from the UE-B and the UE-C, respectively, and if all or part of resources indicated by each SCI overlap, the UE-A may generate SCI (e.g., first SCI and/or second SCI) indicating all or part of an L1 source ID, an L1 destination ID, and/or reserved resources of the UE-C, and the UE-A may transmit the generated SCI to the UE-B. In this case, for example, the UE-B may assume/determine that SCI transmitted by the UE-A is SCI transmitted by the UE-C. In this case, for example, even though the UE-B does not recognize the UE-C, the UE-B may be aware of reserved resources of the UE-C. For example, the UE-B may perform RSRP measurement for reservation information of the UE-C transmitted by the UE-A, based on the corresponding PSSCH DMRS transmitted by the UE-A. In addition, if the corresponding RSRP measurement value is greater than or equal to a specific RSRP threshold, the UE-B may exclude the corresponding resource (a resource set overlapping with the corresponding resource) from available resources of the UE-B. For example, the RSRP threshold may be a (pre-)configured for each combination of a TX priority and an RX priority. For example, the TX priority may be obtained from packet information of the UE-B, and the RX priority may be a TX priority of the UE-C transmitted by the UE-A through SCI. Meanwhile, the UE-B has already received SCI transmitted by the UE-C, but the UE-B may determine that the interference is low due to an RSRP measurement value-based sensing operation, so the UE-B may include reserved resources of the UE-C in available resources of the UE-B. In this case, it may be unnecessary for the UE-A to operate like the UE-C as described above. For example, if the UE-B receives a plurality of SCI indicating the same priority value, the same L1 source ID, and/or the same L1 destination ID for the same resource, the UE-B may determine that only specific SCI is valid, and the UE-B may perform resource (re)selection based on the corresponding SCI. For example, the SCI selected as valid may be SCI having a high RSRP measurement value corresponding to the corresponding SCI. For example, SCI selected as valid may be SCI having a low RSRP measurement value corresponding to the corresponding SCI. For example, SCI selected as valid may be SCI that is not marked as additional information or relay information (in a field (combination) form or transmission form). For example, the UE-B may transmit an L1 source ID and/or an L1 destination ID for received SCI to the UE-A, and based on this, the UE-A may relay only SCI of UE(s) not detected by the UE-B. For example, a PSFCH resource may be (additionally) allocated for each PSSCH resource (e.g., a combination of a starting subchannel and a slot of a PSSCH or a combination of allocated subchannels and a slot of a PSSCH). In this case, for example, for each PSSCH resource, a PSFCH resource for SL HARQ-ACK feedback for the corresponding PSSCH and a PSFCH resource for feedback regarding whether a conflict situation occurs or reselection is required for the corresponding PSSCH resource may be (pre-)configured to the UE. For example, each of PSFCH resources may correspond to different PRB sets. For example, a set of PSFCH resources for SL HARQ-ACK feedback and a set of PSFCH resources for resource reselection feedback may be (pre-)configured to the UE, and/or each set of PSFCH resources may have the same PSFCH resource period and the same PSFCH occasion. For example, each set of PSFCH resources may have different PRB sets. For example, when mapping between a PSSCH resource and a PSFCH resource, whether the mapping is based on a starting subchannel for a PSSCH or allocated subchannels for a PSSCH may be configured differently for each set of PSFCH resources.

For example, if all or part of resources of the UE-B and the UE-C collide, the UE-A may indicate whether or not there is a resource conflict by using a PSFCH resource corresponding to a PSSCH resource of the UE-B and/or the UE-C of the corresponding slot. For example, if a resource conflict does not occur, the UE-A may not perform PSFCH transmission (for feedback regarding whether a resource conflict situation occurs or resource reselection is required) corresponding to a PSSCH resource. For example, only if the PSSCH resource conflict situation occurs in the HARQ-ACK feedback option 1 in groupcast, the UE may transmit feedback regarding the resource conflict situation. This is because, in case of unicast or the HARQ-ACK feedback option 2 in groupcast, when the receiving UE cannot transmit SL HARQ-ACK feedback due to a resource conflict, the transmitting UE may treat it as NACK and perform retransmission for the corresponding TB again. On the other hand, this is because when the receiving UE does not transmit a PSFCH due to a resource conflict in the groupcast HARQ-ACK feedback option 1, the transmitting UE may mistakenly determine this as ACK.

For example, if all or part of reserved resources indicated by SCI transmitted by the UE-B and the UE-C collide, the UE-A may indicate whether or not there is a resource conflict by using a PSFCH resource corresponding to a PSSCH resource of the UE-B and/or the UE-C of the corresponding slot. For example, a PSSCH resource at a time when SCI is transmitted may be excluded from the reserved resources. For example, a PSSCH resources at a time when SCI is transmitted may be included in the reserved resources. For example, when the UE-A instructs the UE-B and/or the UE-C whether or not there is a resource conflict, the UE-A can identify a resource in which a conflict occurs or reselection is required, and based on this, the UE-A may perform transmission by selecting different PSFCH resources. For example, if a conflict occurs in the first reserved resource of the UE-B or the UE-C or if reselection is required, the UE-A may transmit ACK based on a PSFCH resource. For example, if a conflict occurs in the second reserved resource of the UE-B or the UE-C or if reselection is required, the UE-A may transmit NACK based on a PSFCH resource. For example, if a resource conflict (including a half-duplex problem) occurs in a slot in which SCI is received, the UE-A may transmit NACK based on a PSFCH resource corresponding to a PSSCH transmitted by the UE-B and/or the UE-C. For example, if the UE-A determines that a resource conflict (including a half-duplex problem) occurs in reserved slot(s) indicated by SCI, the UE-A may transmit ACK based on a PSFCH resource corresponding to a PSSCH transmitted by the UE-B and/or the UE-C. For example, the PSFCH resource may be a PSFCH resource corresponding to SL HARQ-ACK transmission. In this case, in the case of the groupcast HARQ-ACK feedback option 1, a PSFCH resource corresponding to ACK that has not been previously used may be used for transmission of additional information. For example, based on a PSFCH resource (e.g., m0 value) and/or based on an indication value of a PSFCH resource (e.g., mcs value), resources (resource sets) reselected by the UE which has received additional information may be different. For example, resource reselection by the UE which has received additional information may be different based on PSFCH resources and/or indication values. For example, if a resource conflict occurs in a resource already transmitted through additional information, retransmission may be performed in an already reserved resource without resource reselection for a later resource. For example, if a resource conflict occurs in a resource reserved later through additional information, resource reselection may be performed for the later resource. For example, if a resource conflict occurs in a resource reserved for later retransmission in the additional information, the UE may perform resource reselection for the retransmission resource only if a resource conflict occurs in an already transmitted resource for the same TB or only if the UE determines NACK for the previously transmitted PSSCH. For example, if a resource conflict does not occur between reserved resources, PSFCH transmission (for feedback regarding whether a resource conflict situation occurs or resource reselection is required) corresponding to a PSSCH resource may not be performed.

For example, if the UE-A determines that the UE-B and the UE-C perform transmission and reception each other in the same slot, the UE-A may indicate whether to perform resource reselection by using a PSFCH resource corresponding to a PSSCH resource of the UE-B and/or the UE-C of the corresponding slot. In this case, for example, the case in which it is determined that transmission and reception are performed in the same slot may be a case in which the UE-B and the UE-C are in unicast communication and/or an L1 source ID and an L1 destination ID of the UE-B and the UE-C are set to an L1 destination ID and an L1 source ID with each other. For example, the UE may indicate through a PSFCH resource (e.g., m0 value) and/or a PSFCH indication value (e.g., mcs), by distinguishing that a resource conflict occurs or a transmission and reception problem with each other occurs due to the half-duplex problem.

For example, if the receiving UE receives SCI from the transmitting UE, the receiving UE may obtain reserved resource information indicated by the corresponding SCI. In this case, the receiving UE may not be able to perform SL reception at the transmission time on the reserved resource due to the half-duplex operation in a part of reserved resources. In this case, for example, the receiving UE may transmit NACK or ACK for the reserved resource based on the reserved resource information even though SCI is not detected due to the half-duplex operation. For example, the above operation may be limited to a case in which the receiving UE performs the groupcast HARQ-ACK feedback option 1. This is because when the receiving UE does not transmit a PSFCH due to non-detection of SCI, the transmitting UE may mistake it for ACK. If the receiving UE transmits NACK even though it does not detect SCI, this problem can be alleviated.

For example, in the case of the groupcast HARQ-ACK feedback option 1, if the UE-A fails to decode a PSSCH transmitted by the UE-B, the UE-A may transmit NACK by using a PSFCH resource corresponding to the PSSCH. For example, if the UE-A successfully decodes the PSSCH, and if the UE-A determines a resource conflict (including half-duplex problem) for all or part of PSSCH resources, the UE-A may transmit additional information for the PSSCH to the UE-B.

For example, regardless of whether the transmitting UE enables or disables SL HARQ-ACK feedback, the UE may perform PSFCH transmission for the resource reselection indication according to the specific situation. For example, only if SL HARQ-ACK feedback of the transmitting UE is enabled, the UE may perform PSFCH transmission for the resource reselection indication.

Meanwhile, the UE-B may receive additional information from a plurality of UEs. In this case, a method for utilizing this needs to be defined. For example, the UE-B may utilize only additional information transmitted by a specific UE. For example, if the UE-B receives additional information from a plurality of UE-As, the UE-B may measure RSRP based on signals transmitted by the plurality of UE-As, and the specific UE may be a UE corresponding to the largest RSRP measurement value. For example, the specific UE may be a UE having the closest geographical distance to the UE-B. For example, the specific UE may be a UE that has completed a PC5-RRC connection with the UE-B.

For example, the UE-B which has received additional information may use the additional information before the UE-B triggers a resource (re)selection operation. For example, the UE-B may skip a sensing operation (e.g., attempting to detect SCI) in all or part of slots based on information indicated by additional information. For example, if the type of information indicated by additional information is a non-preferred resource for transmission of the UE-B, the UE-B may skip a sensing operation for all or part of slots corresponding to the non-preferred resource. For example, if the type of information indicated by additional information is a preferred resource for transmission of the UE-B, the UE-B may perform a sensing operation only for all or part of slots corresponding to the preferred resource. The slots corresponding to the preferred resource or the non-preferred resource may be derived based on resource reservation period candidate values (for the UE-B) or (pre-)configured resource reservation period(s). For example, for slots before resource reservation period(s) from the preferred resource or the non-preferred resource or slots before the multiple of the resource reservation period(s) from the preferred resource or the non-preferred resource, the UE-B may determine whether to perform sensing. For example, the UE-B which has received additional information may stop a sensing operation. For example, the stop condition may be limited to a case in which additional information indicates a resource within a resource selection window of the UE-B. For example, the stop condition may be limited to a case in which additional information is information corresponding to the number of transmission subchannels and/or a transmission resource reservation period and/or a transmission priority of the UE-B. For example, if a ratio of the amount of available resources determined based on (preferred or non-preferred) resources indicated by additional information to the total amount of resources within a resource selection window of the UE is less than or equal to a (pre-)configured threshold, the UE which has received the additional information may skip a sensing operation (e.g., SCI detection attempt and/or an available resource selection procedure).

For example, if the UE-B which has received additional information may use the additional information at a time when the UE-B triggers a resource (re)selection operation or after a specific time from the time. For example, the specific time may be pre-defined. For example, the specific time may be (pre-)configured to the UE. For example, the UE-B which has received additional information may exclude a transmission pattern of the UE-B partially overlapping with a resource indicated by the additional information from available resources. For example, the transmission pattern may be determined based on the number of transmission subchannels, a transmission resource reservation period and/or a transmission priority of the UE-B. For example, the UE-B which has received additional information may configure all or part of resources indicated by the additional information as available resources that can be used to transmit a transmission pattern of the UE-B. Meanwhile, a reference resource selection window corresponding to additional information may not include all resource selection windows of the UE-B. For example, within a resource selection window of the UE-B other than the reference resource selection window corresponding to the additional information, the UE-B may perform a resource selection procedure (e.g., available resource selection) based on received first SCI.

For example, when the UE-B determines available resources within a resource selection window, the UE-B which has received additional information may use the additional information together with received first SCI information. For example, the UE-B may select available resources in consideration of a transmission pattern based on a representative RSRP measurement value corresponding to resources indicated by additional information. For example, the UE-B may determine available resources based on the received first SCI and the corresponding RSRP measurement value, and the UE-B may again exclude available resources that overlaps with resources indicated by the additional information from the determined available resources. For example, the UE-B may determine available resources based on the received first SCI and the corresponding RSRP measurement value, and then the UE-B may again include resources overlapping with resources indicated by the additional information in the determined available resources. Through this, the UE-B may expand available resources. Specifically, for example, if an RSRP measurement value corresponding to additional information is less than or equal to and/or less than a (pre-)configured RSRP threshold, the UE-B may perform a procedure of extending available resources based on the additional information. For example, the RSRP threshold may be (pre-)configured for each transmission priority, and the threshold to be used may be selected based on a transmission priority of the UE-B.

For example, when the UE-B determines a selected resource from available resources, the UE-B which has received additional information may use the additional information. For example, the UE-B may select the selected resource from resources indicated by the additional information within available resources. For example, the additional information-based selected resource selection procedure may be limited to a case in which an RSRP measurement value corresponding to resources indicated by the additional information is less than or equal to and/or less than a (pre-)configured RSRP threshold. For example, the RSRP threshold may be (pre-)configured for each transmission priority, and the threshold to be used may be selected based on a transmission priority of the UE-B. For example, the UE-B may select a selected resource other than resources indicated by the additional information within available resources. For example, the additional information-based selected resource selection procedure may be limited to a case in which an RSRP measurement value corresponding to resources indicated by the additional information is greater than or equal to and/or greater than a (pre-)configured RSRP threshold. For example, the RSRP threshold may be (pre-)configured for each transmission priority, and the threshold to be used may be selected based on a transmission priority of the UE-B.

For example, after the UE-B determines a selected resource from available resources, the UE-B which has received additional information may use the additional information. For example, if the selected resource of the UE-B does not include all or part of resources indicated by the additional information, the UE-B may perform resource reselection for all or part of non-overlapping selected resource. For example, if the overlapping ratio of the resource selected by the UE-B to resources indicated by the additional information is less than or equal to a (pre-)configured ratio, the UE-B may perform the above procedure. For example, if it is difficult to satisfy the above condition due to resource reselection, the UE-B may increase an RSRP threshold and perform the operation again from selecting available resources. For example, if the selected resource of the UE-B includes all or part of resources indicated by the additional information, the UE-B may perform resource reselection for all or part of overlapping selected resource. For example, if the selected resource of the UE-B includes even a part of resources indicated by the additional information, the UE-B may perform resource reselection for all or part of overlapping selected resource. For example, if the overlapping ratio of the resource selected by the UE-B to resources indicated by the additional information is greater than or equal to a (pre-)configured ratio, the UE-B may perform the above procedure. For example, if it is difficult to satisfy the above condition due to resource reselection, the UE-B may increase an RSRP threshold and perform the operation again from selecting available resources.

Meanwhile, after the UE-B receives additional information from the UE-A, the UE-B may receive new additional information from the UE-A or receive additional information from a third UE (e.g., UE-C). In the above situation, it is necessary to determine how the UE-B uses additional information. For example, if the UE-B completes or is performing resource (re)selection, the UE-B may not use newly received additional information until the next resource (re)selection is triggered. For example, if the UE-B completes or is performing resource (re)selection, the UE-B may not use newly received additional information until the UE-B completes current TB transmission. For example, if the UE-B receives additional information from a new UE, and if an RSRP measurement value based on an SL channel transmitted by the new UE is greater than an RSRP measurement value based on an SL channel transmitted by the previous UE or if an RSRP measurement value based on an SL channel transmitted by the new UE is greater than an RSRP measurement value based on an SL channel transmitted by the previous UE by a certain level (e.g. pre-defined value or (pre-)configured value) or more, the UE-B may use new additional information. For example, if the UE-B receives new additional information, the UE-B may trigger resource (re)selection. For example, triggering of resource (re)selection by the additional information may be performed by the UE-B only in a specific situation. For example, the specific situation may be a case in which previous additional information and new additional information received by the UE-B are different from each other. For example, the different additional information may be a case in which resources indicated by previously received additional information and resources indicated by newly received additional information do not overlap each other or a non-overlapping ratio between resources indicated by previously received additional information and resources indicated by newly received additional information is greater than or equal to a certain level. For example, the specific situation may be a case in which a transmission priority value of the UE-B is greater than a priority value of a specific resource indicated by additional information. For example, the specific situation may be a case in which a transmission priority value of the UE-B is greater than a priority value of additional information. For example, the specific situation may be a case in which a priority value of a specific resource indicated by additional information is less than a (pre-)configured threshold. For example, the specific situation may be a case in which a priority value of additional information is less than a (pre-)configured threshold. For example, the specific situation may be a case in which the remaining PDB is sufficient even if resource (re)selection is performed according to packet information of the UE-B. For example, the specific situation may be a case in which an RSRP value corresponding to a specific resource indicated by additional information is greater than or equal to a (pre-)configured threshold. For example, the specific situation may be a case in which an RSRP value for additional information is greater than or equal to a (pre-)configured threshold. In this case, for example, the RSRP measurement value may be measured by the UE-B based on RS used to transmit additional information. For example, the specific situation may be a case in which the reception quality of previously received additional information by the UE-B is lower than the reception quality of newly received additional information. In this case, for example, by comparing RSRP measurement values for transmission of additional information, an RSRP measurement value of newly received additional information is greater than an RSRP measurement value of previously received additional information, or an RSRP measurement value of newly received additional information is greater than an RSRP measurement value of previously received additional information by a (pre-)configured offset or more. For example, the specific situation may be a case in which a priority value for newly received additional information by the UE-B is less than a priority value for previously received additional information. For example, the specific situation may be a case in which distance information for newly received additional information by the UE-B is smaller than distance information for previously received additional information. In this case, for example, the distance between the UE transmitting the additional information and the UE-B (e.g., distance measurement based on ZONE ID, etc.) may represent the distance information. For example, the specific situation may be a case in which resources indicated by additional information is information related to an SL reception unavailable domain of the UE transmitting additional information.

For example, when the UE-B receives a set of preferred resources or a set of non-preferred resources through additional information from each of a plurality of UEs, and the UE-B transmits a PSCCH/PSSCH to each of the plurality of UEs, the UE-B may preferentially use additional information transmitted by the corresponding UE for resource (re)selection. For example, if the UE-B receives a set of non-preferred resources through additional information from each of a plurality of UEs, the UE-B may first select available resources within a resource selection window of the UE-B based on the set of non-preferred resources. In this case, for example, if a ratio of available resources is less than a specific threshold (e.g., a (pre-)configured parameter), the UE-B may no longer consider the set of non-preferred resources indicated by a part of additional information. For example, if the UE-B receives a set of preferred resource through additional information from each of a plurality of UEs, the UE-B may first select available resources or selected resources within a resource selection window of the UE-B based on the set of preferred resources. In this case, for example, if the amount of available resources or selected resources selected based on additional information is less than a certain level, the UE-B may not use all or part of additional information. For example, the determination of which additional information to use or not to use may depend on the implementation of the UE-B. For example, determination of which additional information to use or not to use may be performed based on a priority corresponding to additional information. For example, the UE-B may preferentially apply/use additional information having a higher priority. For example, determination of which additional information to use or not to use may be performed based on an RSRP measurement value corresponding to additional information. For example, the UE-B may preferentially apply/use additional information corresponding to a higher RSRP measurement value.

Considering the signaling overhead of the assistance information in network perspective, it is necessary to avoid a number of UEs transmit high correlated assistance information. In other words, if a UE receives the assistance information from another UE, and the UE recognizes that the set of resources provided by the assistance information is the same as the set of resources which the UE will transmit, then the UE can skip the transmission of the assistance information.

Proposal: For the condition of UE-A's triggering the assistance information, one or more of followings may be supported:
When UE-A triggers resource (re)selection for its own transmission, or
When the RX quality at UE-A side from UE-B is smaller than a certain threshold for a certain duration of time, or
When UE-A can recognize that the reserved resources of different UE's are collided for a certain duration of time, or
UE-A may trigger the assistance information periodically with (pre)configured period.

Proposal: It may be supported that UE-A skips triggering of the assistance information based on congestion control or the received assistance information from another UE.

Proposal: For the contents of UE-A's assistance information, one or more of followings may be supported:
Reference point to indicate slot position, or
Contiguous or non-contiguous sub-channel(s), or
Contiguous or non-contiguous slot(s), or
RSRP value(s) (e.g., RSRP measurement based on the received PSSCH DMRS at UE-A side), or
SCI contents related to sensing and its reception timing, or
Method to apply the assistance information for the resource (re)selection procedure at RX UE side (e.g., resource set which is not preferred for UE-A's reception, resource set which is preferred not to be used by UE-B's transmission (e.g., when RSRP measurement based on the container of the assistance information at UE-B side is higher than the RSRP threshold, or when the indicated RSRP values for the resource set is higher than the RSRP threshold), resource set which is preferred for UE-B's transmission)

Proposal: To determine the time-and-frequency resources provided by UE-A's assistance information, one or more of followings may be considered:
UE-A's selected resources, or
Slots for UE-A's periodic transmission (e.g., periodic/semi-persistent CSI reports, CG PUSCH, LTE V2X SLSS/PSBCH or SPS PSCCH/PSSCH), or
FRIV, TRIV, and resource reservation period indicated by the received SCI at UE-A side, or
TX pattern(s) overlapping with RX patterns For example, TX pattern is determined by starting sub-channel index x, logical slot index y, number of sub-channels, TX priority, TX resource reservation period, and resource reselection counter. These parameters can be (pre)configured or predefined for the assistance information. RX pattern is determined by FRIV, TRIV, resource reservation period, RX priority indicated in the received SCI at UE-A side. TX pattern can be indicated by the assistance information only if the RSRP measurement based on the received PSSCH DMRS at UE-A side is higher than the RSRP threshold which is given by a combination of TX priority and RX priority.

Considering that the assistance information is used to indicate reserved resources, the form of the assistance information could be broadcast or groupcast. Considering that the assistance information can include the set of slots where UE-A cannot perform SL reception, the form of the assistance information could be broadcast or groupcast or unicast. For instance, if the UE-A wants to transmit this information for the intended transmitter UE of UE-A, the assistance information could be a form of unicast or groupcast. Considering signaling overhead, it can be considered that UE-A transmit this information to a UE group rather than transmitting this information to each UE separately. On the other hand, if the UE-A wants to transmit this information for the potential transmitter UE of UE-A, the form of the assistance information could be broadcast or groupcast. Considering that the assistance information can include sensing results of UE-A, the form of the assistance information could be broadcast or groupcast.

Observation: Considering signaling overhead in system perspective, it is beneficial that the assistance information is transmitted in a broadcast or groupcast manner.

Proposal: For the container of UE-A's assistance information, one or more of followings is supported:
  PSSCH with 2nd SCI format only (i.e., a TB is not transmitted), or
  MAC CE on PSSCH It supports at least the case where the assistance information is not multiplexed with other data of UE-A in the same TB. PSSCH containing the assistance information is at least for broadcast or connection-less groupcast.

Depending on the intended receiver UEs of the assistance information, the UE-B could use the assistance information based on the cast type of its own transmission. For instance, if the assistance information is selected resources of UE-A or sensing results of UE-A, the assistance information could be used for UE-B's resource (re)selection procedure for broadcast/groupcast/unicast PSCCH/PSSCH transmission. On the other hand, if the assistance information is resource set which is preferred or is not preferred for UE-A's reception, the assistance information could be used when the UE-B's PSCCH/PSSCH transmission is unicast or (connection-oriented) groupcast of which intended receiver is UE-A. Even for the broadcast, the assistance information sent by UE-A could be used for UE-B's resource (re)selection procedure to ensure UE-A can receive the broadcast message sent by the UE-B.

Proposal: For the condition of using the assistance information at UE-B side, one or more of followings is supported:
  When UE-B triggers resource (re)selection for its own transmission (i.e., UE-B has data to transmit), or
  When the received assistance information is valid for UE-B (e.g., target receiver of the assistance information includes UE-B, and at least one resource provided by the assistance information is within UE-B's resource reselection period), or
  UE-B can use the assistance information for all the cast types of PSCCH/PSSCH transmissions.

Proposal: When UE-B receives updated assistance information from the same UE, UE-B can perform resource (re)selection procedure again by using the updated assistance information in case of one or more of following conditions:
  When the updated assistance information indicates resources with priority value smaller than a (pre)configured threshold, or
  When the remaining PDB of UE-B's transmission is higher than a (pre)configured threshold, or
  When the updated assistance information includes slot positions where UE-A cannot perform SL reception, or
  When the amount of changed resources provided across different assistance information is higher than a certain threshold.

Proposal: For UE-B's resource (re)selection procedure, the UE-B uses the assistance information as one or more of following ways:
  UE-B determines candidate resources based on the received SCI at UE-B side and the resource set provided by the assistance information (e.g., UE-B (additionally) exclude TX pattern(s) overlapping with the resource set provided by the assistance information from the candidate resource set if the corresponding RSRP measurement is higher than the RSRP threshold. The RSRP measurement of the resource set is based on DMRS of PSSCH containing the assistance information, or the RSRP measurement of the resource set is given by the assistance information, or the RSRP measurement of the resource set is always infinity. UE-B determines final candidate resource set by using the intersection of candidate resource set based on the received SCI and the resource set provided by the assistance information), or
  UE-B determines selected resources based on a resource set provided by the assistance information after deciding candidate resource set based on the received SCI at UE-B side (e.g., UE-B determines selected resources to avoid the resource set provided by the assistance information, or UE-B determines selected resource among the candidate resources to include all or a subset of the resource set provided by the assistance information).

Proposal: For UE-B's resource (re)selection procedure, the ratio of candidate resources over a resource selection window is determined as one or more of following ways:
  UE-B determines the candidate resource ratio based on only the received SCI (e.g., if the ratio of the candidate resources determined based on the received SCI only is smaller than X %, the RSRP threshold is boosted. Otherwise, RSRP threshold is not boosted. The resource set provided by the assistance information can be used, or the resource set provided by the assistance information is no longer used), or
  UE-B determines the candidate resource ratio based on both the received SCI and the assistance information (e.g., if the ratio of the candidate resources determined based on the received SCI only is smaller than X %, the RSRP threshold for the received SCI is boosted. Else if the ratio of the candidate resources determined based on the received SCI and the assistance information is smaller than Y %, the RSRP threshold for the assistance information is boosted, or the resource set provided by the assistance information is no longer used).

Proposal: For UE-B's resource (re)selection procedure, the RX pattern(s) associated with the non-monitored slot is determined as one or more of following ways:
  Reuse Rel-16 mechanism (i.e., RX patterns are all the sub-channels in slots associated with the non-monitored-slot based on all the (pre)configured resource reservation period values), or
  RX patterns are derived by the resource set provided by the assistance information, or
  Among the slots associated with the non-monitored slot, if there is resource(s) provided by the assistance information, the RX pattern is derived by the assistance information, otherwise, the RX pattern consists of all the sub-channels.

Meanwhile, a UE transmitting additional information that can be used in a resource (re)selection procedure for PSCCH/PSSCH transmission of another UE may be predefined or (pre-)configured. Herein, for example, a procedure for performing/establishing a relationship/connection between a UE transmitting additional information (hereinafter referred to as UE-A) and a UE receiving the additional information and/or using the additional information for resource reselection (hereinafter referred to as UE-B) may be required. For example, the UE-A capable of transmitting additional information may be a UE configured to be capable of or supported to transmit additional information as UE capability. For example, the UE-A may receive, from a base station or another UE, information/message related to UE capability including information indicating that transmission of additional information is possible or information indicating that transmission of additional information is supported. For example, if a battery status and/or the amount of battery of the UE is greater than or equal to a certain level, the UE may determine that it has the ability to transmit additional information. For example, if the type of the UE is a specific UE type (e.g., vehicle type, vehicle height, antenna height, RSU status, etc.), the UE may determine that it has the ability to transmit additional information. For example, if the UE is a UE (e.g., a bus) moving along a certain route, the UE may determine that it has the ability to transmit additional information. For example, if the UE is a UE (e.g., RSU) with a fixed location, the UE may determine that it has the ability to transmit additional information. That is, the UE that satisfies at least one of the above conditions can transmit additional information.

For example, the UE-A capable of transmitting additional information may be selected/determined based on the following procedure. For example, the UE may perform a process of checking whether there is a UE already transmitting additional information in the vicinity. More specifically, for example, the UE may attempt to detect a PSCCH/PSSCH corresponding to additional information in a specific time window (e.g., a (pre-)configured slot period), and the UE may decide/determine whether there is a UE transmitting additional information in the vicinity of the UE based on whether a signal corresponding to additional information is detected within the specific time window and/or based on an RSRP value or received power of the signal. For example, if the UE detects a PSCCH/PSSCH corresponding to additional information within the specific time window, and/or if an RSRP measurement value for the PSCCH or the PSSCH is greater than or equal to a (pre-)configured threshold, the UE may decide/determine that there is a UE transmitting additional information in the vicinity of the UE. Otherwise, the UE may decide/determine that there is no UE transmitting additional information in the vicinity of the UE. For example, a first UE may transmit a signal for checking whether there is a second UE transmitting additional information. In this case, for example, the second UE which has received the signal transmitted by the first UE may transmit a response to the signal to the first UE, under a specific condition. For example, the specific condition may be a case in which the second UE which has received the signal is a UE transmitting additional information, a UE capable of transmitting additional information or a UE allowed to transmit additional information. For example, the specific condition may be a case in which the second UE which has received the signal is a UE which is receiving additional information from another UE or a UE which has received additional information from another UE. For example, the specific condition may be a case in which the second UE which has received the signal (i) is not currently performing resource (re)selection based on additional information, and (ii) is a UE capable of performing resource (re)selection using additional information (e.g., a UE capable of performing resource (re)selection using additional information in terms of UE capability and/or in terms of being configured additional information-based resource reselection operation). For example, if the second UE transmitting additional information transmits a response signal, the response signal may include information for the first UE to receive additional information transmitted by the second UE. For example, if the second UE receiving additional information from another UE transmits a response signal, the response signal may include information (e.g., information of a UE transmitting additional information and/or indicator information for additional information, etc.) for the first UE to receive additional information that the second UE receives from another UE. For example, a window (e.g., the size of the window may be (pre-)configured) for the first UE to receive a response signal, in response to a signal for identifying the second UE transmitting additional information, may be configured for the first UE. In this case, if the first UE fails to receive the response signal within the window, the first UE may decide/determine that there is no UE transmitting additional information in the vicinity of the first UE. For example, even if the first UE receives the response signal, the first UE may decide/determine that there is no UE transmitting additional information in the vicinity of the first UE if the response signal does not include information regarding a UE which has transmitted additional information and/or information regarding a method of receiving additional information.

For example, if the first UE decides/determines that there is the second UE transmitting additional information in the vicinity of the first UE, the first UE may perform a signaling/procedure for requesting information for receiving additional information from the second UE transmitting the additional information. For example, the first UE may transmit a signal requesting to be included in an additional information reception group to the second UE which is transmitting additional information, and in response to the request, the second UE which is transmitting the additional information may inform the first UE of whether or not the first UE is included in the additional information reception group and/or a result thereof. For example, the first UE may transmit a signal requesting to be included in an additional information reception group to the second UE which is transmitting additional information, and in response to the request, the second UE which is transmitting the additional information may inform the first UE of a result that the first UE cannot be included in the additional information reception group. For example, even if the first UE decides/determines that there is the second UE transmitting additional information in the vicinity of the first UE, the first UE may perform a signaling/procedure for declaring that it is a UE transmitting additional information if the first UE cannot receive additional information from another UE.

For example, if the first UE decides/determines that there is no second UE transmitting additional information in the vicinity of the first UE, the first UE may transmit a signal declaring that it is a UE transmitting additional information (hereinafter, a declaration signal). For example, the declaration signal may include information for receiving additional information. For example, if a third UE which has received the declaration signal wishes to receive additional information from the first UE, the third UE may transmit a response signal to the first UE. For example, the response signal may include transmission packet information of the third UE (e.g., including a priority value, resource reselection window information, sensing window information, (remaining) PDB information, resource reselection counter information, the (maximum) number of retransmissions, the number of subchannels, resource reservation period information, a cast type, whether or not HARQ-ACK feedback is enabled, a HARQ-ACK feedback option, a QoS parameter, a (L1) source ID, and/or a (L1) destination ID, etc.). For example, the UE which intends to transmit additional information may configure a recipient group to which additional information is to be received based on the response signal, and the UE which intends to transmit additional information may transmit information related to the recipient group and/or whether additional information can be received to the UE which has transmitted the response signal.

For example, the signaling/procedure for declaring that the UE is a UE transmitting additional information and the signaling/procedure for confirming that the UE transmitting additional information exists around a UE may be integrated. In this case, if a UE transmitting additional information or a UE already receiving additional information receives the declaration signal, the UE may inform that there is a UE already transmitting additional information, in response to the declaration signal.

For example, the declaration signal, the response signal to the declaration signal, the detection signal for detecting UE transmitting additional information, and the response signal to the detection signal may be transmitted in the form of first SCI and/or second SCI and/or a PSSCH and/or a PSFCH. For example, the declaration signal, the response signal to the declaration signal, the detection signal for detecting UE transmitting additional information, and the response signal to the detection signal may be transmitted in the form of a MAC message, PC5-RRC signaling, or PC5S signaling. In the present disclosure, the signal may be replaced with other terms such as a packet, control information, a message, or information according to a layer through which the signal is transmitted.

Meanwhile, a UE capable of transmitting additional information or a UE transmitting additional information (hereinafter referred to as an additional information transmitting UE) may be determined in advance when UEs are developed. For example, an RSU may be installed at an intersection or the like, and the RSU may serve to transmit additional information to surroundings. Meanwhile, depending on a road condition, shape, distribution of UEs, etc., the additional information transmitting UE may explicitly or implicitly determine a UE group, and the additional information transmitting UE may transmit additional information to each UE group. For example, in the process of configuring the UE group, a UE desiring to receive additional information may transmit, to the additional information transmitting UE, at least one of an RSRP measurement value for a signal transmitted by the additional information transmitting UE, angle of arrival (AOA) information for the signal transmitted by the additional information transmitting UE and/or location information of the UE. Thereafter, for example, the additional information transmitting UE may explicitly or implicitly configure/determine a UE group based on the information, and the additional information transmitting UE may specify additional information for each UE group. For example, the additional information transmitting UE may instruct/transmit information regarding the UE group to respective UEs again. For example, when the additional information transmitting UE transmits additional information, the additional information may include information regarding a UE group corresponding to the additional information. For example, in the process of configuring the UE group, the additional information transmitting UE may provide/transmit information regarding the UE group to neighboring UEs. For example, the information regarding the UE group may include at least one of location information of a UE to belong to the UE group (e.g., single or multiple ZONE IDs and/or information regarding a size of the ZONE and/or shape/angle of the ZONE), direction information of a UE to belong to the UE group with respect to the additional information transmitting UE (e.g., an AOA value or the range of AOA values measured by the receiving UE based on a signal of the UE transmitting additional information), and/or an RSRP measurement value or the range of RSRP measurement values measured by the UE to belong to the UE group based on the signal transmitted by the additional information transmitting UE. For example, the additional information transmitting UE may provide/transmit set information regarding the ZONE for each UE group. For example, the shape of the ZONE may be expressed in the form of a grid of the actual location of the UE with longitude and latitude axes. For example, the shape of the ZONE may be expressed as a grid shape distorted by a specific (indicated) angle with respect to longitude and latitude axes. For example, the additional information transmitting UE may transmit additional information to a single UE group or a plurality of UE groups, and each additional information may include information (e.g., a UE group ID or a combination of the parameters) for a corresponding UE group. For example, a UE which has received additional information may select/determine additional information to be used or valid additional information, based on at least one of an RSRP measurement value measured based on a signal transmitted by the additional information transmitting UE, direction information from the additional information transmitting UE, and/or location information of each UE. For example, a UE which has received additional information may infer/determine a UE group to which it belongs and select/determine additional information to be used or valid additional information, based on at least one of an RSRP measurement value measured based on a signal transmitted by the additional information transmitting UE, direction information from the additional information transmitting UE, and/or location information of each UE.

Meanwhile, in the next-generation system, a third UE may recognize a resource conflict between different UEs (e.g., PSCCH and/or PSSCH resources overlap and/or UEs communicating with each other perform SL transmission at the same time). In this case, for example, the third UE may inform the UEs of the resource conflict situation. Or, for example, in this case, the third UE may transmit SL HARQ-ACK feedback (e.g., HARQ ACK information or HARQ NACK information) instead of the UEs.

Meanwhile, in the case of the groupcast HARQ-ACK feedback option 2, a PSFCH resource may be determined based on a member ID (i.e., $M_{ID}$ of Table 6) value provided to a groupcast PSSCH receiving UE. For example, the UE may transmit HARQ-ACK (e.g., ACK or NACK) based on Table 5 and Tables 6A-6D.

TABLE 5

A UE can be indicated by an SCI format scheduling a PSSCH reception, in one or more sub-channels from a number of $N_{subch}^{PSSCH}$ sub-channels, to transmit a PSFCH with HARQ-ACK information in response to the PSSCH reception. The UE provides HARQ-ACK information that includes ACK or NACK, or only NACK.
A UE can be provided, by sl-PSFCH-Period-r16, a number of slots in a resource pool for a period of PSFCH transmission occasion resources. If the number is zero, PSFCH transmissions from the UE in the resource pool are disabled.

TABLE 5-continued

A UE expects that a slot $t'^{SL}_k$ ($0 \leq k < T'_{max}$) has a PSFCH transmission occasion resource if k mod $N_{PSSCH}^{PSFCH} = 0$, where $t'^{SL}_k$ is defined in [6, TS 38.214], and $T'_{max}$ is a number of slots that belong to the resource pool within 10240 msec according to [6, TS 38.214], and $N_{PSSCH}^{PSFCH}$ is provided by sl-PSFCH-Period-r16.
A UE may be indicated by higher layers to not transmit a PSFCH in response to a PSSCH reception [11, TS 38.321].
If a UE receives a PSSCH in a resource pool and the HARQ feedback enabled/disabled indicator field in an associated SCI format 2-A or a SCI format 2-B has value 1 [5, TS 38.212], the UE provides the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception.
A UE is provided by sl-PSFCH-RB-Set-r16 a set of $M_{PRB,\ set}^{PSFCH}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N_{PSSCH}^{PSFCH}$, the UE allocates the
$[(i + j \cdot N_{PSSCH}^{PSFCH}) \cdot M_{subch,\ slot}^{PSFCH},\ (i + 1 + j \cdot N_{PSSCH}^{PSFCH}) \cdot M_{subch,\ slot}^{PSFCH} - 1]$ PRBs from the $M_{PRB,\ set}^{PSFCH}$ PRBs to slot i among the PSSCH slots associated with the PSFCH slot and sub-channel j, where $M_{subch,\ slot}^{PSFCH} = M_{PRB,\ set}^{PSFCH}/(N_{subch} \cdot N_{PSSCH}^{PSFCH})$, $0 \leq i < N_{PSSCH}^{PSFCH}$, $0 \leq j < N_{subch}$, and the allocation starts in an ascending order of i and continues in an ascending order of j. The UE expects that $M_{PRB,\ set}^{PSFCH}$ is a multiple of $N_{subch} \cdot N_{PSSCH}^{PSFCH}$.
A UE determines a number of PSFCH resources available for multiplexing HARQ-ACK information in a PSFCH transmission as $R_{PRB,\ CS}^{PSFCH} = N_{type}^{PSFCH} \cdot M_{subch,\ slot}^{PSFCH} \cdot N_{CS}^{PSFCH}$ where $N_{CS}^{PSFCH}$ is a number of cyclic shift pairs for the resource pool and, based on an indication by higher layers,
- $N_{type}^{PSFCH} = 1$ and the $M_{subch,\ slot}^{PSFCH}$ PRBs are associated with the starting sub-channel of the corresponding PSSCH
- $N_{type}^{PSFCH} = N_{subch}^{PSSCH}$ and the $N_{subch}^{PSSCH} \cdot M_{subch,\ slot}^{PSFCH}$ PRBs are associated with one or more sub-channels from the $N_{subch}^{PSSCH}$ sub-channels of the corresponding PSSCH The PSFCH resources are first indexed according to an ascending order of the PRB index, from the $N_{type}^{PSFCH} \cdot M_{subch,\ slot}^{PSFCH}$ PRBs, and then according to an ascending order of the cyclic shift pair index from the $N_{CS}^{PSFCH}$ cyclic shift pairs.

TABLE 6A

A UE determines an index of a PSFCH resource for a PSFCH transmission
in response to a PSSCH reception as $(P_{ID} + M_{ID}) \bmod R_{PRB,\ CS}^{PSFCH}$ where $P_{ID}$ is a physical layer source ID provided by SCI format 2-A or 2-B [5, TS 38.212] scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.
A UE determines a $m_0$ value, for computing a value of cyclic shift α [4, TS 38.211], from a cyclic shift pair index corresponding to a PSFCH resource index and from $N_{CS}^{PSFCH}$ using Table 6B.
A UE determines a $m_{cs}$ value, for computing a value of cyclic shift α [4, TS 38.211], as in Table 6C if the UE detects a SCI format 2-A with Cast type indicator field value of "01" or "10", or as in Table 6D if the UE detects a SCI format 2-B or a SCI format 2-A with Cast type indicator field value of "11". The UE applies one cyclic shift from a cyclic shift pair to a sequence used for the PSFCH transmission [4, TS 38.211].

TABLE 6B

Set of cyclic shift pairs

| | $m_0$ | | | | | |
|---|---|---|---|---|---|---|
| $N_{CS}^{PSFCH}$ | Cyclic Shift Pair Index 0 | Cyclic Shift Pair Index 1 | Cyclic Shift Pair Index 2 | Cyclic Shift Pair Index 3 | Cyclic Shift Pair Index 4 | Cyclic Shift Pair Index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

TABLE 6C

Mapping of HARQ-ACK information bit values to a cyclic shift, from a cyclic shift pair, of a sequence for a PSFCH transmission when HARQ-ACK information includes ACK or NACK

| HARQ-ACK Value | 0 (NACK) | 1 (ACK) |
|---|---|---|
| Sequence cyclic shift | 0 | 6 |

TABLE 6D

Mapping of HARQ-ACK information bit values to a cyclic shift, from a cyclic shift pair, of a sequence for a PSFCH transmission when HARQ-ACK information includes only NACK

| HARQ-ACK Value | 0 (NACK) | 1 (ACK) |
|---|---|---|
| Sequence cyclic shift | 0 | N/A |

Meanwhile, in a situation in which a third UE recognizes a resource conflict between other UEs, the third UE may not know member ID information (i.e., $M_{ID}$) for each UE. In this case, it may not be appropriate for the third UE to transmit NACK instead of the UEs. For example, the third UE which recognizes the resource conflict may belong to the same UE group (i.e., a set of UEs receiving the same groupcast PSSCH). For example, regardless of whether the third UE successfully decodes a TB transmitted through a groupcast PSSCH, if a resource conflict is recognized at a time or resource occupied for the groupcast PSSCH, the third UE may transmit, to a UE which has transmitted the groupcast PSSCH, NACK by using a PSFCH resource allocated to itself (i.e., the third UE). Herein, for example, the third UE may select/determine the PSFCH resource allocated to itself (i.e., the third UE) based on the $M_{ID}$ provided to itself (i.e., the third UE).

Meanwhile, in the case of the groupcast HARQ-ACK feedback option 1, not all receiving UEs transmit SL HARQ-ACK feedback. Specifically, for example, only if (i) a receiving UE fails to decode a PSSCH, and (ii) the distance between the center location of a ZONE indicated by SCI and the receiving UE is smaller than a communication range requirement indicated by the SCI, the receiving UE may transmit NACK to the transmitting UE. Meanwhile, in case that a third UE which recognizes a resource conflict and transmits NACK instead of other UEs is outside a communication range requirement with respect to the center of a ZONE in which a transmitting UE is located, the third UE may recognize a resource conflict that is not valid from the point of view of a UE within the communication range requirement. Specifically, for example, although it is a non-conflict resource from the point of view of the UE within the communication range requirement, the third UE outside the communication range requirement may determine that it is a conflict resource. For example, although it is a conflict resource from the point of view of the UE within the communication range requirement, the third UE outside the communication range requirement may determine that it is a non-conflict resource. Therefore, for example, the third UE which recognizes a resource conflict for a groupcast PSSCH may be a UE located in a ZONE related to a ZONE ID included in SCI corresponding to the groupcast PSSCH. For example, the third UE which recognizes a resource conflict for a groupcast PSSCH may be a UE located within a communication range requirement included in SCI, from the center of a ZONE related to a ZONE ID included in the SCI corresponding to the groupcast PSSCH. For example, the third UE which recognizes a resource conflict for a groupcast PSSCH may be a UE located within a (pre-)configured distance (range), from the center of a ZONE related to a ZONE ID included in SCI corresponding to the groupcast PSSCH. For example, the third UE which recognizes a resource conflict for a groupcast PSSCH may be a UE whose RSRP value measured based on a PSCCH DMRS or a PSSCH DMRS corresponding to the groupcast PSSCH is greater than or equal to a (pre-)configured threshold. For example, the third UE may be one of UEs receiving the groupcast PSSCH, and the third UE may transmit NACK to the transmitting UE upon recognizing a resource conflict, regardless of whether or not a TB transmitted through a PSSCH is successfully decoded. Meanwhile, the UE-A may measure/instruct a resource conflict for a previously selected/reserved resource of the UE-B. For example, in this case, the UE-A may determine a resource conflict only if the previously selected/reserved resource corresponds to initial transmission. For example, the initial transmission may be a PSSCH resource successfully received for the first time for a TB from the point of view of the UE-A. That is, for example, a half-duplex problem and/or a resource conflict may not be determined for a retransmission resource of the UE-B with respect to the UE-A. Similarly, the UE-A may not transmit a resource conflict indicator for the resource to the UE-B.

For example, an indicator indicating whether or not additional information is included may be included in first SCI and/or second SCI corresponding to the additional information. For example, the indicator may indicate UE group information corresponding to additional information. For example, if the UE determines that received SCI indicates additional information for the UE, the UE may decode or expect to decode a PSSCH to obtain additional information even if an L1 destination ID indicated by second SCI is not for the UE.

In an embodiment of the present disclosure, the UE may obtain an RSRP measurement value used when generating additional information, based on a PSCCH DMRS and/or a PSSCH DMRS. For example, when the UE-A generates additional information, the type of a reference signal referred to when measuring RSRP may be (pre-)configured. For example, when the UE-A generates additional information, the type of a reference signal referred to when measuring RSRP may be configured through PC5-RRC signaling between the UE-A and the UE-B. For example, when the UE-A generates additional information, the UE-B may indicate the type of a reference signal referred to when measuring RSRP to the UE-A when requesting additional information. For example, when the UE-A generates additional information, the type of a reference signal referred to when measuring RSRP may be configured for a TX resource pool for transmission of the UE-B provided by the UE-B to the UE-A. For example, when the UE-A generates additional information, the type of a reference signal referred to when measuring RSRP may be configured for a resource pool in which the UE-A transmits additional information. For example, when the UE-A generates additional information, the type of a reference signal referred to when measuring RSRP may be configured for a resource pool in which the UE-A generates additional information.

Meanwhile, the UE-A may indicate resource conflict information for a resource indicated by additional information and/or SCI of the UE-B. In particular, in the case of resource overlap, the UE-A may determine a resource conflict based on an RSRP measurement value. For example, if an RSRP measurement value of a PSCCH/PSSCH resource overlapping a transmission resource and/or a reserved resource of the UE-B is greater than or equal to a specific threshold, the UE-A may determine a resource conflict and indicate it to the UE-B. For example, the specific threshold may be determined according to a transmission priority and a reception priority value. For example, the reception priority may be a priority value indicated by SCI for the PSCCH/PSSCH overlapping the transmission resource of the UE-B. For example, the transmission priority may be a priority value indicated by SCI for the transmission resource of the UE-B.

Figure 13:
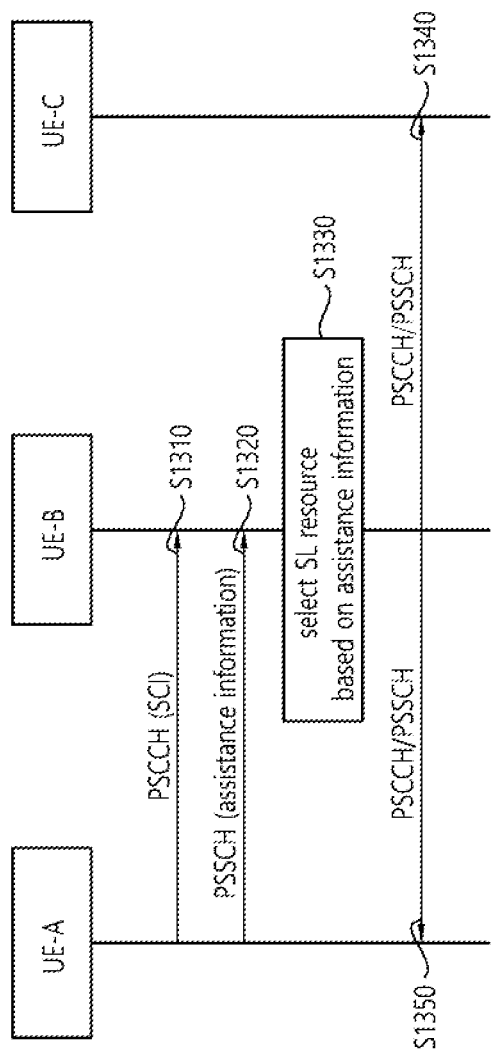
FIG. 13 shows a procedure for a UE to perform SL communication based on assistance information, based on an embodiment of the present disclosure.

FIG. 13 shows a procedure for a UE to perform SL communication based on assistance information, based on an embodiment of the present disclosure. The embodiment of FIG. 13 may be combined with various embodiments of the present disclosure.

Referring to FIG. 13, in step S1310, the UE-B may receive SCI from the UE-A through a PSCCH. For example, the SCI may include information for scheduling a PSSCH. In step S1320, the UE-B may receive assistance information from the UE-A through the PSSCH. For example, the assistance information may be included in a MAC PDU. For example, the assistance information may include information proposed in various embodiments of the present disclosure. In step S1330, the UE-B may select a SL resource based on the assistance information.

In step S1340, the UE-B may transmit a PSCCH and/or a PSSCH to the UE-C based on the selected SL resource. Alternatively/additionally, in step S1350, the UE-B may transmit a PSCCH and/or a PSSCH to the UE-A based on the selected SL resource.

Figure 14:
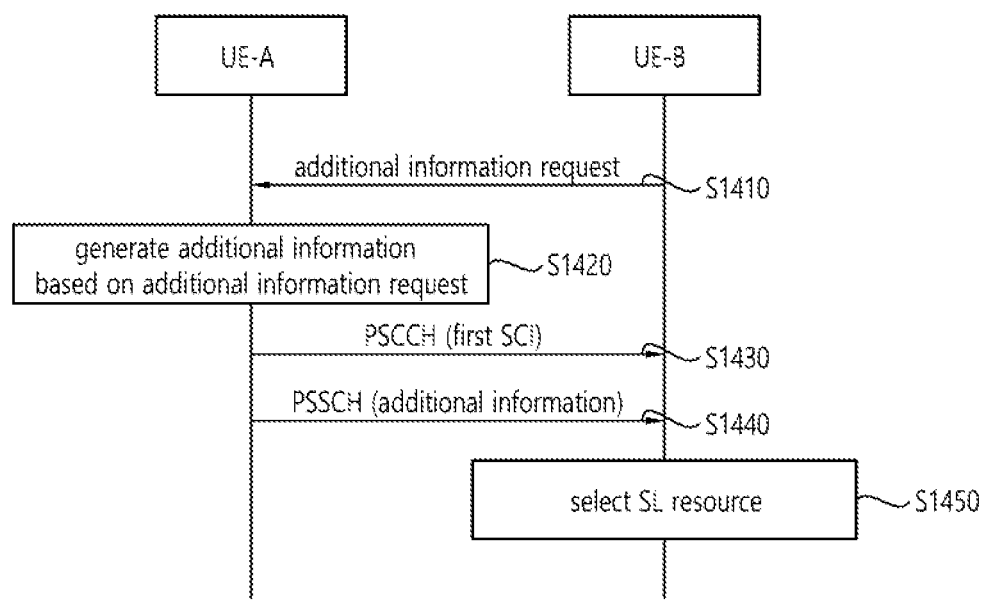
FIG. 14 shows a procedure for a UE to perform SL communication based on assistance information, based on an embodiment of the present disclosure.

FIG. 14 shows a procedure for a UE to perform SL communication based on assistance information, based on an embodiment of the present disclosure. The embodiment of FIG. 14 may be combined with various embodiments of the present disclosure.

Referring to FIG. 14, in step S1410, the UE-B may transmit an additional information request to the UE-A. For example, the additional information request may include information proposed in various embodiments of the present disclosure.

In step S1420, the UE-A may generate additional information based on the additional information request. For example, the UE-A may generate additional information related to specific information, based on the specific information included in the additional information request.

In step S1430, the UE-A may transmit first SCI to the UE-B through a PSCCH. For example, the first SCI may include information for scheduling a PSSCH. In step S1440, the UE-A may transmit additional information to the UE-B through the PSSCH. For example, the additional information may be included in a MAC PDU. For example, the additional information may be included in second SCI. For example, the additional information may include information proposed in various embodiments of the present disclosure. In step S1450, the UE-B may select SL resource(s) based on the additional information.

Based on various embodiments of the present disclosure, the UE-B may efficiently perform (re)selection of resource(s) for transmission by the UE-B based on assistance information transmitted by the UE-A. Furthermore, if a specific condition is satisfied, the UE-A may transmit assistance information to the UE-B. Through this, it is possible to solve a problem in which radio resources are wasted due to the UE-A indiscriminately transmitting assistance information. Furthermore, the UE-A may generate assistance information based on an assistance information request transmitted by the UE-B. Through this, from the point of view of the UE-B, necessary assistance information can be generated, and the UE-B can efficiently select SL resource(s) based on assistance information requested by the UE-B.

Based on various embodiments of the present disclosure, if the UE-A which has received information related to SL resources from the UE-B and/or the UE-C detects a conflict (e.g., conflict between transmissions or conflict between transmission and reception (i.e., half-duplex problem)) on all or part of SL resources, the UE-A may transmit information related to resource conflict/overlap to the UE-B and/or the UE-C based on a PSFCH resource related to the SL resource. Through this, the UE-B and/or the UE-C can perform resource reselection for the SL resource, and a resource conflict between UEs can be minimized. In particular, in a situation where the UE-B and the UE-C cannot recognize each other's collision, the UE-B and/or the UE-C may perform resource reselection for the SL resource by the UE-A transmitting information related to resource conflict/overlap to the UE-B and/or the UE-C, and a resource conflict between UEs can be minimized.

Figure 15:
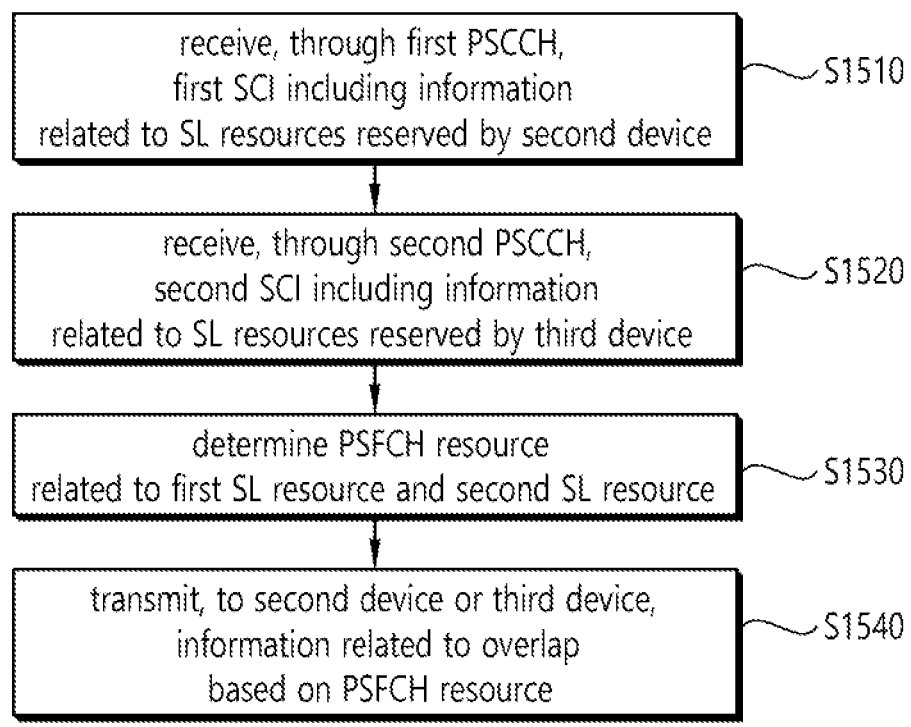
FIG. 15 shows a method for performing wireless communication by a first device, based on an embodiment of the present disclosure.

FIG. 15 shows a method for performing wireless communication by a first device, based on an embodiment of the present disclosure. The embodiment of FIG. 15 may be combined with various embodiments of the present disclosure.

Referring to FIG. 15, in step S1510, the first device may receive, through a first physical sidelink control channel (PSCCH), first sidelink control information (SCI) including information related to a plurality of sidelink (SL) resources reserved by a second device. In step S1520, the first device may receive, through a second PSCCH, second SCI including information related to a plurality of SL resources reserved by a third device. For example, a first SL resource among the plurality of SL resources reserved by the second device may overlap with a second SL resource among the plurality of SL resources reserved by the third device. In step S1530, the first device may determine a physical sidelink feedback channel (PSFCH) resource related to the first SL resource and the second SL resource. In step S1540, the first device may transmit, to the second device or the third device, information related to overlap based on the PSFCH resource.

For example, based on that the first device is configured to transmit only NACK feedback, the first device may be allowed to transmit the information related to the overlap based on the PSFCH resource. For example, based on that the first device is configured to transmit ACK feedback or NACK feedback, the first device may not be allowed to transmit the information related to the overlap based on the PSFCH resource.

For example, the first SL resource may belong to a slot after a slot in which the first SCI is received, and the second SL resource may belong to a slot after a slot in which the second SCI is received.

For example, the information related to the overlap may be ACK or NACK.

Additionally, for example, the first device may determine a type of the information related to the overlap based on a time domain of an overlapping SL resource among the plurality of SL resources. For example, based on an overlapping of N-th SL resource among the plurality of SL resources, the information related to the overlap may be ACK, and based on an overlapping of K-th SL resource among the plurality of SL resources, the information related to the overlap may be NACK, and N and K may be positive integers. For example, based on an overlapping of SL resources on a slot in which the first SCI or the second SCI is received among the plurality of SL resources, the information related to the overlap may be NACK, and based on an overlapping of SL resources on a slot after the slot in which the first SCI or the second SCI is received among the plurality of SL resources, the information related to the overlap may be ACK.

For example, based on at least one of a domain of the PSFCH resource or a bit value of hybrid automatic repeat request (HARQ) feedback transmitted on the PSFCH resource, a resource or a set of resources reselected by the second device or the third device may be different.

For example, a resource for transmission or reception of the first device may overlap with the first SL resource or the second SL resource. For example, the information related to the overlap may represent (i) a conflict between transmissions by the second device and the third device on the first SL resource and the second SL resource or (ii) that the first device cannot perform SL reception on the first SL resource or the second SL resource. For example, based on at least one of a domain of the PSFCH resource or a bit value of HARQ feedback transmitted on the PSFCH resource, the information related to the overlap may represent (i) a conflict between transmissions by the second device and the third device on the first SL resource and the second SL resource or (ii) that the first device cannot perform SL reception on the first SL resource or the second SL resource.

For example, the information related to the overlap may represent a conflict between transmissions on the first SL resource and the second SL resource or a conflict between transmission and reception on the first SL resource and the second SL resource. For example, based on at least one of a domain of the PSFCH resource or a bit value of HARQ feedback transmitted on the PSFCH resource, the information related to the overlap may represent a conflict between transmissions on the first SL resource and the second SL resource or a conflict between transmission and reception on the first SL resource and the second SL resource. For example, the domain of the PSFCH resource may include a code domain of the PSFCH resource.

For example, the plurality of SL resources reserved by the second device may be resources for the second device to perform SL transmission to the first device or the third device, and the plurality of SL resources reserved by the third device may be resources for the third device to perform SL transmission to the first device or the second device.

The proposed method can be applied to the device(s) based on various embodiments of the present disclosure. First, the processor 102 of the first device 100 may control the transceiver 106 to receive, through a first physical sidelink control channel (PSCCH), first sidelink control information (SCI) including information related to a plurality of sidelink (SL) resources reserved by a second device. In addition, the processor 102 of the first device 100 may control the transceiver 106 to receive, through a second PSCCH, second SCI including information related to a plurality of SL resources reserved by a third device. For example, a first SL resource among the plurality of SL resources reserved by the second device may overlap with a second SL resource among the plurality of SL resources reserved by the third device. In addition, the processor 102 of the first device 100 may determine a physical sidelink feedback channel (PSFCH) resource related to the first SL resource and the second SL resource. In addition, the processor 102 of the first device 100 may control the transceiver 106 to transmit, to the second device or the third device, information related to overlap based on the PSFCH resource.

Based on an embodiment of the present disclosure, a first device adapted to perform wireless communication may be provided. For example, the first device may comprise: one or more memories storing instructions; one or more transceivers; and one or more processors connected to the one or more memories and the one or more transceivers. For example, the one or more processors may execute the instructions to: receive, through a first physical sidelink control channel (PSCCH), first sidelink control information (SCI) including information related to a plurality of sidelink (SL) resources reserved by a second device; receive, through a second PSCCH, second SCI including information related to a plurality of SL resources reserved by a third device, wherein a first SL resource among the plurality of SL resources reserved by the second device overlaps with a second SL resource among the plurality of SL resources reserved by the third device; determine a physical sidelink feedback channel (PSFCH) resource related to the first SL resource and the second SL resource; and transmit, to the second device or the third device, information related to overlap based on the PSFCH resource.

Based on an embodiment of the present disclosure, an apparatus adapted to control a first user equipment (UE) may be provided. For example, the apparatus may comprise: one or more processors; and one or more memories operably connected to the one or more processors and storing instructions. For example, the one or more processors may execute the instructions to: receive, through a first physical sidelink control channel (PSCCH), first sidelink control information (SCI) including information related to a plurality of sidelink (SL) resources reserved by a second UE; receive, through a second PSCCH, second SCI including information related to a plurality of SL resources reserved by a third UE, wherein a first SL resource among the plurality of SL resources reserved by the second UE overlaps with a second SL resource among the plurality of SL resources reserved by the third UE; determine a physical sidelink feedback channel (PSFCH) resource related to the first SL resource and the second SL resource; and transmit, to the second UE or the third UE, information related to overlap based on the PSFCH resource.

Based on an embodiment of the present disclosure, a non-transitory computer-readable storage medium storing instructions may be provided. For example, the instructions, when executed, may cause a first device to: receive, through a first physical sidelink control channel (PSCCH), first sidelink control information (SCI) including information related to a plurality of sidelink (SL) resources reserved by a second device; receive, through a second PSCCH, second SCI including information related to a plurality of SL resources reserved by a third device, wherein a first SL resource among the plurality of SL resources reserved by the second device overlaps with a second SL resource among the plurality of SL resources reserved by the third device; determine a physical sidelink feedback channel (PSFCH) resource related to the first SL resource and the second SL resource; and transmit, to the second device or the third device, information related to overlap based on the PSFCH resource.

Figure 16:
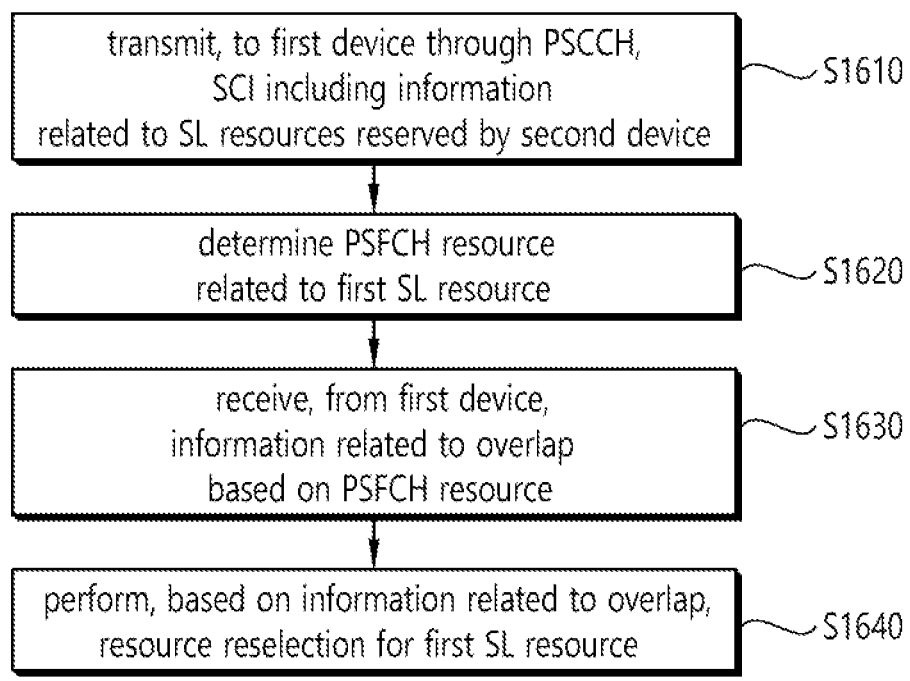
FIG. 16 shows a method for performing wireless communication by a second device, based on an embodiment of the present disclosure.

FIG. 16 shows a method for performing wireless communication by a second device, based on an embodiment of the present disclosure. The embodiment of FIG. 16 may be combined with various embodiments of the present disclosure.

Referring to FIG. 16, in step S1610, the second device may transmit, to a first device through a physical sidelink control channel (PSCCH), sidelink control information (SCI) including information related to a plurality of sidelink (SL) resources reserved by the second device. For example, a first SL resource among the plurality of SL resources reserved by the second device may overlap with a second SL resource among a plurality of SL resources reserved by a third device. In step S1620, the second device may determine a physical sidelink feedback channel (PSFCH) resource related to the first SL resource. In step S1630, the second device may receive, from the first device, information related to overlap based on the PSFCH resource. In step S1640, the second device may perform, based on the information related to the overlap, resource reselection for the first SL resource.

The proposed method can be applied to the device(s) based on various embodiments of the present disclosure. First, the processor 202 of the second device 200 may control the transceiver 206 to transmit, to a first device through a physical sidelink control channel (PSCCH), sidelink control information (SCI) including information related to a plurality of sidelink (SL) resources reserved by the second device. For example, a first SL resource among the plurality of SL resources reserved by the second device may overlap with a second SL resource among a plurality of SL resources reserved by a third device. In addition, the processor 202 of the second device 200 may determine a physical sidelink feedback channel (PSFCH) resource related to the first SL resource. In addition, the processor 202 of the second device 200 may control the transceiver 206 to receive, from the first device, information related to overlap based on the PSFCH resource. In addition, the processor 202 of the second device 200 may perform, based on the information related to the overlap, resource reselection for the first SL resource.

Based on an embodiment of the present disclosure, a second device adapted to perform wireless communication may be provided. For example, the second device may comprise: one or more memories storing instructions; one or more transceivers; and one or more processors connected to the one or more memories and the one or more transceivers. For example, the one or more processors may execute the instructions to: transmit, to a first device through a physical sidelink control channel (PSCCH), sidelink control information (SCI) including information related to a plurality of sidelink (SL) resources reserved by the second device, wherein a first SL resource among the plurality of SL resources reserved by the second device overlaps with a second SL resource among a plurality of SL resources reserved by a third device; determine a physical sidelink feedback channel (PSFCH) resource related to the first SL resource; receive, from the first device, information related to overlap based on the PSFCH resource; and perform, based on the information related to the overlap, resource reselection for the first SL resource.

Based on an embodiment of the present disclosure, an apparatus adapted to control a second user equipment (UE) may be provided. For example, the apparatus may comprise: one or more processors; and one or more memories operably connected to the one or more processors and storing instructions. For example, the one or more processors may execute the instructions to: transmit, to a first UE through a physical sidelink control channel (PSCCH), sidelink control information (SCI) including information related to a plurality of sidelink (SL) resources reserved by the second UE, wherein a first SL resource among the plurality of SL resources reserved by the second UE overlaps with a second SL resource among a plurality of SL resources reserved by a third UE; determine a physical sidelink feedback channel (PSFCH) resource related to the first SL resource; receive, from the first UE, information related to overlap based on the PSFCH resource; and perform, based on the information related to the overlap, resource reselection for the first SL resource.

Based on an embodiment of the present disclosure, a non-transitory computer-readable storage medium storing instructions may be provided. For example, the instructions, when executed, may cause a second device to: transmit, to a first device through a physical sidelink control channel (PSCCH), sidelink control information (SCI) including information related to a plurality of sidelink (SL) resources reserved by the second device, wherein a first SL resource among the plurality of SL resources reserved by the second device overlaps with a second SL resource among a plurality of SL resources reserved by a third device; determine a physical sidelink feedback channel (PSFCH) resource related to the first SL resource; receive, from the first device, information related to overlap based on the PSFCH resource; and perform, based on the information related to the overlap, resource reselection for the first SL resource.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
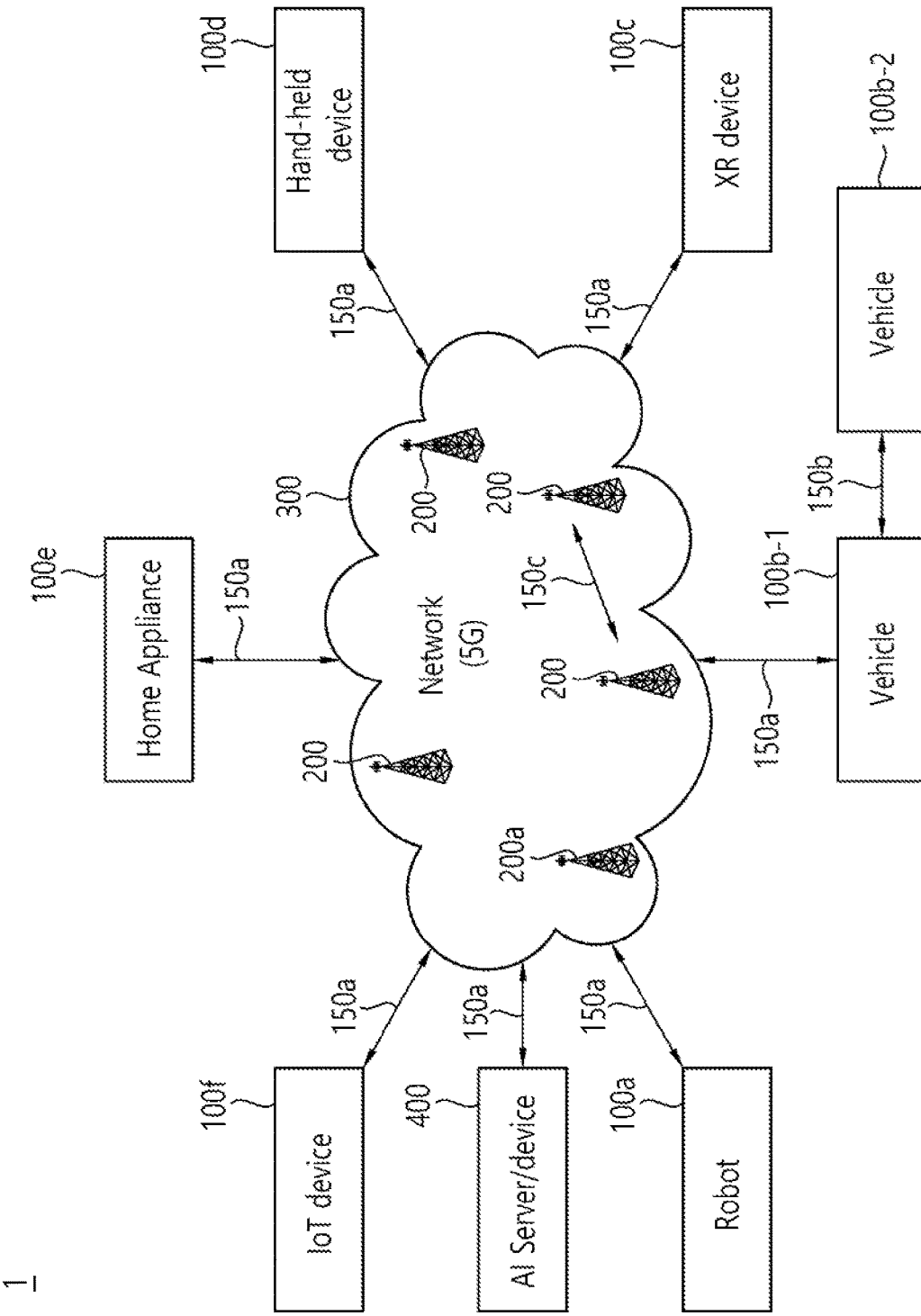
FIG. 17 shows a communication system 1, based on an embodiment of the present disclosure.

FIG. 17 shows a communication system 1, based on an embodiment of the present disclosure.

Referring to FIG. 17, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
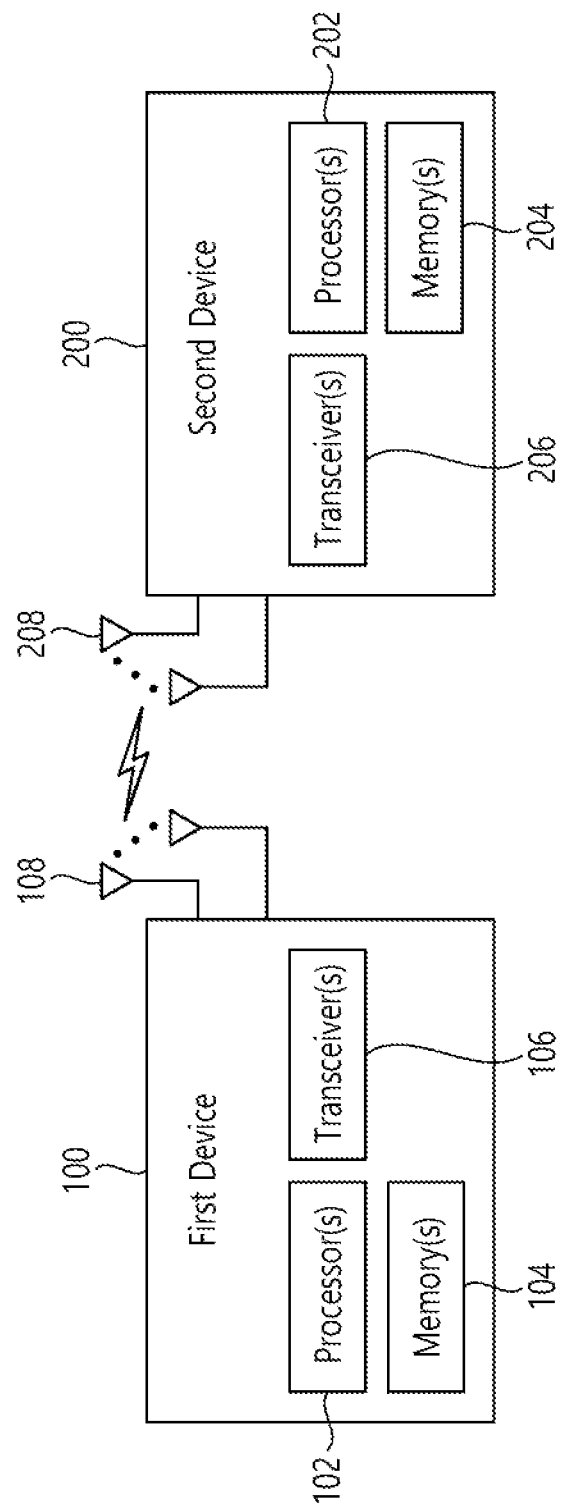
FIG. 18 shows wireless devices, based on an embodiment of the present disclosure.

FIG. 18 shows wireless devices, based on an embodiment of the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
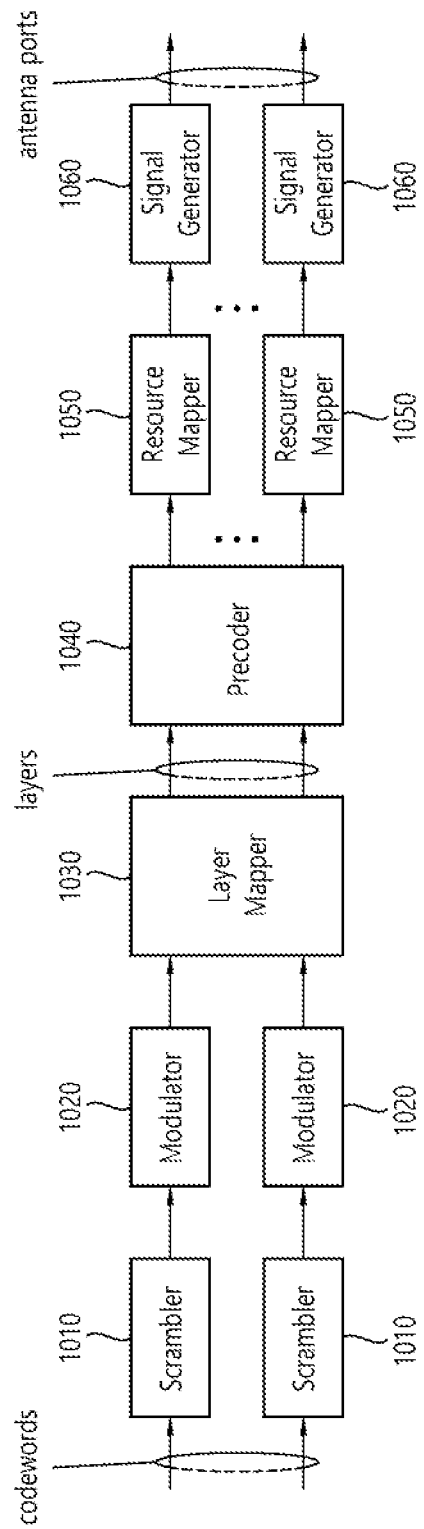
FIG. 19 shows a signal process circuit for a transmission signal, based on an embodiment of the present disclosure.

FIG. 19 shows a signal process circuit for a transmission signal, based on an embodiment of the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 20:
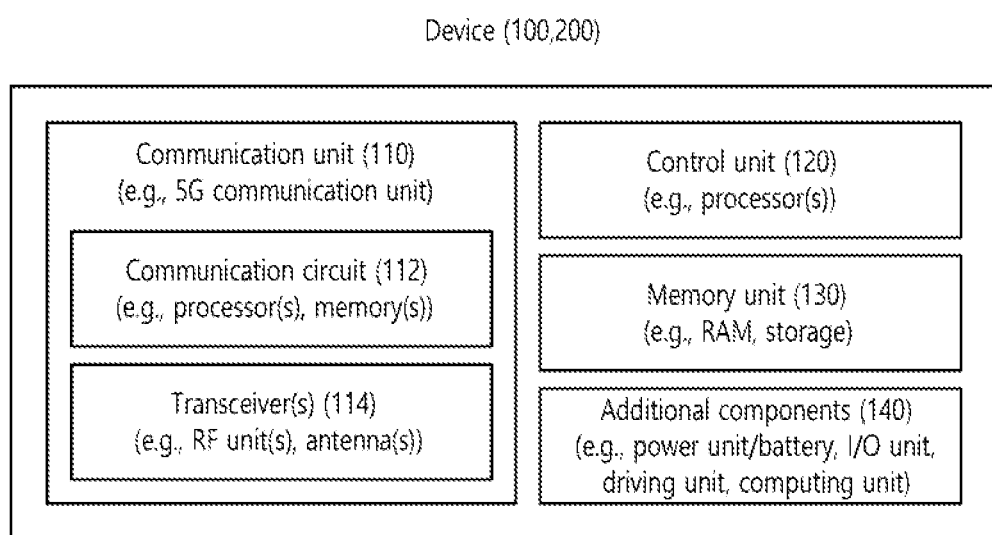
FIG. 20 shows another example of a wireless device, based on an embodiment of the present disclosure.

FIG. 20 shows another example of a wireless device, based on an embodiment of the present disclosure. The wireless device may be implemented in various forms according to a use-case/service (refer to FIG. 17).

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Figure 21:
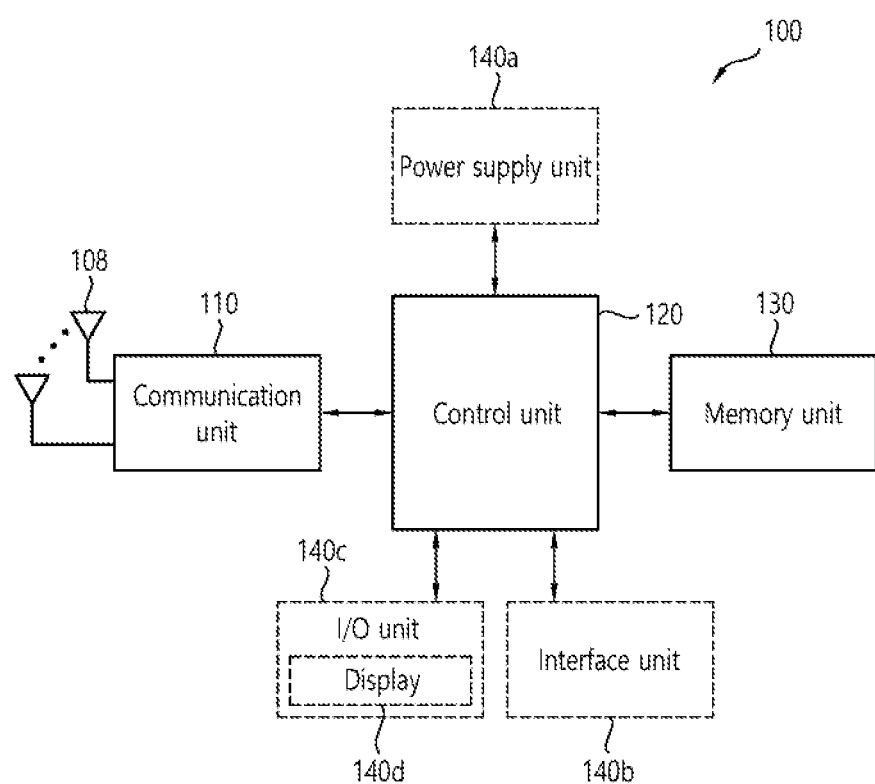
FIG. 21 shows a hand-held device, based on an embodiment of the present disclosure.

FIG. 21 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 22 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 22, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
   receiving, through a first physical sidelink control channel (PSCCH), first sidelink control information (SCI) including a first priority value and information related to a first resource reserved by a second device;
   receiving, through a second PSCCH, second SCI including a second priority value and information related to a second resource reserved by a third device;
   determining that the first resource and the second resource overlap;
   determining a physical sidelink feedback channel (PSFCH) resource for PSFCH transmission with conflict information corresponding to the first resource; and
   performing the PSFCH transmission with the conflict information to the second device.

2. The method of claim 1, wherein a priority value for the PSFCH transmission with the conflict information is equal to a smallest priority value determined by the first SCI and the second SCI.

3. The method of claim 2, wherein the priority value for the PSFCH transmission with the conflict information is equal to the smallest priority value among the first priority value determined by the first SCI and the second priority value determined by the second SCI.

4. The method of claim 1, wherein the first SL resource belongs to a slot after a slot in which the first SCI is received, and the second resource belongs to a slot after a slot in which the second SCI is received.

5. The method of claim 1, wherein, based on that the first priority value is greater than the second priority value, the PSFCH transmission with the conflict information is performed to the second device.

6. The method of claim 1, wherein a priority value for PSFCH reception with the conflict information is equal to the first priority value determined by the first SCI.

7. The method of claim 1, wherein, based on that the first priority value is equal to the second priority value, the PSFCH transmission with the conflict information is performed to the second device or the third device.

8. The method of claim 1, wherein a set of PSFCH resources for the conflict information and a set of PSFCH resources for sidelink (SL) hybrid automatic repeat request (HARQ)-ACK information are configured, respectively.

9. The method of claim 1, wherein a resource for transmission or reception of the first device overlaps with the first resource or the second resource.

10. The method of claim 1, wherein the conflict information represents a conflict between transmissions by the second device and the third device on the first resource and the second resource.

11. The method of claim 1, wherein the conflict information represents that the first device cannot perform SL reception on the first resource or the second resource.

12. The method of claim 1, wherein a domain of the PSFCH resource includes a time domain, a frequency domain and a code domain.

13. The method of claim 1, wherein the first resource reserved by the second device is a resource for the second device to perform SL transmission to the first device or the third device, and wherein the second resource reserved by the third device is a resource for the third device to perform SL transmission to the first device or the second device.

14. A first device adapted to perform wireless communication, the first device comprising:

at least one transceiver;

at least one processor; and at least one memory connected to the at least one processor and storing instructions that, based on being executed by the at least one processor, perform operations comprising:

receiving, through a first physical sidelink control channel (PSCCH), first sidelink control information (SCI) including a first priority value and information related to a first resource reserved by a second device;

receiving, through a second PSCCH, second SCI including a second priority value and information related to a second resource reserved by a third device;

determining that the first resource and the second resource overlap;

determining a physical sidelink feedback channel (PSFCH) resource for PSFCH transmission with conflict information corresponding to the first resource; and performing the PSFCH transmission with the conflict information to the second device.

15. The first device of claim 14, wherein a priority value for the PSFCH transmission with the conflict information is equal to a smallest priority value determined by the first SCI and the second SCI.

16. The first device of claim 15, wherein the priority value for the PSFCH transmission with the conflict information is equal to the smallest priority value among the first priority value determined by the first SCI and the second priority value determined by the second SCI.

17. The first device of claim 14, wherein a priority value for PSFCH reception with the conflict information is equal to the first priority value determined by the first SCI.

18. A processing device adapted to control a first device, the processing device comprising:

at least one processor; and at least one memory connected to the at least one processor and storing instructions that, based on being executed by the at least one processor, perform operations comprising:

receiving, through a first physical sidelink control channel (PSCCH), first sidelink control information (SCI) including a first priority value and information related to a first resource reserved by a second device;

receiving, through a second PSCCH, second SCI including a second priority value and information related to a second resource reserved by a third device;

determining that the first resource and the second resource overlap;

determining a physical sidelink feedback channel (PSFCH) resource for PSFCH transmission with conflict information corresponding to the first resource; and performing the PSFCH transmission with the conflict information to the second device.

19. The processing device of claim 18, wherein a priority value for the PSFCH transmission with the conflict information is equal to a smallest priority value determined by the first SCI and the second SCI.

20. The processing device of claim 19, wherein the priority value for the PSFCH transmission with the conflict information is equal to the smallest priority value among the first priority value determined by the first SCI and the second priority value determined by the second SCI.

* * * * *